(12) United States Patent
Moriyama et al.

(10) Patent No.: US 6,312,102 B1
(45) Date of Patent: Nov. 6, 2001

(54) COLOR INK JET RECORDING METHOD AND APPARATUS USING BLACK INK AND COLOR-MIXED BLACK INK

(75) Inventors: Jiro Moriyama, Kawasaki; Naoji Otsuka, Yokohama; Nobuyuki Kuwabara, Kawasaki; Isao Ebisawa, Yokohama; Atsushi Arai; Hisao Yaegashi, both of Kawasaki; Toshiharu Inui; Kentaro Yano, both of Yokohama; Kiichiro Takahashi, Kawasaki; Osamu Iwasaki, Tokyo; Daigoro Kanematsu, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/549,935

(22) Filed: Apr. 14, 2000

Related U.S. Application Data

(62) Division of application No. 08/143,157, filed on Oct. 29, 1993, now Pat. No. 6,084,604.

(30) Foreign Application Priority Data

| Oct. 30, 1992 | (JP) | 4-292541 |
| Oct. 30, 1992 | (JP) | 4-292543 |
| Oct. 30, 1992 | (JP) | 4-292544 |
| Oct. 30, 1992 | (JP) | 4-292545 |
| Oct. 30, 1992 | (JP) | 4-292646 |
| Oct. 4, 1993 | (JP) | 5-248139 |

(51) Int. Cl.[7] ............... B41J 2/21; B41J 2/205
(52) U.S. Cl. .................. 347/43; 347/15
(58) Field of Search ............................ 347/43, 15

(56) References Cited

U.S. PATENT DOCUMENTS

| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |

(List continued on next page.)

FOREIGN PATENT DOCUMENTS

| 54-56847 | 5/1979 | (JP) . |
| 59-123670 | 7/1984 | (JP) . |
| 59-138461 | 8/1984 | (JP) . |
| 59-162055 | 9/1984 | (JP) . |
| 60-71260 | 4/1985 | (JP) . |
| 2-78571 | 3/1990 | (JP) . |
| 2-227271 | 9/1990 | (JP) . |
| 3-146355 | 6/1991 | (JP) . |
| 4-158049 | 6/1992 | (JP) . |

OTHER PUBLICATIONS

Patent Abstracts of Japan, vol. 16, No. 434 (M–1308), with respect to Japanese Patent Document No. 04–147866 (May 21, 1992).
Patent Abstracts of Japan, vol. 15, No. 370 (M–1159), with respect to Japanese Patent Document No. 03–146355 (Jun. 21, 1991).
Patent Abstracts of Japan, vol. 13, No. 335 (M–856), with respect to Japanese Patent Document No. 01–114447 (May 8, 1989).
Patent Abstracts of Japan, vol. 9, No. 51 (M–316), with respect to Japanese Patent Document No. 59–187861 (Oct. 25, 1984).

*Primary Examiner*—Thinh Nguyen
(74) *Attorney, Agent, or Firm*—Fitzpatrick, Cella, Harper & Scinto

(57) ABSTRACT

Whether or not a color image is present adjacent to a black image is discriminated. Whether the black image is formed using a black ink or a plurality of color inks C, M, and Y is determined in accordance with the discrimination result. When the black image is formed using the plurality of color inks, it is recorded using a repetitive pattern of two of C, M, and Y so as to prevent blurring with the color image, and to improve fixing characteristics by decreasing the total ejection amount.

26 Claims, 42 Drawing Sheets

U.S. PATENT DOCUMENTS

| | | | |
|---|---|---|---|
| 4,515,487 | 5/1985 | Minami | 400/121 |
| 4,547,783 | 10/1985 | Watanabe | 346/76 PH |
| 4,558,333 | 12/1985 | Sugitani et al. | 346/140 R |
| 4,608,577 | 8/1986 | Hori | 346/140 R |
| 4,631,548 | 12/1986 | Milbrandt | 346/1.1 |
| 4,680,596 | 7/1987 | Logan | 346/140 PD |
| 4,700,399 | 10/1987 | Yoshida | 382/17 |
| 4,723,129 | 2/1988 | Endo et al. | 346/1.1 |
| 4,740,796 | 4/1988 | Endo et al. | 346/1.1 |
| 4,860,026 | 8/1989 | Matsumoto et al. | 346/1.1 |
| 4,864,328 | 9/1989 | Fischbeck | 346/140 R |
| 5,032,851 | 7/1991 | Yoshimura | 346/140 R |
| 5,168,552 | 12/1992 | Vaughn et al. | 315/109 |
| 5,220,342 | 6/1993 | Moriyama | 346/1.1 |
| 5,428,377 | 6/1995 | Stoffel et al. | 347/15 |
| 5,734,403 | 3/1998 | Suga et al. | 347/101 |
| 6,007,182 | 12/1999 | Matsubara et al. | 347/43 |

FIG. 9
A { XX YY ZZ } ~ BLACK
B {
1 2 3 4 5 6 7 8 9 あいうえお
1 2 3 4 5 6 7 8 9 あいうえお
1 2 3 4 5 6 7 8 9 あいうえお
} BLACK
C { 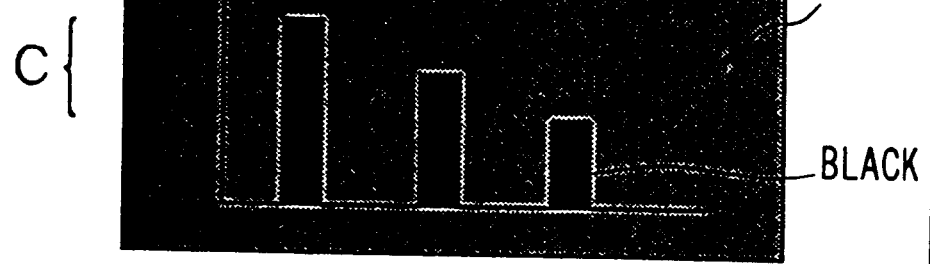 } — YELLOW / BLACK
D {  } — CYAN / BLACK   E { 1 2 3 } — MAGENTA / BLACK

BLACK RECORD PIXEL

◐ : 400
● : 401
○ : 402

◍ : 400
● : 401
○ : 402

◌ : 400
● : 401
○ : 402

◐ : 400
● : 401
○ : 402

◐ : 400
● : 401
○ : 402

◨ : 400
● : 401
○ : 402

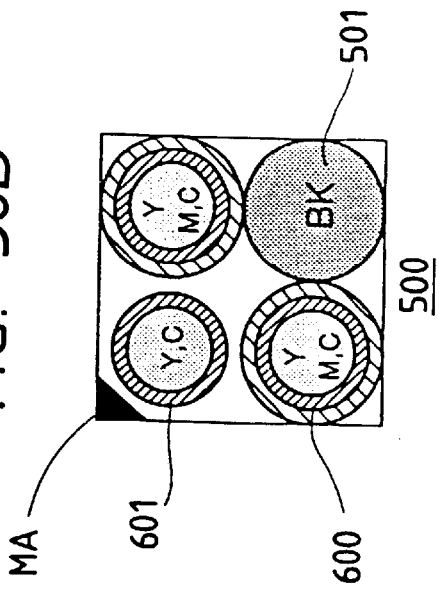
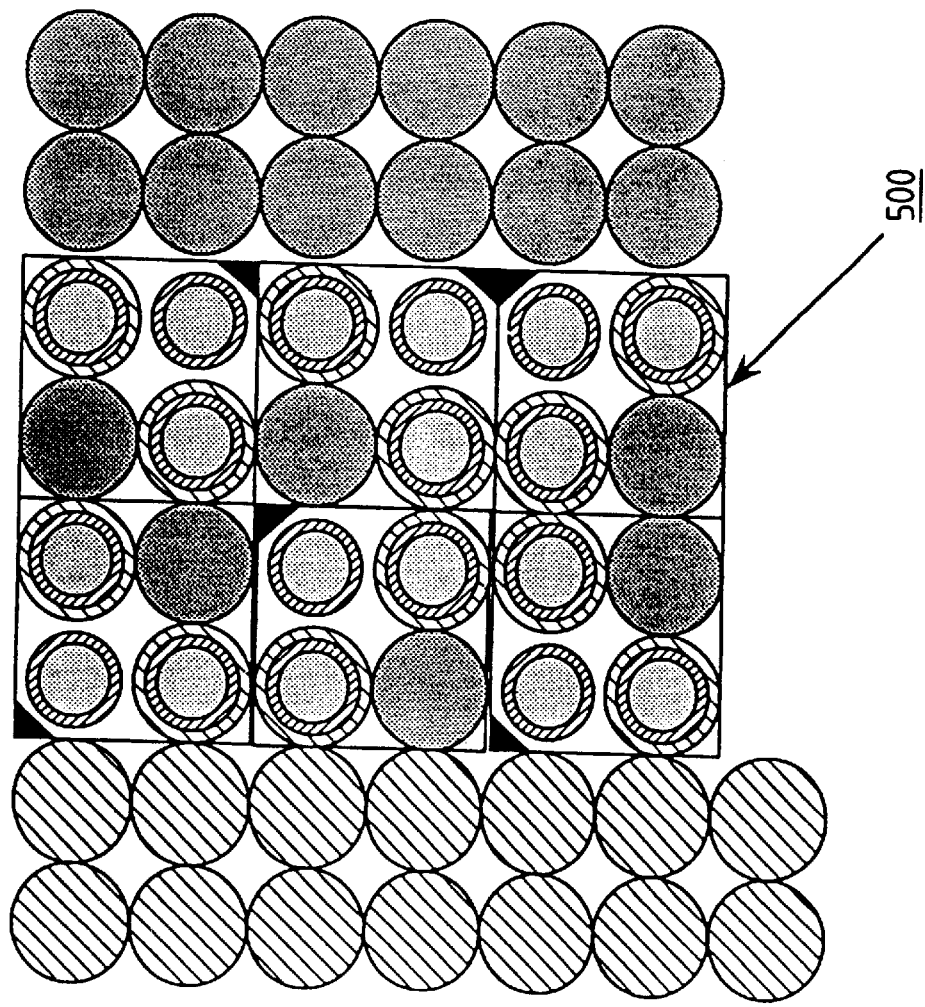

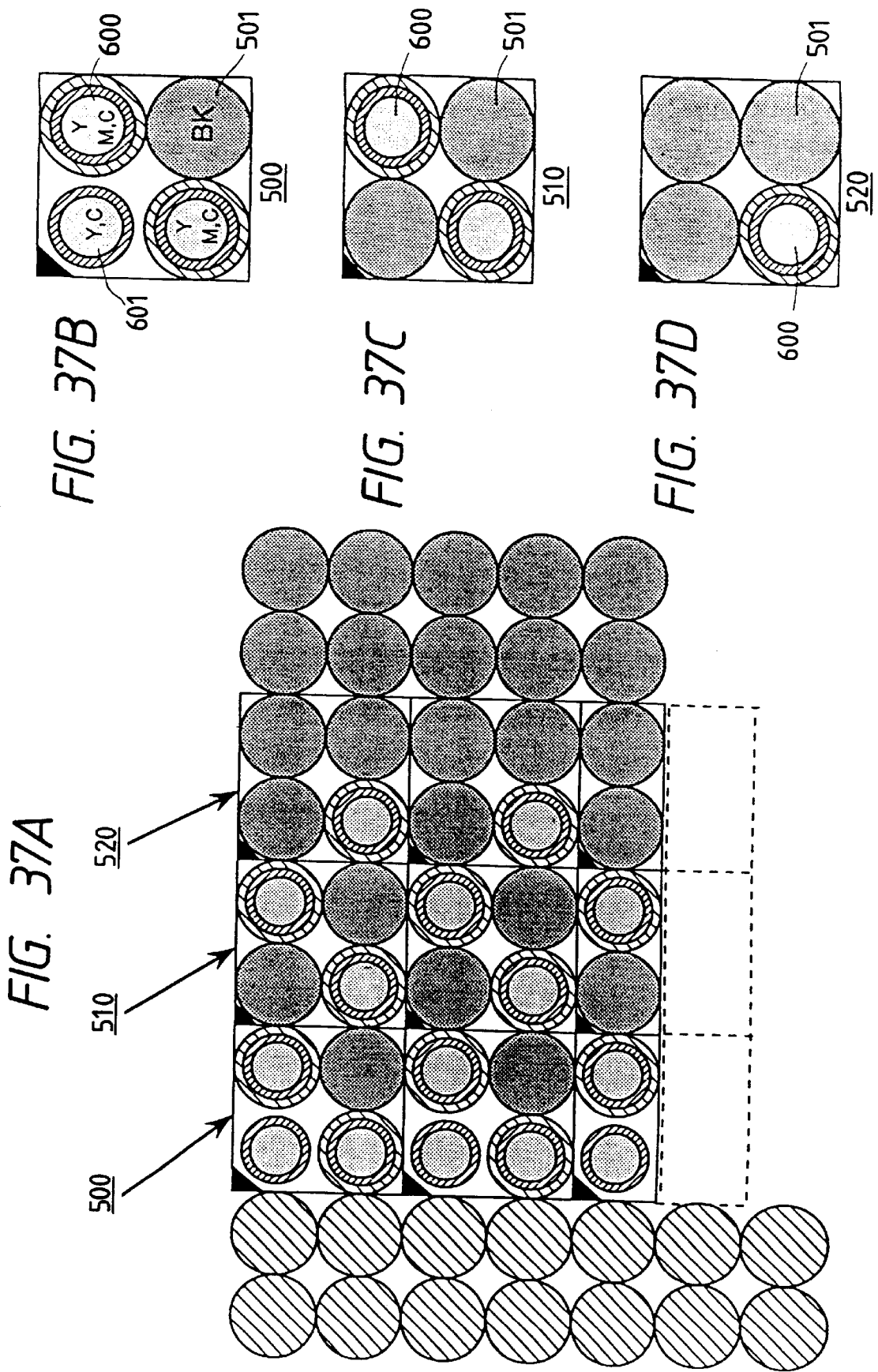

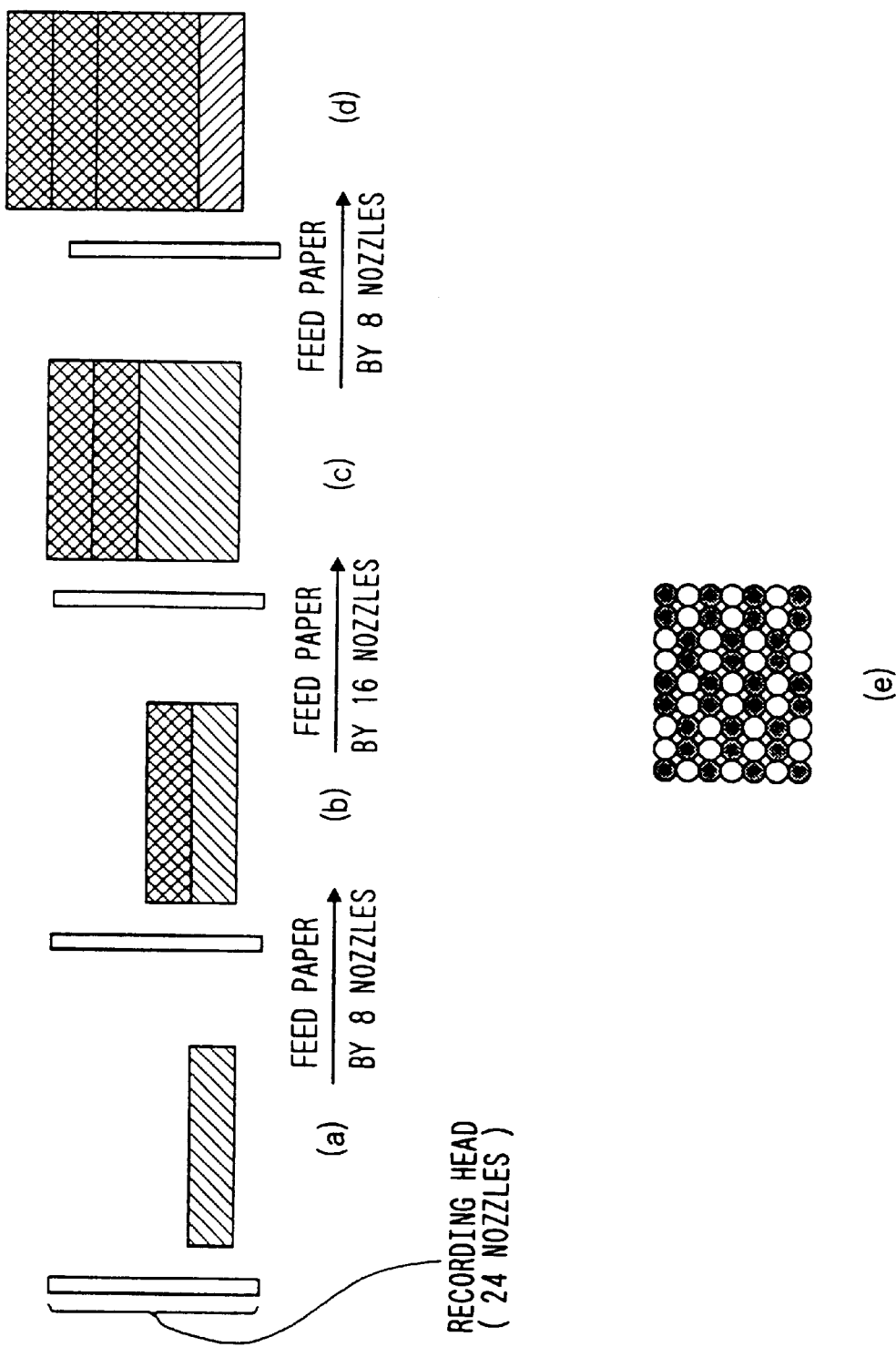

COLOR INK JET RECORDING METHOD AND APPARATUS USING BLACK INK AND COLOR-MIXED BLACK INK

This is a divisional application of application Ser. No. 08/143,157, filed Oct. 29, 1993, now U.S. Pat. No. 6,084,604.

BACKGROUND OF THE INVENTION

1. Field of the Invention

The present invention relates to a color ink jet recording method capable of recording a clear, high-density color image and, more particularly, to a color ink jet recording method using color inks such as yellow (Y), magenta (M), and cyan (C) inks, or green (G), red (R), and blue (B) inks, together with a black (Bk) ink.

The present invention can be applied to all apparatuses using recording media such as paper, a cloth, a non-woven fabric, an OHP sheet, and the like, and the apparatuses to which the present invention is applied include a printer, a copying machine, a facsimile apparatus, and the like.

2. Related Background Art

An ink jet recording method is utilized in a printer, a copying machine, a facsimile apparatus, and the like due to its advantageous features, i.e., low noise, low running cost, easy realization of a compact apparatus and a color arrangement, and the like.

In general, a color ink jet recording method performs color recording using three color inks, i.e., C, M, and Y inks, or four color inks obtained by adding Bk to the above-mentioned three inks.

In a conventional ink jet recording method, in order to obtain a highly color-developed color image free from ink blurring, a special-purpose paper sheet having an ink absorbing layer must be used. However, in recent years, a method with printing adaptability to "normal paper sheets", which are used in large amounts in a printer, a copying machine, and the like, due to improvement of inks has been put into practical applications. However, printing quality on "normal paper sheets" does not have a satisfactory level yet. The most serious cause of such low printing quality is a conflict between ① blurring of different color inks and ② black recording quality (in particular, black character recording quality).

Normally, when a color image is obtained on a normal paper sheet by the ink jet recording method, quick-drying inks which have a high penetration speed to normal paper sheets are used. For this reason, a high-quality image, which is free from blurring of different color inks, can be obtained. However, the entire image has a low density, and so-called feathering in which inks slightly blur along fibers of paper tends to occur around recorded image areas of the respective colors.

Feathering is not relatively conspicuous in a color image area, but is conspicuous in a black image area, thus deteriorating recording quality. In particular, when a black image is a character, an unclear character having no sharpness is formed, and its quality is poor.

In order to achieve high-quality black color recording which is free from feathering and has a high density, a black ink having a relatively low penetration speed to a normal paper sheet must be used. However, in this case, different color inks blur at a boundary portion between adjacent recorded image areas of black and another color, thus considerably deteriorating image quality.

In this manner, improvement of color recording quality by achieving both prevention of blurring of different color inks, e.g., a black ink and another color ink, and elimination of feathering of, especially, black poses conflicting problems.

Japanese Laid-Open Patent Application No. 3-146355 proposes a method in which no image is recorded on an area along a boundary between black and another color. However, with this method, data to be recorded may change.

Also, Japanese Laid-Open Patent Application No. 4-158049 proposes a method in which a plurality of color heads for color recording, and a character recording head are arranged, and the plurality of color heads and the character recording heads are selectively used in correspondence with an image to be recorded. However, with this method, an apparatus must have the character recording head in addition to the plurality of color heads for conventional color recording, resulting in increases in cost and in apparatus scale.

On the other hand, a problem about blurring of inks can be solved to some extent by a recording mode (to be referred to as a fine mode hereinafter) for divisionally forming an image in a plurality of number of times of main scans. However, the above-mentioned problem about black image quality remains unsolved essentially.

SUMMARY OF THE INVENTION

The present invention has been made to solve the conventional problems, and has as its object to attain high-quality recording of a black image area with a high density and less feathering when an independent black image area which does not contact other color image areas is to be recorded and to attain high-quality recording free from blurring among black and other color inks, i.e., to realize both high-quality black recording and high-quality color recording at the same time.

It is another object of the present invention to improve fixing characteristics of inks and to prevent cockling.

It is still another object of the present invention to realize high-quality color recording free from blurring among black and other color inks while maintaining sharp black recording quality of characters, thin lines, and the like.

It is still another object of the present invention to realize color recording with a satisfactory color tone of a black image area.

In order to achieve the above objects, according to the present invention, there is provided a color ink jet recording method for forming a desired color image by ejecting a black ink and a plurality of color inks different from the black ink onto a recording medium, comprising the steps of:

discriminating whether or not a color image is present at a position adjacent to a black image;

determining, in accordance with the discrimination result, whether the black image is formed using the black ink or the plurality of color inks; and decreasing an ejection amount per unit area of the plurality of color inks when the black image is formed using the plurality of color inks.

According to the present invention, there is also provided a color ink jet recording method for performing recording using a plurality of color inks including a black ink, comprising the steps of:

discriminating a character and an image; and recording a black character using both the black ink and other color inks.

According to the present invention, there is also provided a color ink jet recording method for recording a desired color image on a recording medium using a black ink and a plurality of color inks having different recording medium penetration characteristics from characteristics of the black ink, comprising the steps of:

discriminating whether or not a recording frequency of black in a specified area at a recording position of the recording medium is larger than a specified value; and selecting, in accordance with the discrimination result, whether black is recorded using the plurality of color inks or the black ink.

According to the present invention, there is also provided a color ink jet recording method for forming a desired color image on a recording medium using a black ink and a plurality of color inks different from the black ink, comprising the steps of:

discriminating whether or not a color image is present at a position adjacent to a black image;

forming a portion, adjacent to the color image, of the black image using black dots formed by mixing the plurality of color inks when the color image is present at the position adjacent to the black image; and forming another black image portion around the black image portion adjacent to the color image by mixing dots of the black ink in the black dots formed by mixing the color inks.

According to the present invention, there is also provided a color ink jet recording method for forming a desired color image on a recording medium using a black ink and a plurality of color inks different from the black ink by selecting one of a normal mode for forming an image in a single main scan, and a fine mode for forming an image in a plurality of number of times of main scans, comprising the step of:

determining whether a black image is formed using the black ink or the plurality of color inks, wherein when an identical image is formed in the normal mode and the fine mode, processing in the determining step is executed, so that a frequency of forming the black image using the black ink in the fine mode becomes higher than a frequency of forming the black image using the black ink in the normal mode.

BRIEF DESCRIPTION OF THE DRAWINGS

FIG. 9 is a view showing an example of an image for explaining the present invention;

FIGS. 36A and 36B and FIGS. 37A to 37D are views are views showing images printed according to the 20th and 21st embodiments of the present invention;

FIGS. 41A and 41B and FIG. 42 are views for explaining a painting operation in a fine mode;

DESCRIPTION OF THE PREFERRED EMBODIMENTS

The preferred embodiments of the present invention will be described in detail hereinafter with reference to the accompanying drawings. The premise of the embodiments will be explained below.

Figure 1:
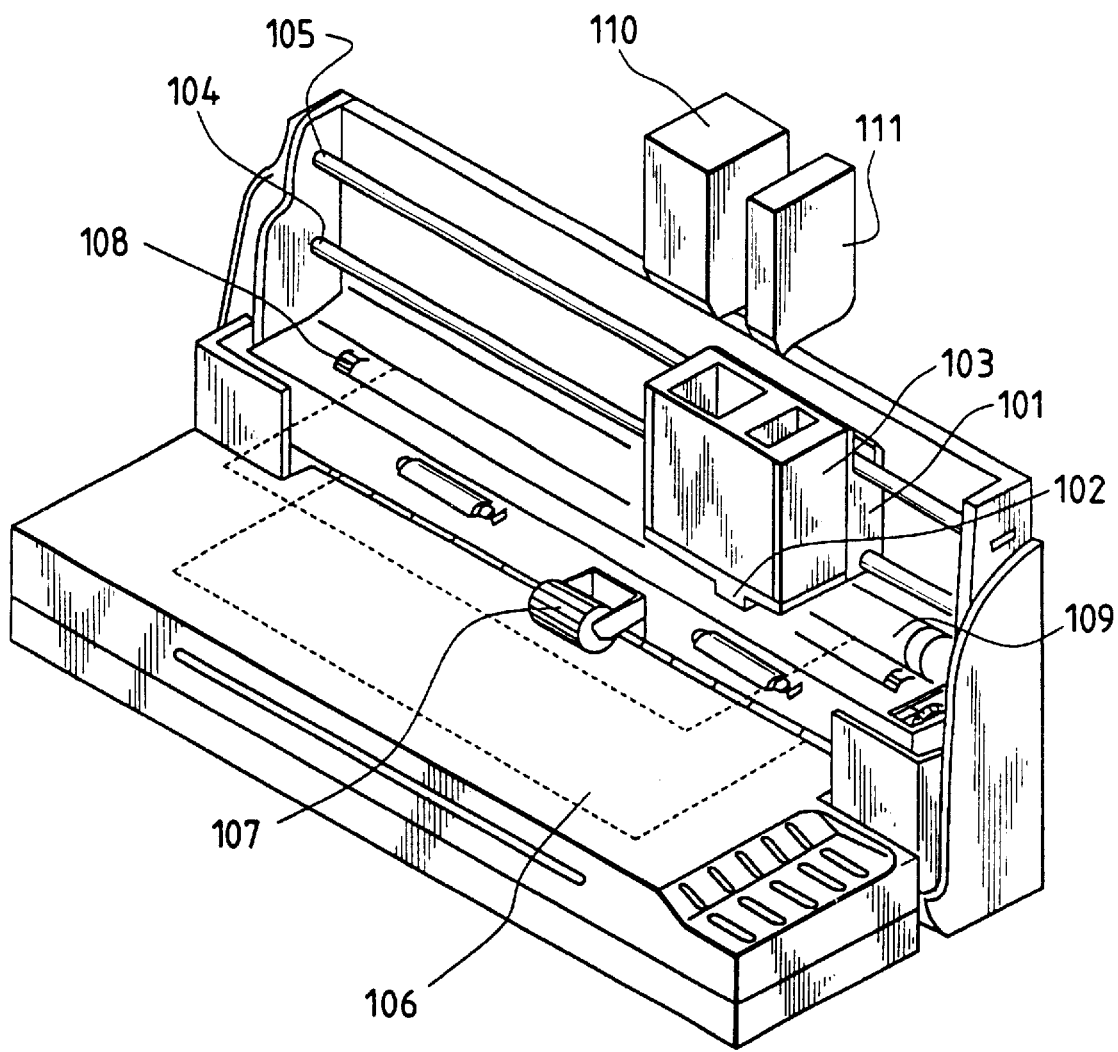
FIG. 1 is a perspective view of an ink jet recording apparatus to which the present invention can be applied.

FIG. 1 is a perspective view of a recording apparatus to which an ink jet recording method of the present invention is applied.

A carriage 101 carries a recording head 102 and a cartridge guide 103, and can be scanned along guide shafts 104 and 105.

A recording paper sheet 106 is fed into the main body apparatus by a paper supply roller 107, is then fed to a position in front of a paper feed roller 108 while being clamped between the paper feed roller 108, a pinch roller (not shown), and a paper pressing plate 109, and is subjected to a printing operation. Two different ink cartridges, i.e., a color ink cartridge 110 which stores three color inks, i.e., yellow (Y), magenta (M), and cyan (C) inks, and a black (Bk) ink cartridge 111 are prepared. These cartridges are independently inserted in the cartridge guide 103, and communicate with the recording head 102. The yellow, magenta, and cyan inks stored in the color ink cartridge 110 have a high penetration speed to a recording paper sheet so as to prevent ink blurring at a boundary of different colors upon formation of a color image. On the other hand, the black ink stored in the black ink cartridge 111 has a relatively lower penetration speed to a recording paper sheet than that of the three color inks, so that a black image has a high density and high quality with less blurring of the ink.

Figure 2A:
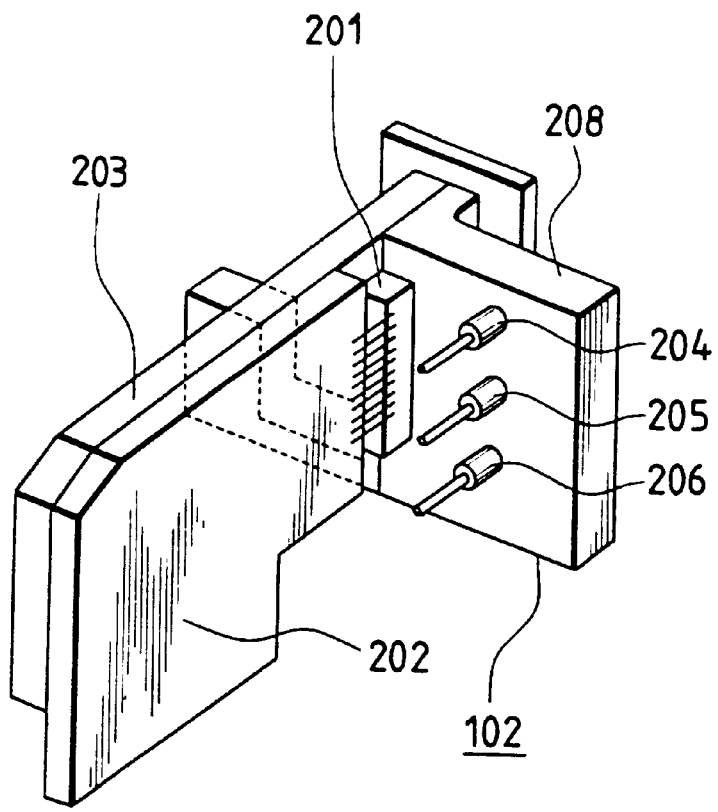
FIGS. 2A and 2B are perspective views showing a head mechanism of the ink jet recording apparatus to which the present invention can be applied.
Figure 2B:
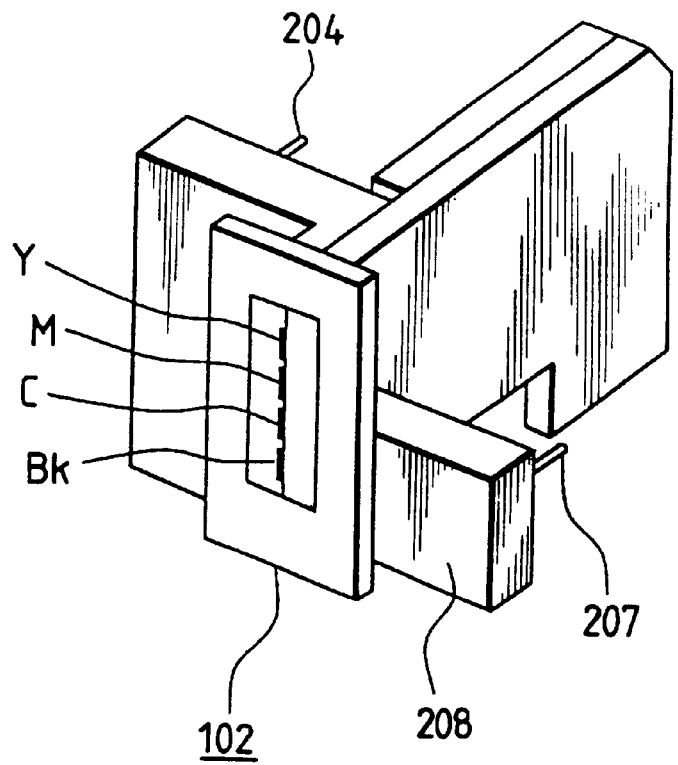

FIGS. 2A and 2B show the recording head 102. Yellow, magenta, cyan, and black ejection orifice groups are linearly arranged on the front surface portion of the recording head 102. Each of the yellow, magenta, and cyan ejection orifice groups has 24 ejection orifices, and the black ejection orifice group has 64 ejection orifices. The interval between two adjacent color groups is equal to or larger than the nozzle pitch.

Figure 6:
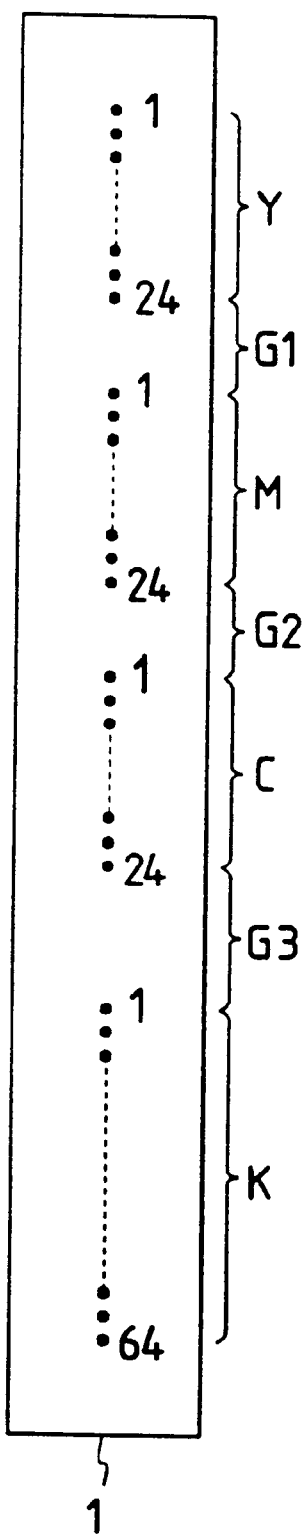
FIGS. 6 and 7 are front views of a recording head according to the embodiment of the present invention.

FIG. 6 is a view when the recording head 102 is viewed from a direction to be able to see the ejection orifices.

These ejection orifices respectively have ink channels communicating with the corresponding ejection orifices, and a common ink chamber for supplying an ink to these ink channels is arranged behind a portion where the ink channels are formed. In the ink channels corresponding to the ejection orifices, electro-thermal energy converting members for generating heat energy utilized to eject ink droplets from these ejection orifices, and electrode wiring patterns for supplying electric power to these converting members are arranged. The electro-thermal energy converting members and the electrode wiring patterns are formed on a substrate 201 (consisting of, e.g., silicon) by a film formation technique. The ejection orifices, the ink channels, and the common ink chamber are defined by stacking partition walls, a top plate, and the like, which consist of a resin or a glass material, on the substrate. A drive circuit for driving the electro-thermal energy converting members on the basis of a recording signal is arranged behind the common ink chamber in the form of a printed circuit board 202.

The silicon substrate 201 and the printed circuit board 202 project in a direction parallel to a single aluminum plate 203, and pipes 204 to 207 project from a plastic member 208 called a distributor which extends in a direction perpendicular to the silicon substrate. These pipes communicate with ink flow paths in the distributor, and the flow paths communicate with the common ink chamber.

The four ink flow paths for yellow, magenta, cyan, and black are formed in the distributor, and couple the common ink chamber to the corresponding pipes.

The yellow, magenta, and cyan ejection orifices formed on the recording head 102 together eject about 40 ng of ink, and the black (Bk) ejection orifices eject about 80 ng of ink.

The components of inks used in the present invention are as follows.

1. Y (yellow)

| | |
|---|---|
| C.I. Direct Yellow 86 | 3 parts |
| diethylene glycol | 10 parts |
| isopropyl alcohol | 2 parts |
| urea | 5 parts |
| acetylenol EH (Kawaken Chemical) | 1 part |
| water | balance |

2. M (magenta)

| | |
|---|---|
| C.I. Acid Red 289 | 3 parts |
| diethylene glycol | 10 parts |
| isopropyl alcohol | 2 parts |
| urea | 5 parts |
| acety.lenol EH (Kawaken Chemical) | 1 part |
| water | balance |

3. C (cyan)

| | |
|---|---|
| C.I. Direct Blue 199 | 3 parts |
| diethylene glycol | 10 parts |
| isopropyl alcohol | 2 parts |
| urea | 5 parts |
| acetylenol EH (Kawaken Chemical) | 1 part |
| water | balance |

4. Bk (black)

| | |
|---|---|
| C.I. Direct Black 154 | 3 parts |
| diethylene glycol | 10 parts |
| isopropyl alcohol | 2 parts |
| urea | 5 parts |
| water | balance |

In this manner, the penetration properties of C, M, and Y inks are improved as compared to Bk by adding 1% of acetylenol EH thereto. Additives also include another surface-active agent, alcohol, and the like.

Figure 3:
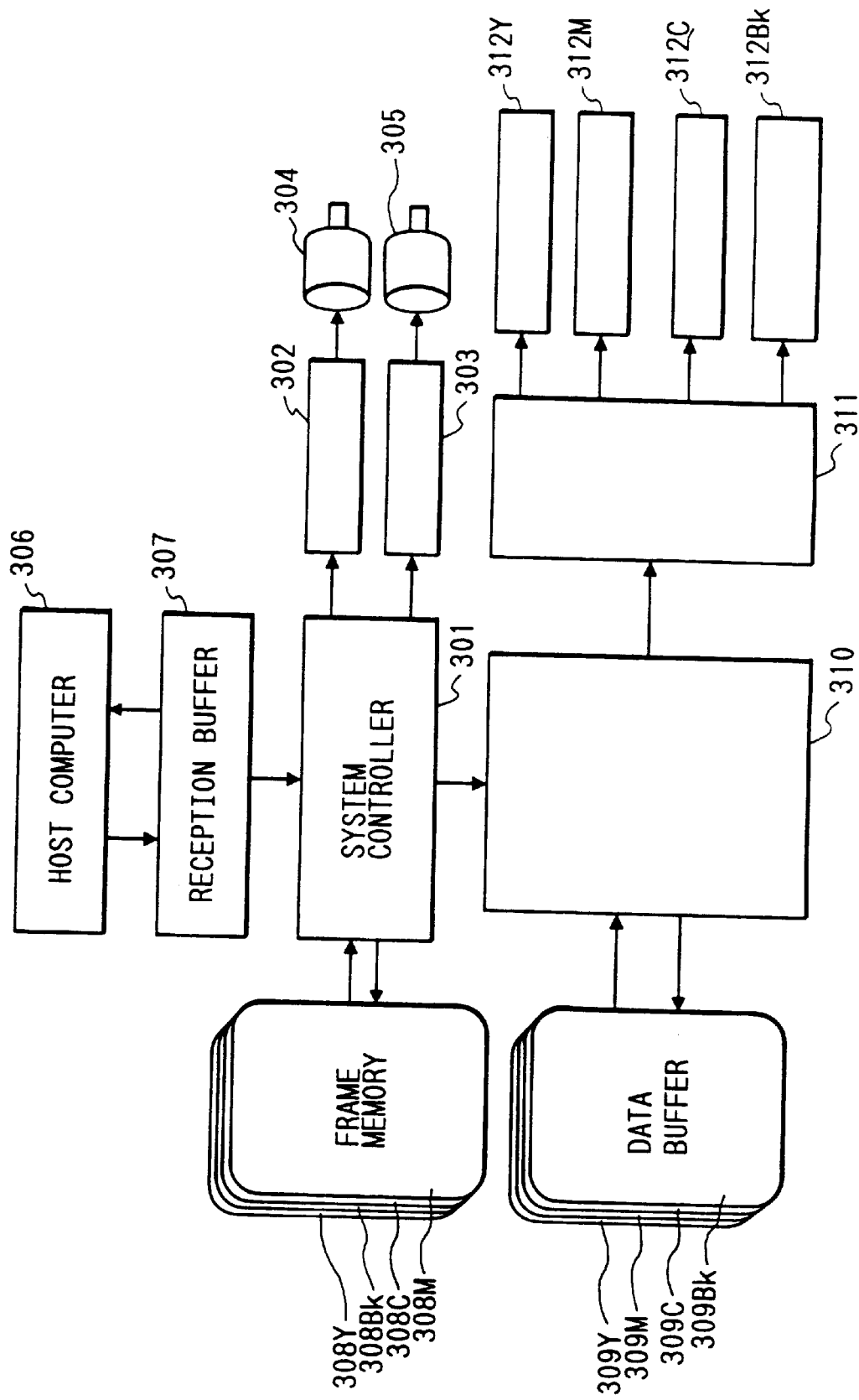
FIG. 3 is a block diagram showing a control circuit of the ink jet recording apparatus to which the present invention can be applied.

FIG. 3 is an electrical control block diagram of the above-mentioned color ink jet recording apparatus.

A system controller 301 controls the entire apparatus, and includes a microprocessor, a memory element (ROM) storing a control program, another memory element (RAM) used by the microprocessor upon execution of processing, and the like. A driver 302 drives the recording head in the main scanning direction, and a driver 303 similarly drives the recording head in the sub-scanning direction. Motors 304 and 305 respectively correspond to the drivers 302 and 303, and operate upon reception of information such as speeds, moving distances, and the like from the drivers.

A host computer 306 transfers information to be printed to a printing apparatus of the present invention. A reception buffer 307 temporarily stores data from the host computer 306 until the stored data are read out by the system controller 301. Frame memories 308 Y, 308 M, 308 C, and 308 Bk are used for developing data to be printed into image data, and each frame memory has a memory size required for printing. In this embodiment, each frame memory can store data for one print paper sheet. However, the present invention is not limited to this.

Data buffers 309Y, 309M, 309C, and 309Bk temporarily store data to be printed, and their storage capacities are determined in correspondence with the numbers of nozzles of corresponding recording head portions. A print controller 310 properly controls the recording head in accordance with commands from the system controller. For example, the controller 310 controls the ejection speed, the number of print data, and the like of the recording head. A driver 311 drives head portions 312Y, 312M, 312C, and 312Bk, and is controlled by signals from the print controller 310.

Figure 4:
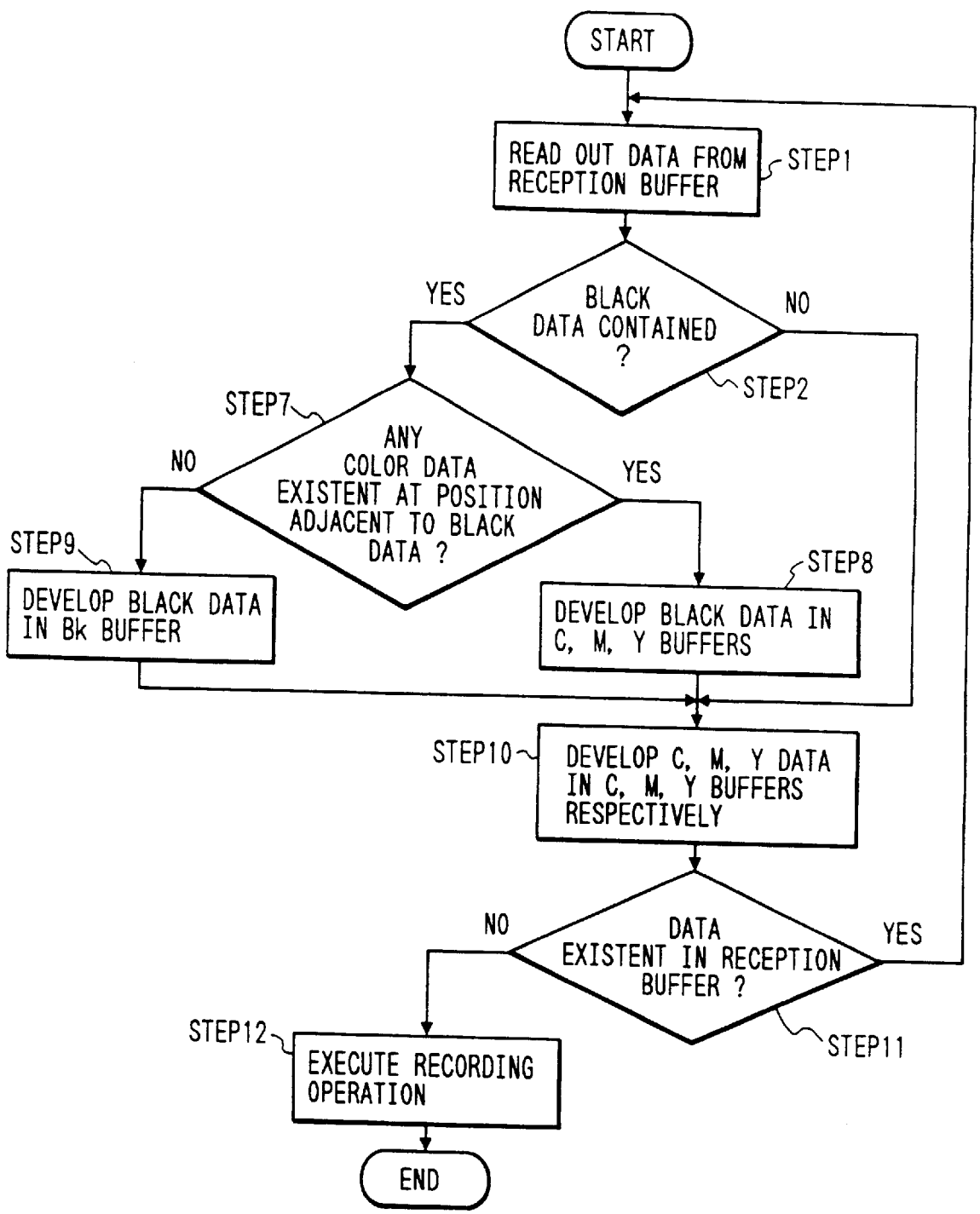
FIGS. 4 and 5 are flow charts for explaining an operation according to an embodiment of the present invention.

FIG. 4 is a flow chart showing an operation of this embodiment.

In step 1, data is transferred from the host computer 306, and the data stored in the reception buffer 307 is read by the system controller 301. In step 2, it is checked if the read recording data contains black data, or contains only color data other than black data. If the recording data contains black data, the flow advances to step 7; otherwise, the flow advances to step 10.

In step 7, the control pays attention to black data, and checks if any color record data is present at a position, adjacent to a black image recording area, of an image. Note that the position adjacent to a black image area is a position "above and/or below, and/or on the left side of and/or on the right side of" each pixel forming the black image area on a recording medium, and it is checked if at least one color record pixel forming a color image area at that position exists. A pixel pitch P is about 70.56 μm, and the recording density is 360 dpi. If a color pixel exists at a position adjacent to the black record pixel, the flow advances to step 8; otherwise, the flow advances to step 9.

In step 8, black record pixel data is developed on the C, M, and Y data buffers 309Y, 309M, and 309C for color recording. More specifically, black record pixel data is developed to C, M, and Y data. In this case, black is expressed by recording the C, M, and Y inks to overlap each other in place of the Bk ink. Since the C, M, and Y inks have high penetration properties, i.e., quick fixing characteristics, black pixels can be recorded without being mixed with an adjacent C, M, or Y image, or an adjacent R or G image obtained by mixing C, M, and Y. In step 9, black record pixel data is developed on the Bk data buffer 309 Bk for black recording.

In step 10, C, M, and Y color data are respectively developed on the corresponding color data buffers 309C, 309M, and 309Y. At this time, if data have already existed on the data buffers 309C, 309M, and 309Y in the operation in step 8, processing for calculating, as new data, OR data of the already existed data and data stored in this step is executed. In step 11, data is read out from the reception buffer to check if data to be printed exists in the reception buffer, and if data for one page is received. As a result of checking, if no print data exists, or if data for one page has already been received although print data exists, the flow advances to step 12. Otherwise, the flow returns to step 1. In step 12, the recording operation is performed using the recording head 102.

FIG. 9 shows an example of an image including both a black image and a color image. An image portion A includes black enlarged characters "X", "Y", and "Z" and an underline, which are represented by bit image data. An image portion B includes code data of black characters. An image portion C includes black bar graphs drawn on a yellow background portion, which are represented by bit image data. An image portion D includes code data of black characters drawn on a cyan background portion. An image portion E includes black bit image data, and a magenta image locally drawn on a background portion of the bit image data.

According to the method of the present invention, the image portion A has only black color but no background color. More specifically, since no color recording area contacts the black recording area, the image portion A is recorded by the black ink recording head for spraying (ejecting) the black ink. The image portion B is recorded by the black ink recording head as in the image portion A. In the image portions C and D, since black images are entirely surrounded by images in other colors, black portions contact other color recording portions. Therefore, the black images in the image portions C and D are recorded using the color inks, i.e., three Y, M, and C color inks. Of the black bit image data in the image portion E, since numeral "1" does not contact any color image, it is recorded by the black ink recording head. On the other hand, since the entire portion of numeral "3" contacts a magenta image, this character is recorded using the color ink recording heads. Since the portion of numeral "2" locally contacts the magenta image, this character is recorded using the color ink recording heads.

In this manner, when a black image recording area is isolated, and no other colors are recorded around this area, this area is recorded using the Bk ink which has a high recording density and suffers from less feathering. When a black image recording area is not isolated, i.e., the black image recording area contacts or overlap at least a portion of another color image area, the black image recording area is recorded using the C, M, and Y inks, thus recording a high-quality color image free from color blurring among black and other colors.

In the above-mentioned embodiment, the recording head adopts a recording method wherein bubbles are generated in an ink by the electro-thermal energy converting members, and the ink is caused to fly by the bubbles. However, the present invention can also be applied to a so-called piezo type ink jet recording method wherein an ink is caused to fly by electro-mechanical energy converting members.

A technique of discriminating whether or not color recording data exists at a position adjacent to a black image recording area is realized in a software manner. However, the present invention is not limited to this. For example, such a technique may be realized in a hardware manner. In this case, the processing speed can be increased although hardware cost increases.

Figure 5:
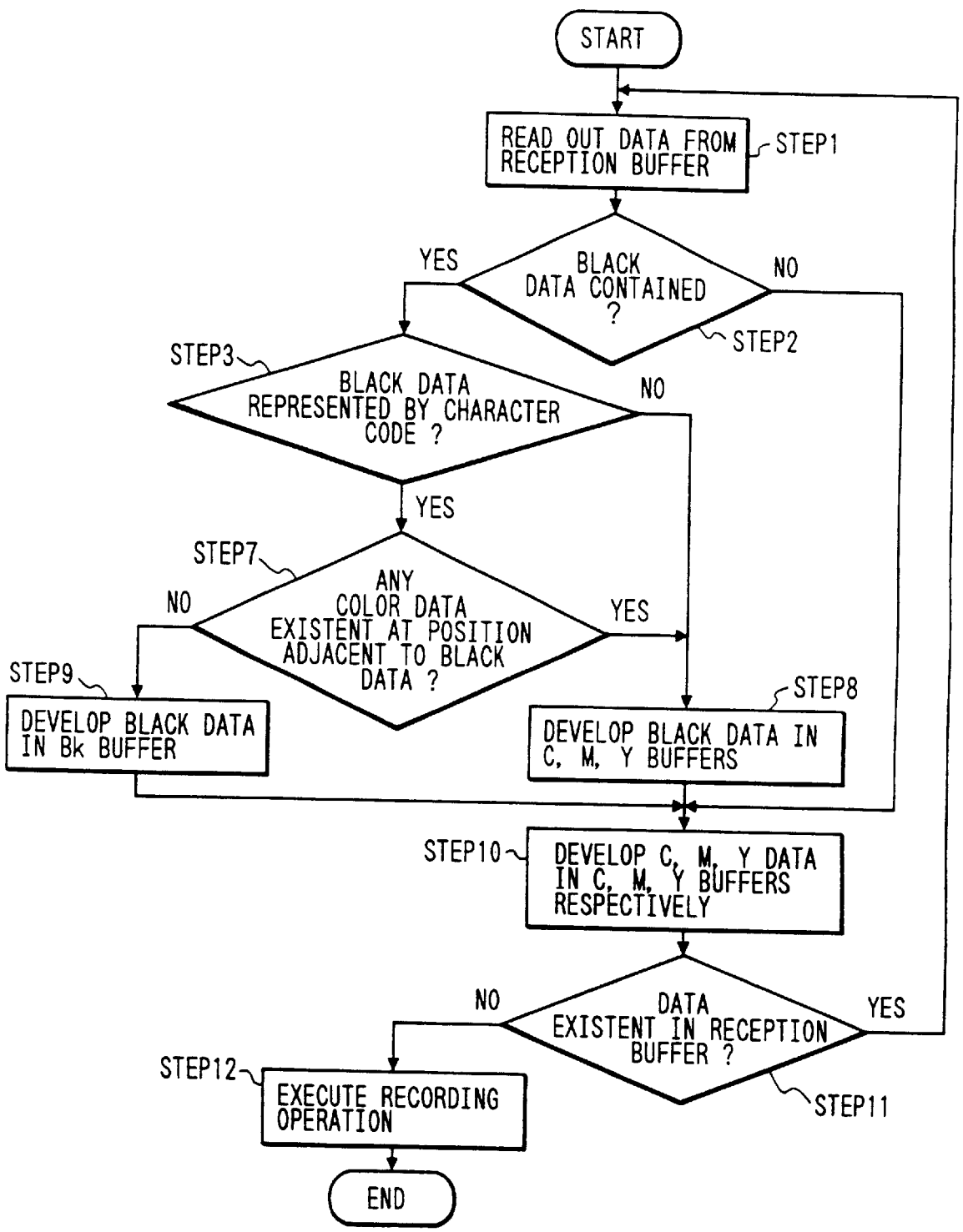

In this embodiment, it is checked for all the black image recording areas if other color data are recorded around the black image recording area. However, a calculation for achieving this checking operation requires a relatively long period of time for a recording method which aims at higher-speed recording processing. Thus, as shown in FIG. 5, the above-mentioned processing may be performed for only character codes in black image recording areas to achieve high-speed calculation processing. In FIG. 5, step 3 is added to the steps shown in FIG. 4. If it is determined in step 3 that a black image recording area of interest is represented by a character code, the same processing as in FIG. 4 is executed. However, if a black image recording area of interest is not represented by a character code but by, e.g., bit image data, the flow advances to step 8, and black record pixel data is developed on the C, M, and Y data buffers for color recording.

With this processing as well, high quality of at least black characters can be maintained as compared to the conventional method, and high-speed recording can be realized.

In this embodiment, in step 7 in FIG. 4, the position adjacent to a black image recording area is a position "above and/or below, and/or on the left side of and/or on the right side of" each pixel forming the black image recording area on a recording medium. In this case, a position range separated by P or less is checked with respect to the pitch P of record pixels. However, this range must be widened in correspondence with inks or recording media to be used.

An experiment for recording data on many kinds of normal paper sheets using the inks of the present invention was performed. In this experiment, the checking range was defined by positions X·P around a lack image recording area, and X=√2, i.e., positions "above and/or below, on the left side of and/or on the right side, on the upper right side of and/or on the upper left side, and/or on the lower right side of and/or on the lower left side of" a black pixel of interest were taken into consideration. Then, positions up to X=2 were considered. Similarly, X=2√2 was set. In this manner, upon execution of processing considering up to X=4√2, the effect of the present invention appeared in most kinds of normal paper sheets.

As can be understood from the above description, the position adjacent to a black image recording area of interest indicates a case wherein at least one color record pixel forming a color image area exists at a recording position within X·P (P is the minimum record pixel pitch) with respect to each pixel forming a black image area on a recording medium, and X which satisfies 4√2≧X≧1 is effective for the present invention.

Alternatively, it is checked if a color (C, M, and/or Y) image area exists within a range of N pixels (N=1, 2, 3, 4) adjacent to a black image area of recording data. Thus, one of a recording mode using the Bk ink and a recording mode using the C, M, and Y inks is selected in correspondence with the checking result. In the former mode (a color image area exists), Bk color is recorded using the C, M, and Y inks; in the latter mode (no color image area exists), Bk color is recorded using the Bk ink. This method is also effective for the present invention.

In this embodiment, the apparatus comprises the frame buffers each for recording one page. However, the present invention can also be applied to an apparatus which comprises line buffers in place of the frame buffers.

In step 7 in FIG. 4, the position adjacent to the black image area is defined as a position "above and/or below, and/or on the left side of and/or on the right side of" each pixel forming the black image area on a recording medium. In addition to this definition, it is also defined that the black image recording area is not located adjacent to other colors in an effective recording area of the line buffer, thus allowing the above-mentioned application.

As a matter of course, in this case, if it is determined in step 11 that the data buffer for storing data for one main scan line becomes full of data, a recording operation is performed, and the next data in the reception buffer is read.

In this embodiment, the nozzle arrangement of the recording head shown in FIG. 6 has been exemplified. However, the present invention is not limited to this nozzle arrangement.

Figure 7:
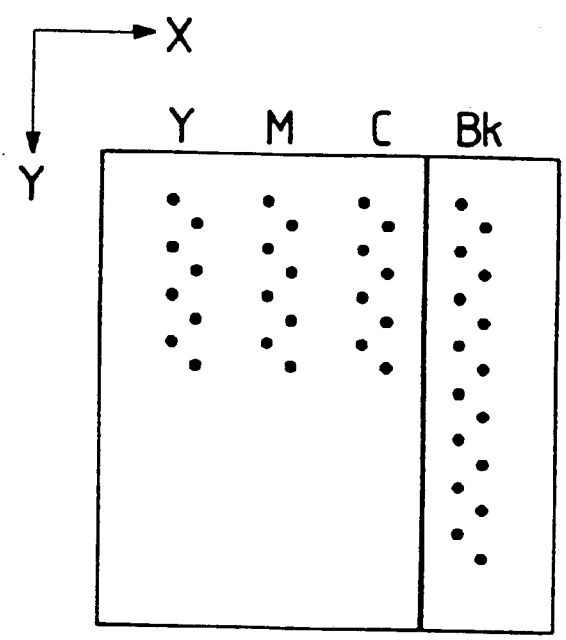

For example, as shown in FIG. 7, Ny (Ny is a positive integer) nozzles almost linearly arranged in the vertical (Y) direction x Nx (Nx is a positive integer) nozzles arranged in the horizontal (H) direction for each color may be arranged in correspondence with a plurality of colors. FIG. 7 shows a case wherein Ny=4 for CMY, Ny=8 for Bk, and Nx=2. In this head structure, a CMY portion and a Bk portion can be separated.

Figure 8B:
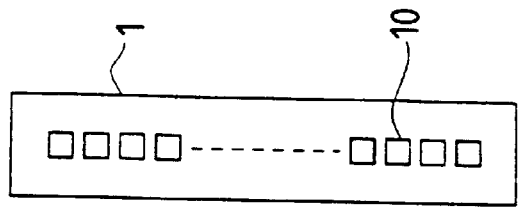
FIGS. 8A and 8B are respectively a perspective view and a plan view showing another ink jet recording apparatus to which the present invention can be applied.
Figure 8A:
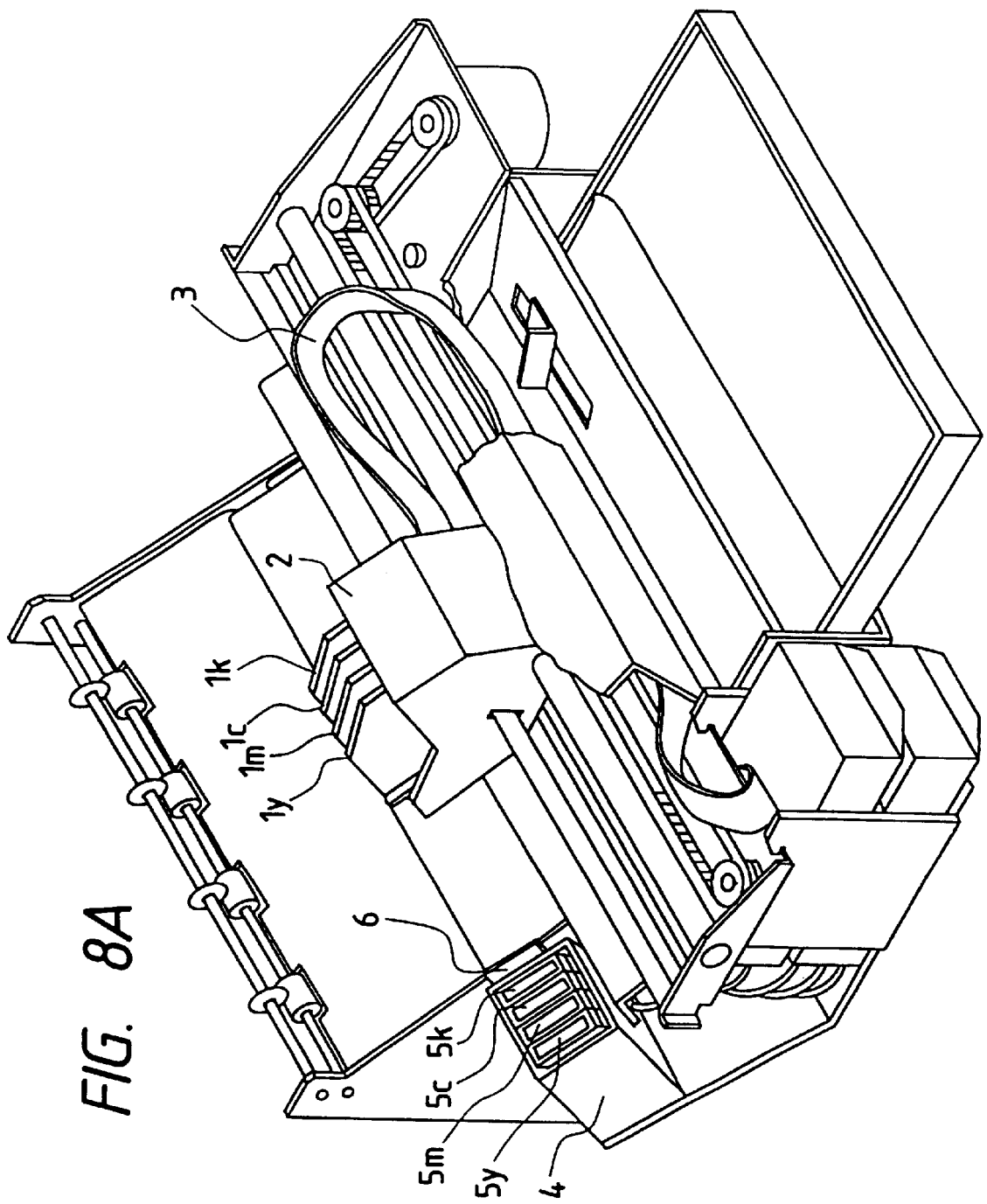

FIG. 8A is a perspective view showing another printer to which a color ink jet recording method is applied. The printer shown in FIG. 8A comprises a yellow ink recording head 1y, a magenta ink recording head 1m, a cyan ink recording head 1c, a black ink recording head 1k, a carriage 2 which carries the recording heads, a flexible cable 3 for supplying electrical signals from a printer main body to the recording heads, a cap unit 4 having a recovery means, cap members 5y, 5m, 5c, and 5k corresponding to the recording heads 1y, 1m, 1c, and 1k, a wiper blade 6 consisting of a rubber member, and a recording paper sheet 7 which is held to oppose the recording heads.

FIG. 8B shows one of the four recording heads arranged in the printer. Sixty-four ejection orifices 10 are formed on a portion, opposing a recording paper sheet, of the recording head at a density of 360 orifices per inch (360 dpi). An ink channel communicates with each of these ejection orifices 10, and a common ink chamber for supplying inks to the ink channels are arranged behind a portion where the ink channels are formed. Electro-thermal converting elements for generating heat energy utilized to eject ink droplets from the ejection orifices, and electrode wiring patterns for supplying electric power to the converting elements are arranged in the ink channels corresponding to the ejection orifices.

(First Embodiment)

In the above embodiment, processing for recording Bk using C+M+Y inks is executed in step 8. Alternatively, the recording frequencies of C, M, and Y are properly decreased, and Bk is expressed by uniformly recording C, M, and Y as a whole, thus obtaining a new effect. Originally, 80 ng of Bk ink and 40 ng of C, M, or Y ink are ejected, while a total of 120 ng of inks are ejected when Bk is recorded by C+M+Y. As a result, the inks are ejected in an amount larger than 80 ng. The object of this embodiment is to eliminate this drawback.

A method of developing black record pixel data on the C, M, and Y data buffers 309C, 309M, and 309Y for color recording in step 8 will be described in detail below.

Figure 10:
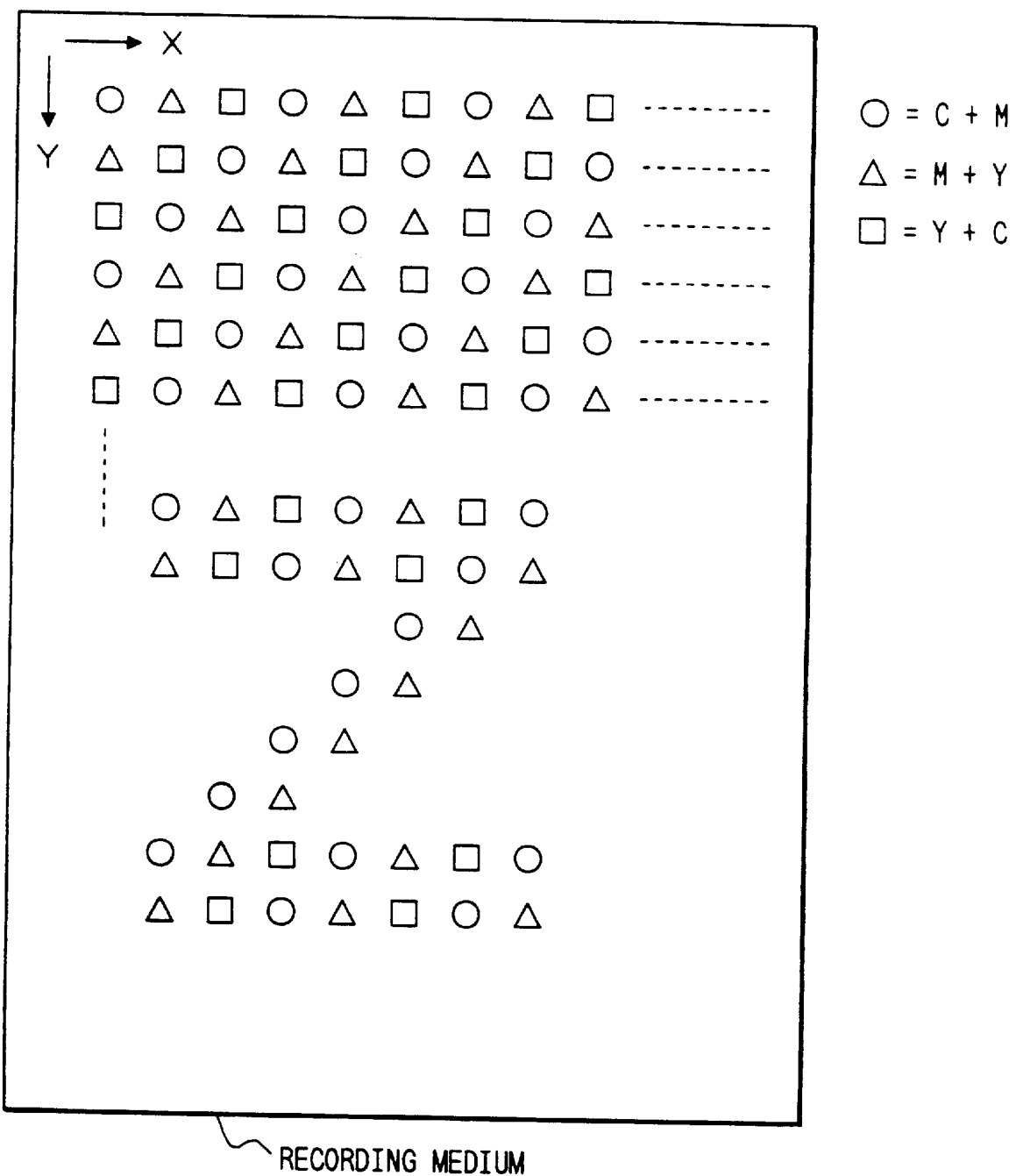
FIGS. 10 to 12 are views showing various patterns used for recording a Bk image using C, M, and Y inks according to the first embodiment of the present invention.

①: FIG. 10 shows the entire A4-size recording medium, and an enlarged view of a color-development pattern in step 8. Each of ○, Δ, and □ marks represents a minimum record pixel. The pitch of these marks is about 70.6 μm in both the X and Y directions. The ○, Δ, and □ marks represent a predetermined pattern in which ○ is recorded by C+M, Δ is recorded by M+Y, and □ is recorded by Y+C when Bk record pixel data is developed into C, M, and Y in step 8. More specifically, for example, a character "Z" is recorded, as shown in FIG. 10. Although the pattern in FIG. 10 is expressed by a set of several record pixels since it is illustrated in an enlarged scale, an actual pattern is recorded by a set of a large number of record pixels. Therefore, C, M, and Y are uniformly distributed as a whole to record Bk.

Figure 11:
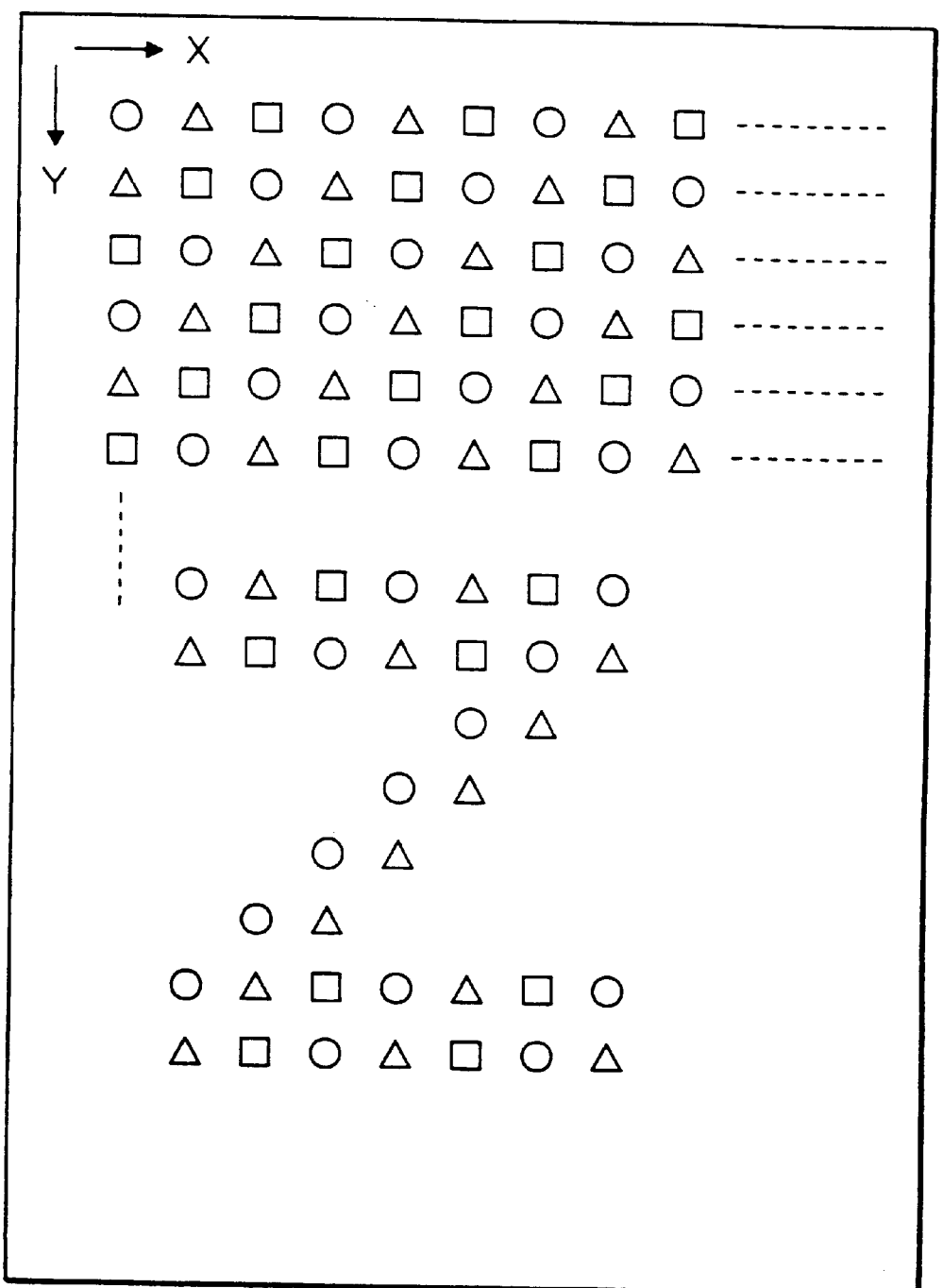

②: Furthermore, this pattern may be a predetermined pattern in which ○ is recorded by C, Δ is recorded by M, and □ is recorded by Y, as shown in FIG. 11. In this case, the amounts of inks to be ejected can be smaller than those in ①.

Figure 12:
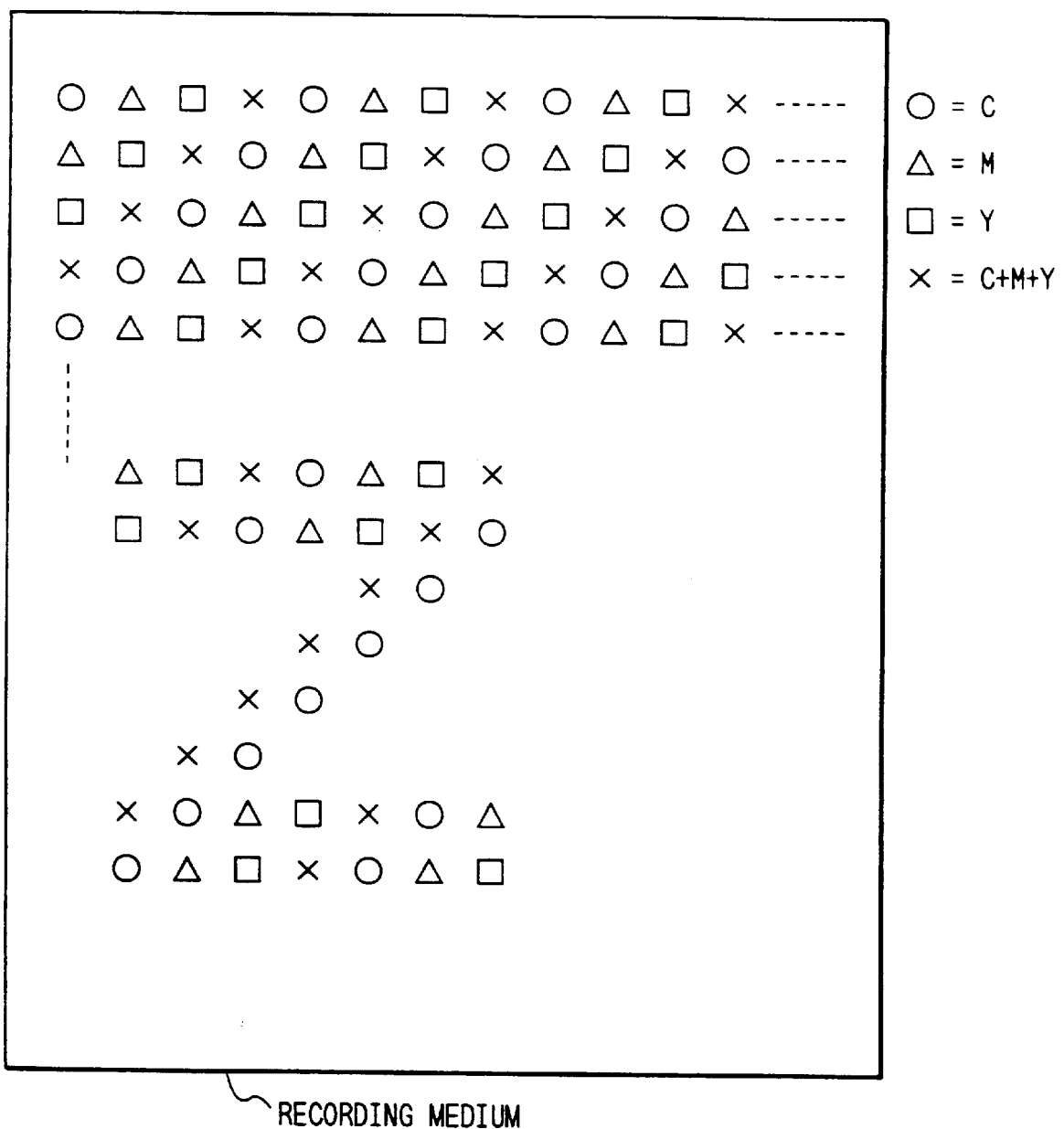

③: Moreover, this pattern may be a predetermined pattern in which ○ is recorded by C, Δ is recorded by M, □ is recorded by Y, and x is recorded by C+M+Y, as shown in FIG. 12. In this case, the amounts of inks to be ejected can be smaller than those in ①, and Bk having a hue closer to original Bk than that obtained by ② can be obtained.

In this manner, in place of recording Bk by C+M+Y, since the recording frequencies of C, M, and Y are properly decreased to uniformly record C, M, and Y as a whole, the total sum of the ink ejection amounts onto a recording medium can be decreased. This effect leads to the following merits.

1. The ink consumption amount can be saved, and running cost can be reduced.

2. The fixing characteristics of the inks can be improved.

3. When a large amount of ink becomes attached to a recording medium, the recording medium cockles, i.e., a so-called cockling phenomenon occurs. Generation of the cockling phenomenon can be minimized.

The development pattern is not limited to the above-mentioned patterns. As long as a pattern can uniformly distribute C, M, and Y, the same effect as described above can be obtained.

(Second Embodiment)

In the first embodiment, C, M, and Y are properly distributed and recorded using the pattern for uniformly distributing C, M, and Y as a whole. Alternatively, upon development of Bk into C, M, and Y, Bk may be developed into C+M+Y data, so that the ink ejection amount of at least one of C, M, and Y is smaller than the normal amount. Furthermore, in combination with the recording method of the first embodiment for properly distributing and recording C, M, and Y, Bk may be developed into C+M+Y data, so that the ink ejection amount of at least one of C, M, and Y is smaller than the normal amount. The same effect as in the above embodiment can be obtained in decreasing the ink ejection amount of a Bk recording portion.

In order to relatively decrease the ink ejection amount, the energy of driving pulses for driving the electro-mechanical or electro-thermal converting elements of the recording head upon ejection of the ink is relatively decreased. More specifically, the pulse width and/or pulse voltage of the drive pulse is relatively decreased.

In a recording method wherein one pixel is normally formed by two droplets of ink, the object can be similarly achieved by forming one pixel by one drop of ink.

(Third Embodiment)

④: In the first embodiment, Bk is recorded after it is developed into C, M, and Y using the predetermined pattern. Furthermore, a user may select a desired one of patterns in correspondence with various recording media.

For this purpose, before recording data is transferred, the host computer 306 transfers data for determining a pattern to the system controller 301 via the reception buffer 307. When the data for determining the pattern is not transferred, a pre-selected pattern (e.g., the pattern shown in FIG. 10) is used.

If a recording medium has high fixing characteristics, when the pattern for developing Bk into C+M+Y is selected, Bk having a higher density can be obtained even at that portion.

If a recording medium has poor fixing characteristics like a transparency used in an overhead projector, when a pattern for selecting C, M, and Y in turn to record Bk (FIG. 11) is selected, the total ink ejection amount can be decreased, and recording with high fixing characteristics can be realized. For a recording medium having intermediate characteristics, a pattern for selecting C+M, M+Y, and Y+C in turn to record Bk (FIG. 10) is selected.

In this manner, when a user is allowed to select a pattern for developing Bk into C, M, and Y, high-quality recording can be realized for various recording media.

(Fourth Embodiment)

In the third embodiment, a user is allowed to select a pattern for developing Bk into C, M, and Y. However, a means for discriminating a recording medium may be arranged to attain automatic selection of the pattern.

More specifically, when a recording medium is a transparency used in an overhead projector, for example, the recording medium is discriminated by a means disclosed in Japanese Laid-Open Patent Application No. 2-227271. In this case, since this medium has poor fixing characteristics, the pattern for selecting C, M, and Y in turn to record Bk (FIG. 11) is selected. As a result, the total ink ejection amount is decreased, and recording with high fixing characteristics can be automatically attained.

(Fifth Embodiment)

In the first embodiment, Bk data is developed into C, M, and Y using the predetermined pattern in step 8. However, the present invention is not limited to the predetermined to obtain the effect of the present invention.

Bk data may be developed using a pattern which is randomly determined by eight different data, i.e., Non (not recorded), C, M, Y, C+M, M+Y, Y+C, and C+M+Y. This pattern can be realized by developing Bk in accordance with values which are selected from the eight different data using a random number generation routine of the system controller 301 in step 8.

As described above, according to the first to fifth embodiments, Bk can be recorded by C, M, and Y using a proper pattern which is selected by a user or automatically depending on a recording medium. Therefore, high-quality recording with high fixing characteristics, less cockling, and a small ink use amount can be realized.

(Sixth Embodiment)

Figure 13:
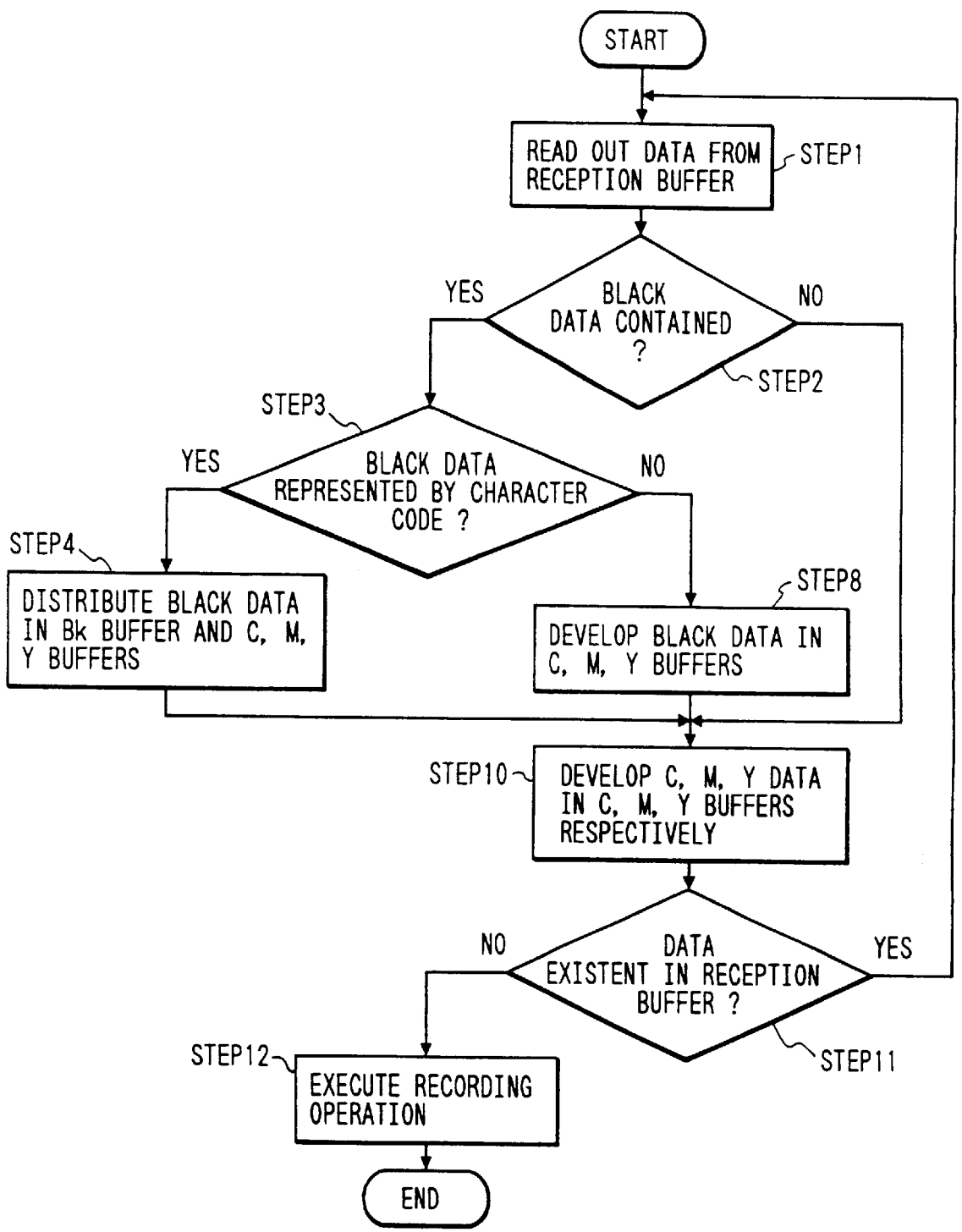
FIGS. 13, 15 and 16 are flow charts for explaining operations according to the sixth to eighth embodiments of the present invention.
Figure 14A:
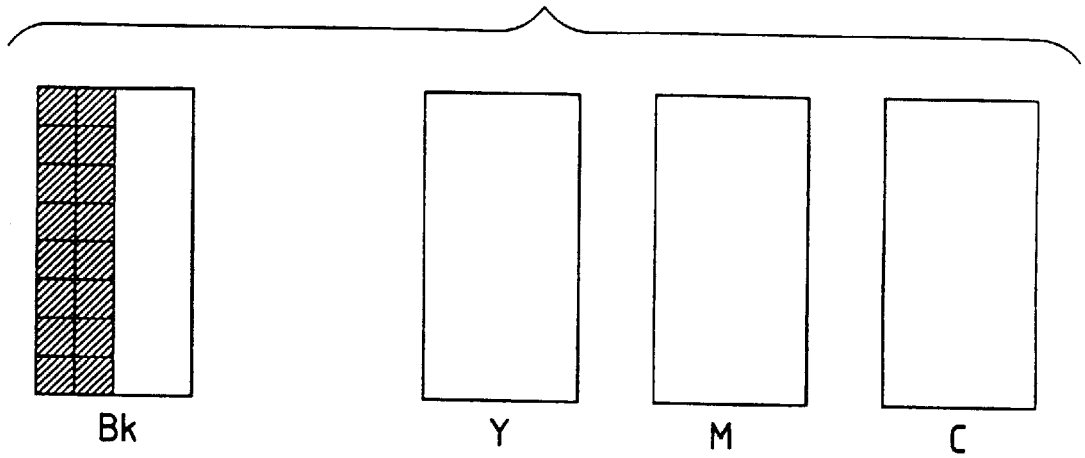
FIGS. 14A and 14B are views for explaining the operation of the sixth embodiment.
Figure 14B:
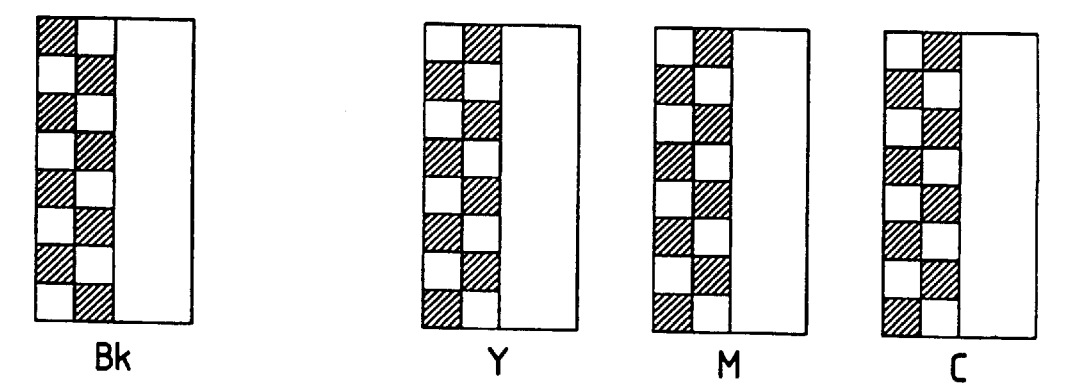

FIG. 13 is a flow chart showing a print operation according to the sixth embodiment. FIGS. 14A and 14B are views for explaining a processing state of recording data.

In this embodiment, whether or not data supplied as code information from the host computer is a character is discriminated, and pixels constituting a character are divided into pixels for printing Y, M, and C color inks, and pixels for printing a Bk ink in accordance with a specified pattern.

Steps 1 to 3 are the same as those in FIG. 5 described above. It is checked in step 3 if black data is data sent as a character code. If YES in step 3, the flow advances to step 4; otherwise, the flow advances to step 8.

In step 4, black data are distributed to the Bk buffer (309K) and the Y, M, and C buffers (309Y, 309M, and 309C). As a method of distributing black data, as shown in FIG. 14B, 50% of data are distributed to the Bk buffer, and the other 50% of data are distributed to the Y, M, and C buffers in accordance with a checker pattern. Note that FIG. 14A shows data developed in step 2.

In step 8, black data are written in the Y, M, and C buffers.

Steps 10 to 12 are the same as those in FIG. 5.

In this embodiment, 50% each of black data are distributed to the Bk buffer and to the Y, M, and C buffers in accordance with the checker pattern in step 4. However, the pattern for distributing the pixels is not limited to this. For example, black data may be randomly distributed to the buffers.

(Seventh Embodiment)

The seventh embodiment of the present invention will be described below. In this embodiment, whether or not data supplied as code information from the host computer is a character is discriminated as in the sixth embodiment, and when another color data exists at a position adjacent to black character data, Y, M, and C color inks are printed on all pixels constituting the character. In addition, 1/n (¼ in this embodiment) of the pixels constituting the character are randomly selected, and a black ink is printed on the selected pixels. This embodiment will be described in more detail below.

Figure 15:
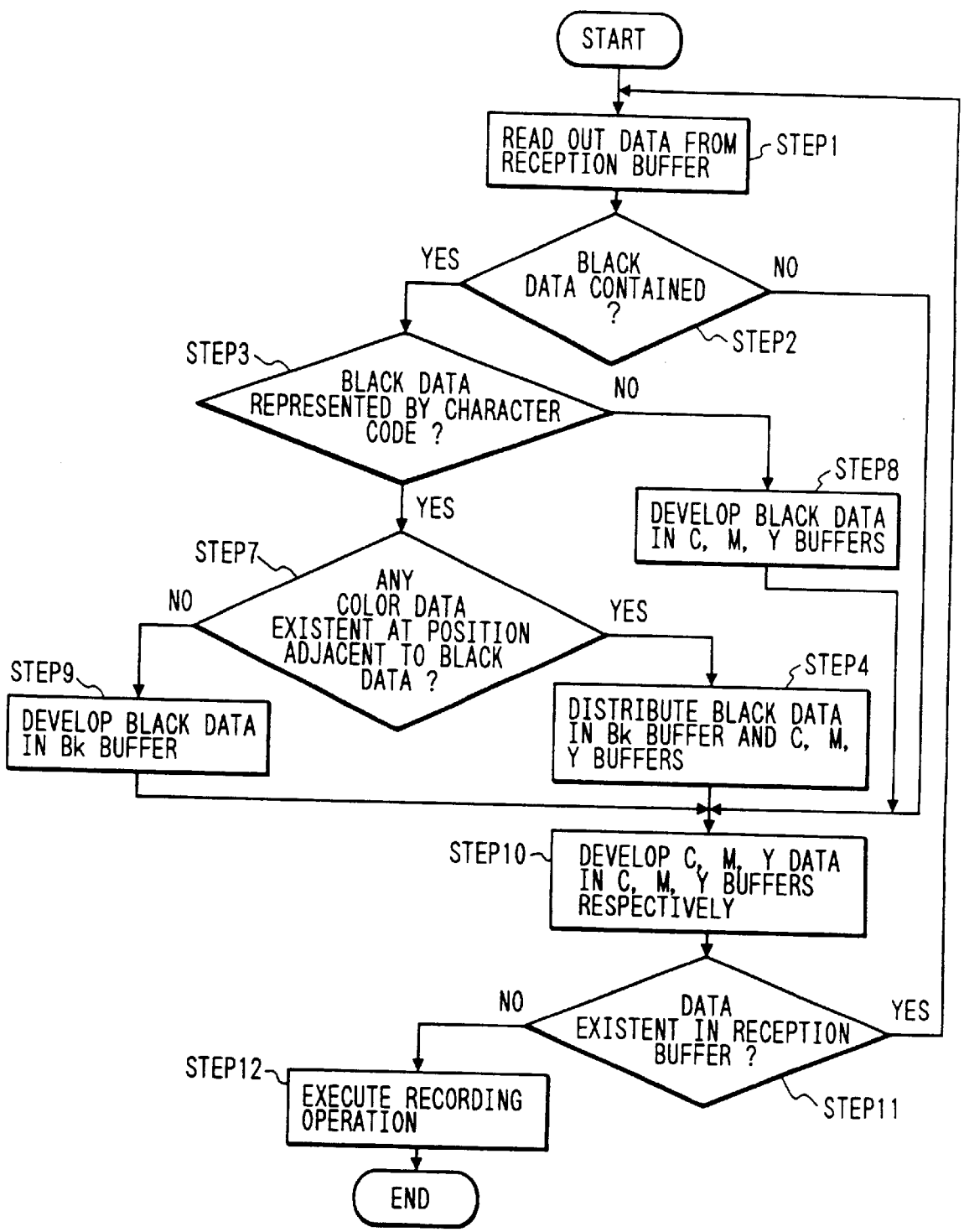

Recording is performed using the same apparatus as in the first embodiment according to the flow chart in FIG. 15 showing the print operation.

Steps 1, 2, 3, and 8 are the same as those in FIG. 13.

If it is determined in step 3 that black data is data sent as a character code, the flow advances to step 7.

In step 7, it is checked if another color data exists at a position adjacent to black data. If YES in step 7, the flow advances to step 4; otherwise, the flow advances to step 9.

In step 4, black data are distributed to the Bk buffer and the Y, M, and C buffers. As a method of distributing Bk data, all black data are written in the Y, M, and C buffers, and randomly selected 25% of data are written in the Bk buffer. In step 9, black data are written in the Bk buffer.

Steps 10 to 12 are the same as those in FIG. 13.

According to the method of this embodiment, since a black character which is not located at a position adjacent to other colors (i.e., free from bleeding) is recorded using only the black ink (steps 7 and 9), the quality of characters can be further improved.

In this embodiment, pixels for printing the black ink are randomly selected. However, pixels for printing the black ink may be selected in accordance with a specified pattern.

(Eighth Embodiment)

The eighth embodiment of the present invention will be described below. In this embodiment, a character area and an image area are discriminated by image recognition. In this case, when a black character is determined, Y, M, and C color inks are printed on all pixels constituting the character, 1/n (¼ in this embodiment) of the pixels are randomly selected, and a black ink is printed on the selected pixels. This embodiment will be described in detail below.

Figure 16:
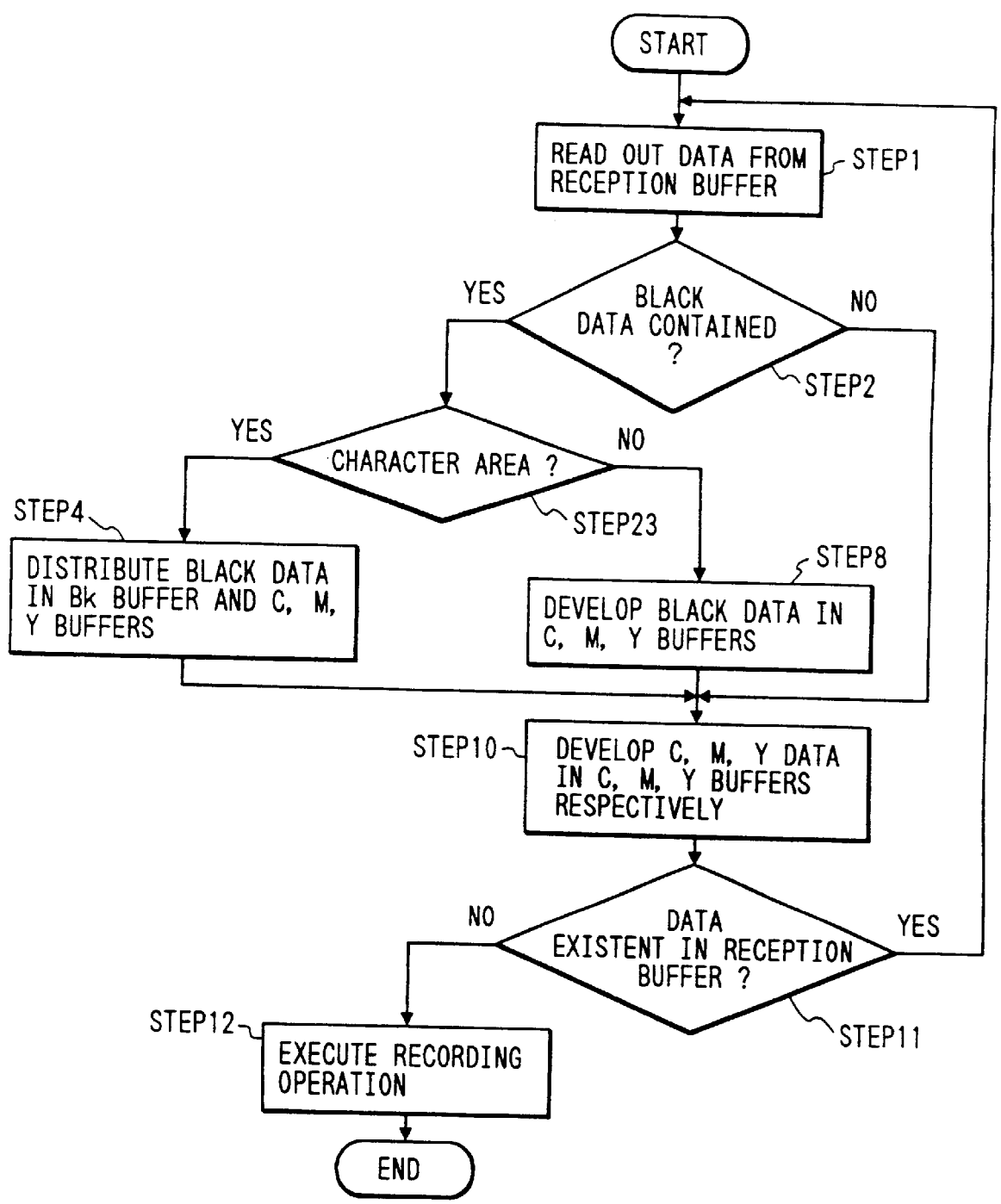

Recording is performed using the same apparatus as in the sixth embodiment in accordance with the flow chart in FIG. 16 showing the print operation.

In this embodiment, step 3 in FIG. 13 is replaced by step 23.

In step 23, an image area and a character area are discriminated by a known image processing technique. If the image area is detected, the flow advances to step 8; if the character area is detected, the flow advances to step 4. In this embodiment, this processing is executed in a software manner by an internal program in the system controller 301. However, in order to increase the processing speed, an electrical circuit as hardware may be arranged, and the processing may be executed by this circuit.

In step 4, black data are distributed to the Bk buffer and the Y, M, and C buffers. As a method of distributing black data, all black data are written in the Y, M, and C buffers, and randomly selected 25% of data are written in the Bk buffer. In step 8, black data are written in the Y, M, and C buffers.

Steps 10 to 12 are the same as those in FIG. 13.

According to the method of this embodiment, since a character area is discriminated by image processing in place of detecting the presence/absence of code information, high-quality recording of even black characters developed into bit data in the host computer or black characters read by a scanner can be realized.

In the sixth to eighth embodiments, the black ink is printed on some of pixels constituting a black character. Alternatively, the black ink may be printed on all the pixels constituting a black character, and the Y, M, and C color inks may also be printed.

As described above, according to the sixth to eighth embodiments, a character and an image are discriminated, and when a black character is recorded, recording is performed using both the black ink and the color inks. Therefore, high-quality color recording free from ink blurring among black and other colors can be realized while maintaining high recording quality of a black character.

(Ninth Embodiment)

Figure 17:
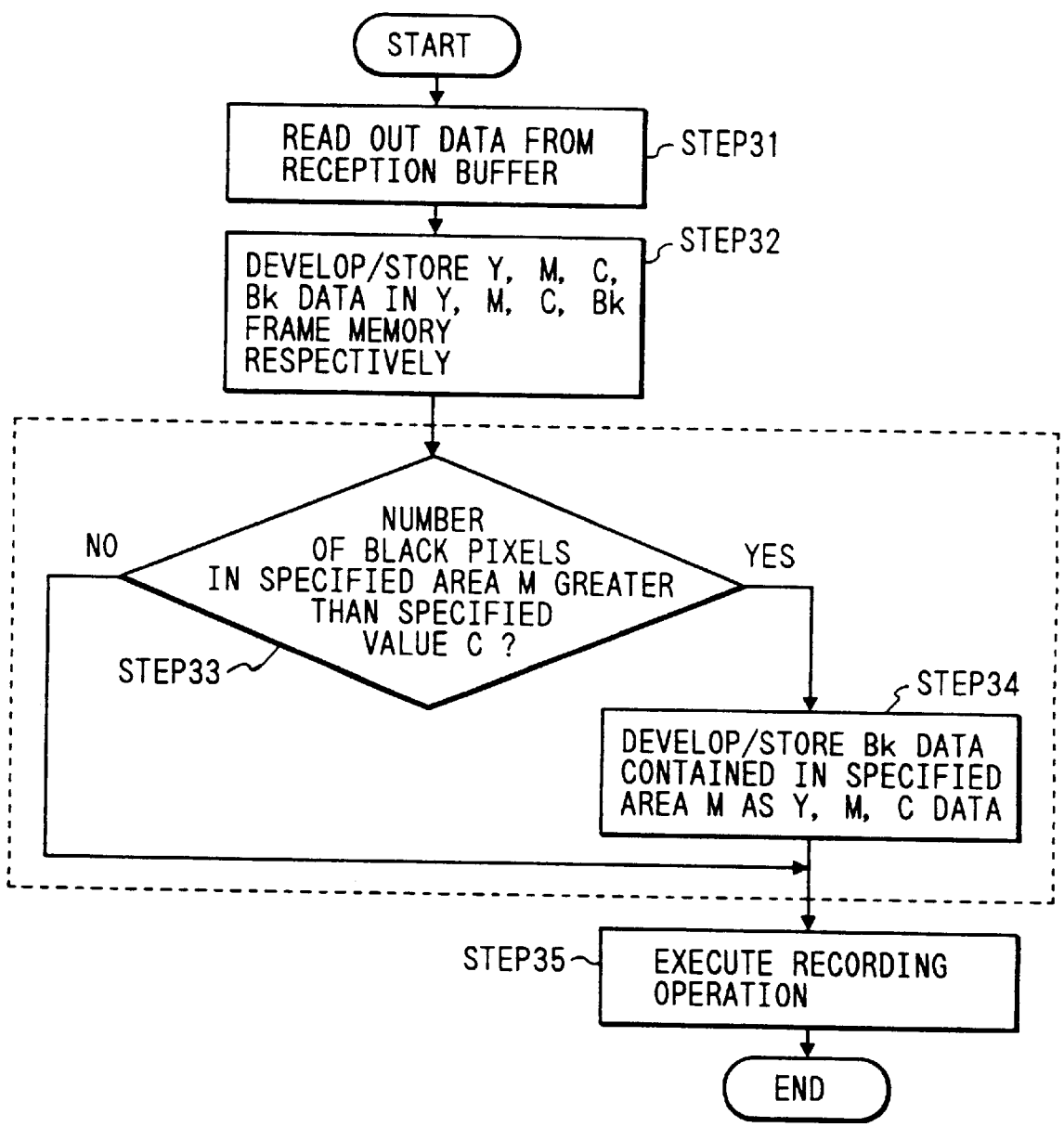
FIG. 17 is a flow chart showing an operation according to the ninth embodiment of the present invention.

FIG. 17 is a flow chart showing an operation of the ninth embodiment. Steps surrounded by a broken line correspond to the characteristic features of this embodiment.

In step 31, data is transferred from the host computer 306, and data stored in the reception buffer 307 is read by the system controller 301. In step 32, the read data is developed into C, M, Y, and Bk data, and the developed data are stored in the frame memories 308C, 308M, 308Y, and 308Bk.

Figure 18:
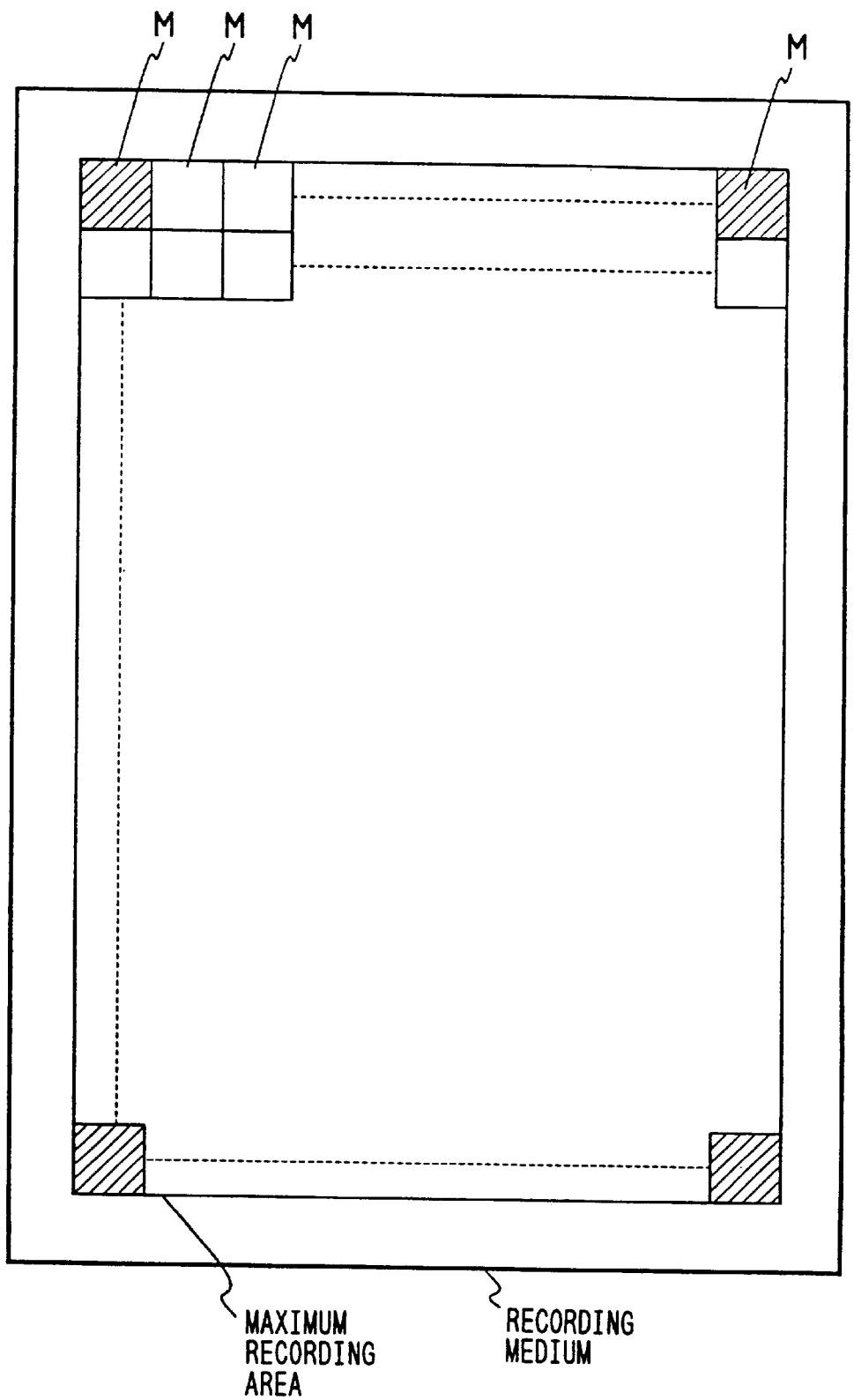
FIG. 18 is a view showing the relationship between the recording area and the specified area.

In step 33, a recording area on a recording medium is divided into specified areas M, and the black recording frequency in each specified area M is checked. More specifically, as shown in FIG. 18, recording data for one A4-size sheet stored in the frame memory is divided into specified areas M each of which consists of a 4×4 dot matrix, i.e., a total of 16 pixels, and the number of Bk record pixels in each specified area M is counted. In this step, it is checked if the count value is greater than or is equal to or smaller than a specified value C (2 in this embodiment). If NO in step 33, i.e., if the count value is equal to or smaller than the specified value C, the flow advances to step 35. In this case, the same recording as in a conventional method is executed, i.e., black is recorded using the Bk ink. However, if YES in step 33, i.e., if the count value is greater than the specified value C, the flow advances to step 34.

In step 34, Bk data in the specified area M is re-developed into C, M, and Y data to remove the Bk data. More specifically, black is recorded using the C+M+Y inks. Thereafter, the flow advances to step 35. In step 35, the same recording operation as in the conventional method is executed, and thereafter, a series of operations end.

Note that the processing in step 34 pays attention to the fact that blurring between the Bk ink and other color inks on a recording medium, i.e., generation of bleeding depends on the frequency of black pixel recording in the specified recording area M. More specifically, the processing pays attention to a phenomenon that when the frequency of black pixel recording is higher than a predetermined value, bleeding easily occurs; conversely, when the frequency is lower than the predetermined value, bleeding hardly occurs.

The processing in step 34 is executed by an internal program of the system controller 301 in a software manner. However, the present invention is not limited to this. For example, in order to achieve higher-speed processing, the processing in step 34 may be realized by an electrical circuit as hardware.

In this embodiment, the pixel pitch P is about 70.56 $\mu$m, and the recording density is 360 dpi. For this reason, the number of record pixels for recording an A4 full size is about 2,600 in the horizontal direction, and is about 3,600 in the vertical direction. The number of specified areas M is about 650 in the horizontal direction, and is about 900 in the vertical direction since each area is defined by a 4×4 pixel matrix.

Figure 20:
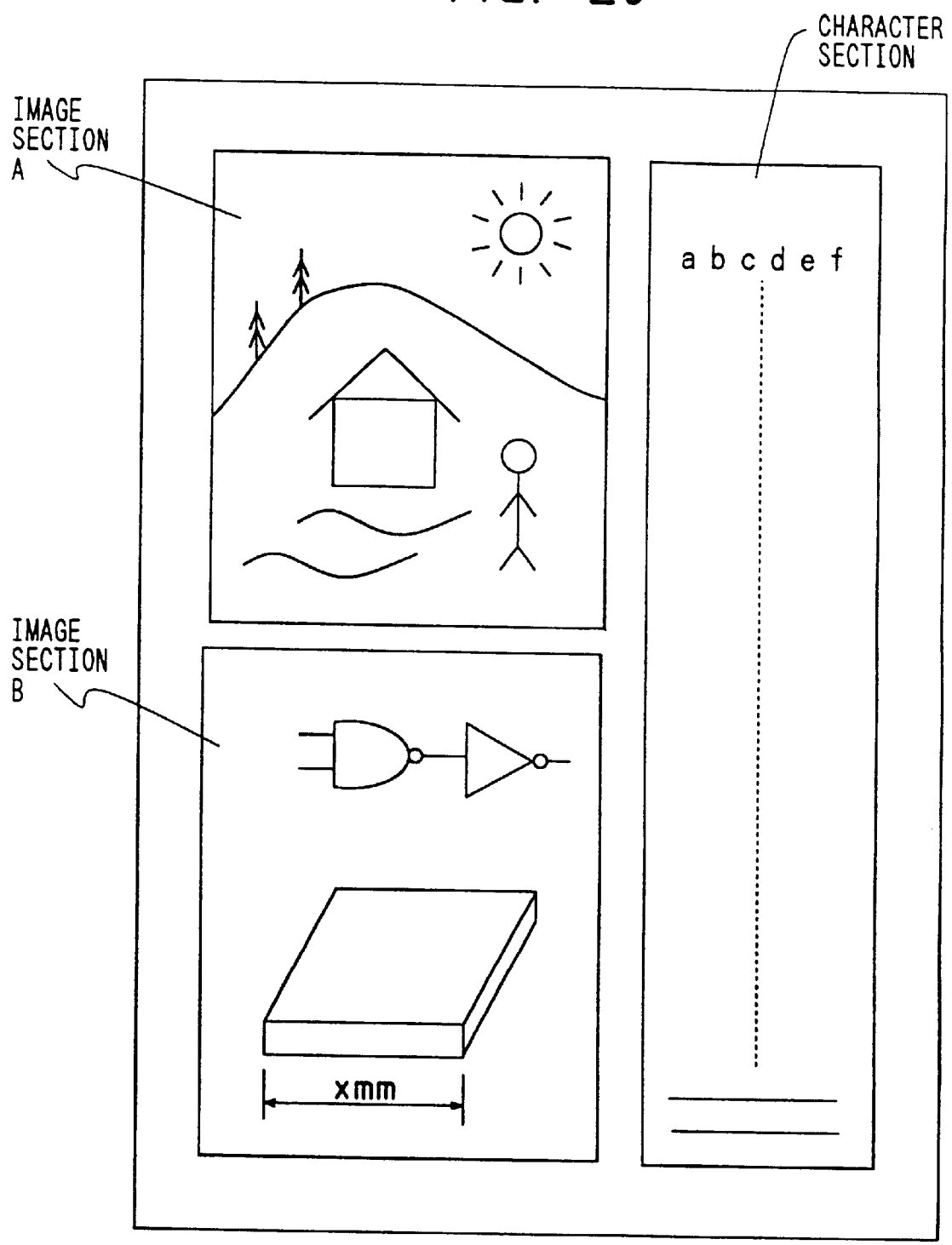
FIG. 20 is a view showing an image including both black and color images.

FIG. 20 shows an example of an image including both a black image and a color image on a single recording paper sheet.

An image section A is a natural image such as a picture, and normally has a portion having a high generation frequency of black record pixels. In this case, in a black recording portion, black is expressed by overlapping three colors, i.e., the C, M, and Y inks. Although this black is a relatively blurred one with a low OD, since the C, M, and Y inks have characteristics which do not easily cause blurring, blurring with other color recording portions does not occur, and a high-quality image is obtained as a whole.

On the other hand, an image section B is an image with a low generation frequency of black recording pixels such as diagrams of a machine, an electrical circuit, and the like. At this time, in a black recording portion, black is expressed by the Bk ink. This black is one free from feathering and having a high OD, and can sharply record thin lines, small characters, and the like.

A character section is present on the right side of FIG. 20. In a black recording portion in the character section, a thin portion expressing each character is recorded using the Bk ink, and the central portion of a thick portion is recorded using the C+M+Y inks. At this time, although bleeding occurs between the Bk portion and the CMY portion, since both the portions express black, no problem is posed.

Note that the specified value C varies depending on the density of record pixels, the characteristics of inks to be used, the characteristics of a recording medium, the time interval between recording of the Bk ink and recording of other color inks, and the like. For this reason, a recording system to be used selects an optimal value.

In this embodiment, the apparatus comprises the frame buffers each for recording one page. However, the present invention can also be applied to an apparatus which comprises line buffers in place of the frame buffers.

(10th Embodiment)

Figure 21:
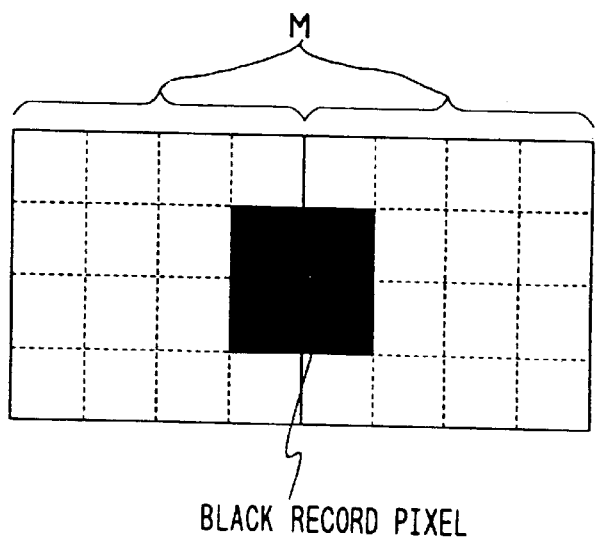
FIG. 21 is a view showing black record pixels in the specified area.

In the ninth embodiment, the entire recording area is divided into specified areas M, and processing is executed in units of the divided specified areas M. However, in some cases, as shown in FIG. 21, although the black recording frequency in each of the divided specified areas M is low, black record pixels may locally appear in some continuous areas. In this case, bleeding generated between the black recording area and another color recording area around the black recording area can be avoided by performing discrimination in step 34 for a single record pixel to overlap in the vertical or horizontal direction.

Figure 19:
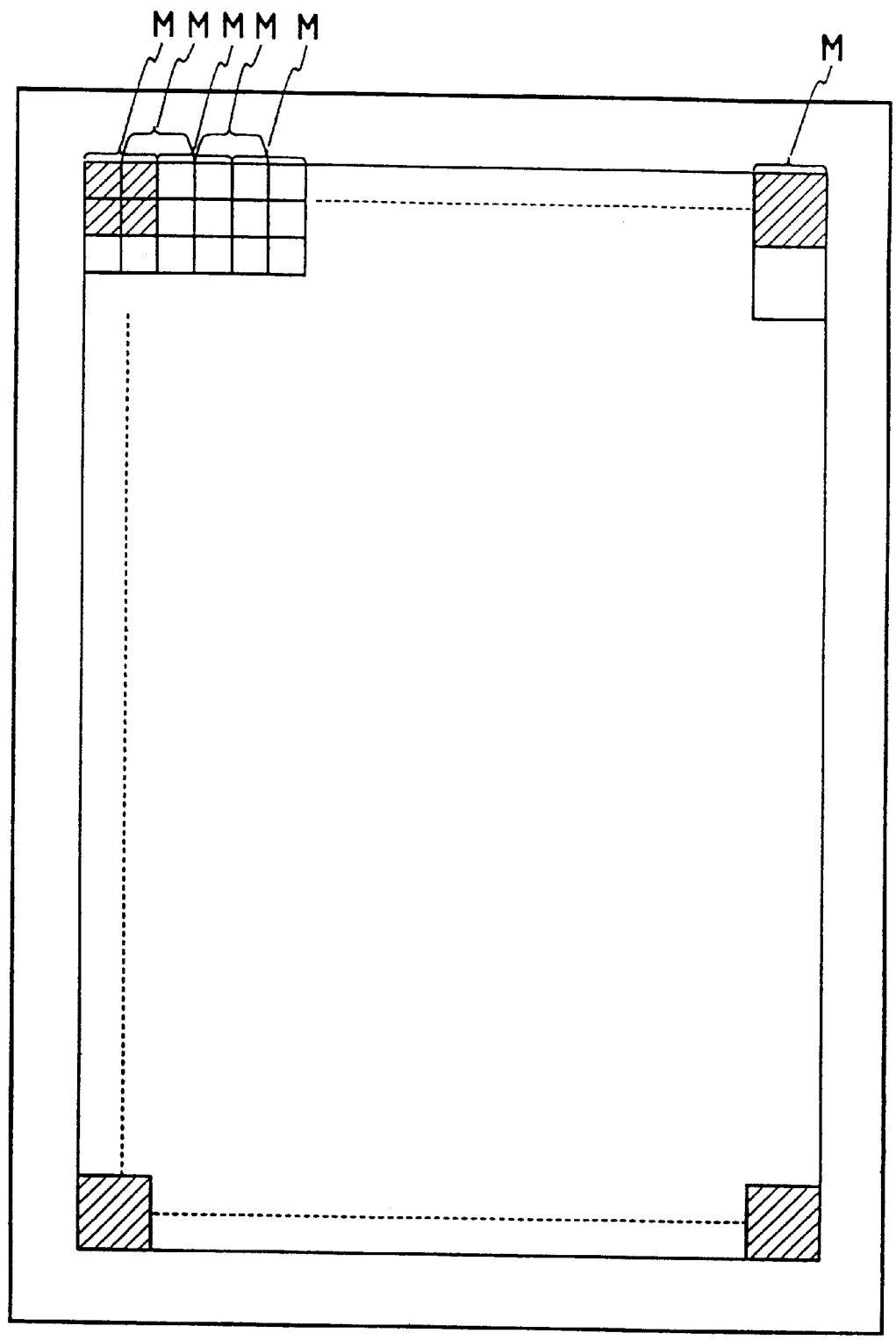
FIG. 19 is a view showing the relationship between the recording area and the specified area which overlaps the recording area.

More specifically, as shown in FIG. 19, a mask is defined by shifting the specified area M by half the size of the area M in the vertical and horizontal directions, and the decision processing in step 34 is executed twice for each pixel, except for pixels around a maximum recording area. In this case, the discrimination result in this case corresponds to an OR of discrimination results of overlapping processing operations for a single pixel. Although the calculation processing time is prolonged as compared to that in the ninth embodiment, reliable processing can be realized.

(11th Embodiment)

In the ninth embodiment, the entire recording area is divided into the specified areas M each consisting of a 4×4 pixel matrix, and processing is executed in units of divided areas. However, the present invention is not limited to this pixel matrix.

In this embodiment, the entire recording area is divided into areas M each consisting of an m×n (m and n are integers equal to or larger than 2) pixel matrix. In this case, an optimal value is selected as the value of the specified value C.

(12th Embodiment)

In the ninth embodiment, an algorithm is simplified to achieve simple, high-speed processing, the recording frequency of black pixel recording data in the specified area M is calculated in step 34, and processing is executed based on the calculation result.

Originally, bleeding between Bk and other colors is generated due to an interaction between Bk and other colors. Thus, the specified value C may be increased depending on the recording frequency of C, M, and/or Y in the specified area M.

Figure 22:
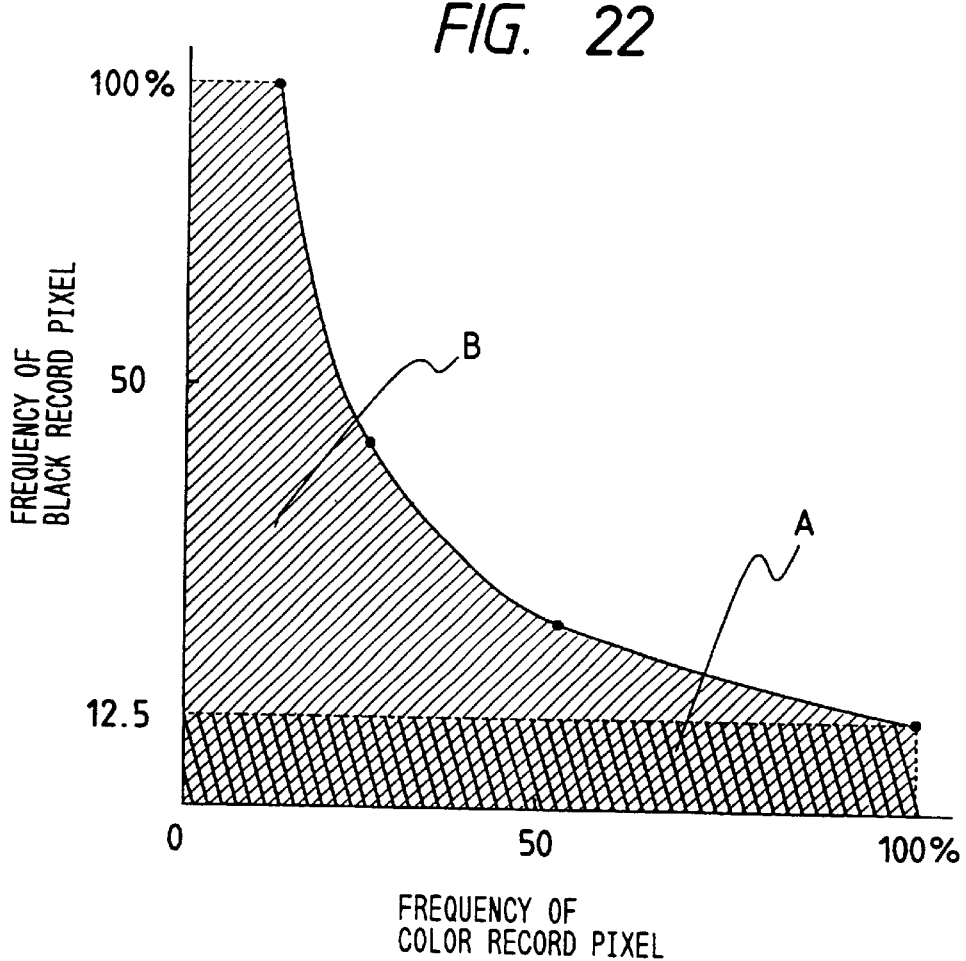
FIG. 22 is a graph showing the relationship between the frequency of color record pixels in the specified area and the frequency of black pixels which can be recorded using a black ink.

FIG. 22 is a graph showing the frequency of black record pixels which can be recorded using the Bk ink with respect to the frequency of color record pixels in the specified area M, i.e., the record frequency of a total value T of C, M, and Y record pixels in the specified area (T(m×n)×100%, m=4, n=4). In this case, as the generation frequency of color record pixels in the specified area is lower, the value of the specified value C is increased. In the ninth embodiment, NO is determined in step 34 for only a region A in FIG. 22. However, in this embodiment, the "NO" determination portion is expanded to a region B.

In this embodiment, no bleeding is generated, and the Bk ink can be used with a higher probability, thus widening a high-quality black recording area.

As described above, according to the ninth to 12th embodiments, a black ink and a plurality of color inks having a penetration speed different from that of the black ink are used, and black expressed by the black ink and black expressed by the plurality of color inks are selectively used in accordance with the frequency of black record pixels in a specified area. Therefore, both high-quality recording of characters, thin lines, and the like, and high-quality color recording free from ink blurring between black and other colors can be realized.

(13th Embodiment)

In this embodiment, the following black ink is used. However, the above-mentioned ink may be used.

| C.I. Direct Black 154 | 3 parts |
|---|---|
| glycerin | 5 parts |
| isopropyl alcohol | 2 parts |
| thiodiglycol | 5 parts |
| urea | 5 parts |
| water | balance |

Figure 23:
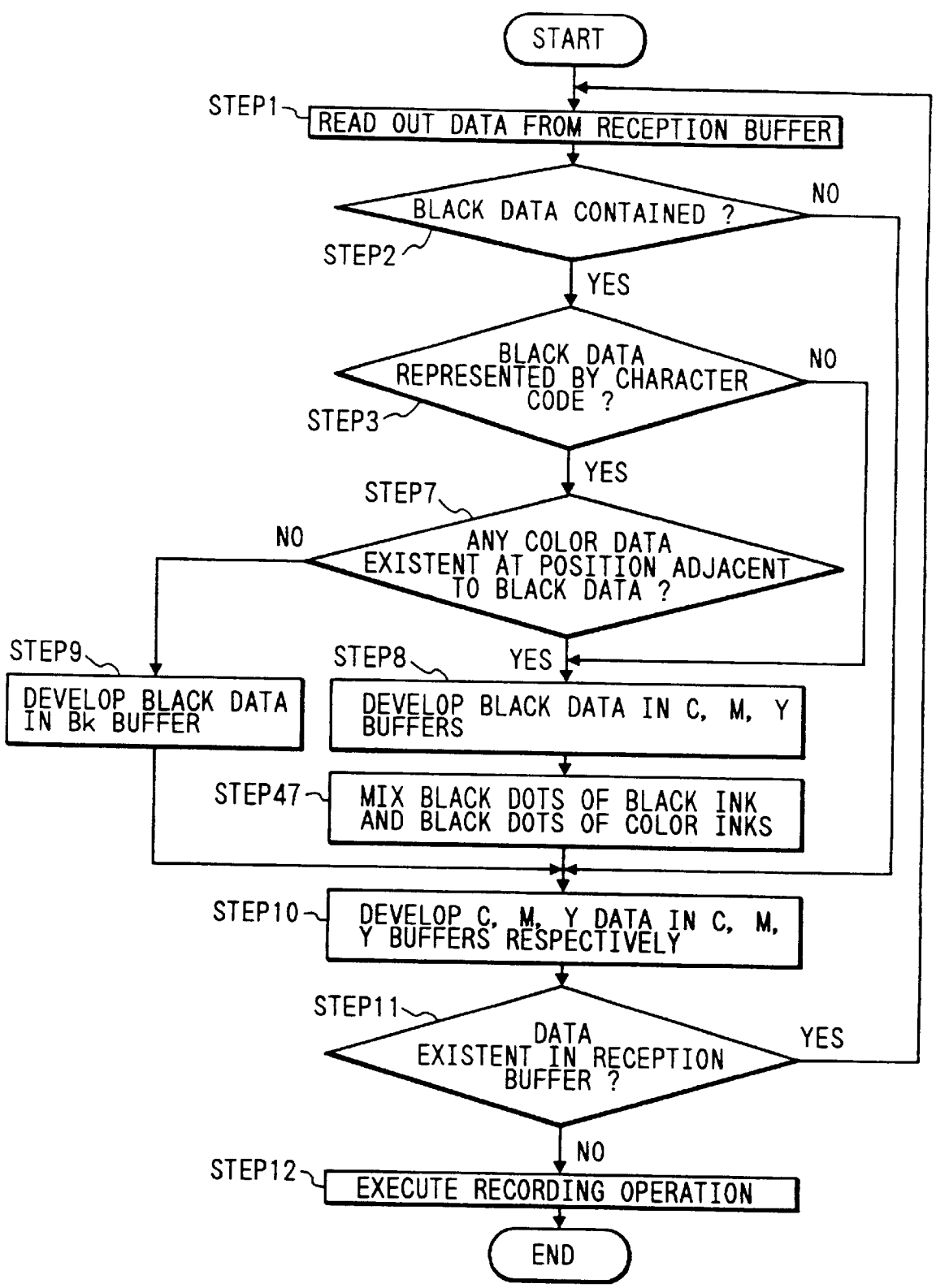
FIG. 23 is a flow chart showing an operation executed when a black image is printed.

FIG. 23 is a flow chart for explaining a recording operation according to the 13th embodiment of the present invention. Steps 1 to 9 are the same as those in FIG. 5 described above.

In step 47, image processing for mixing black dots obtained by mixing the Y, M, and C color inks, and black dots of the black ink at a predetermined mixing ratio is performed. Steps 10 to 12 are the same as those in FIG. 5.

Figure 24:
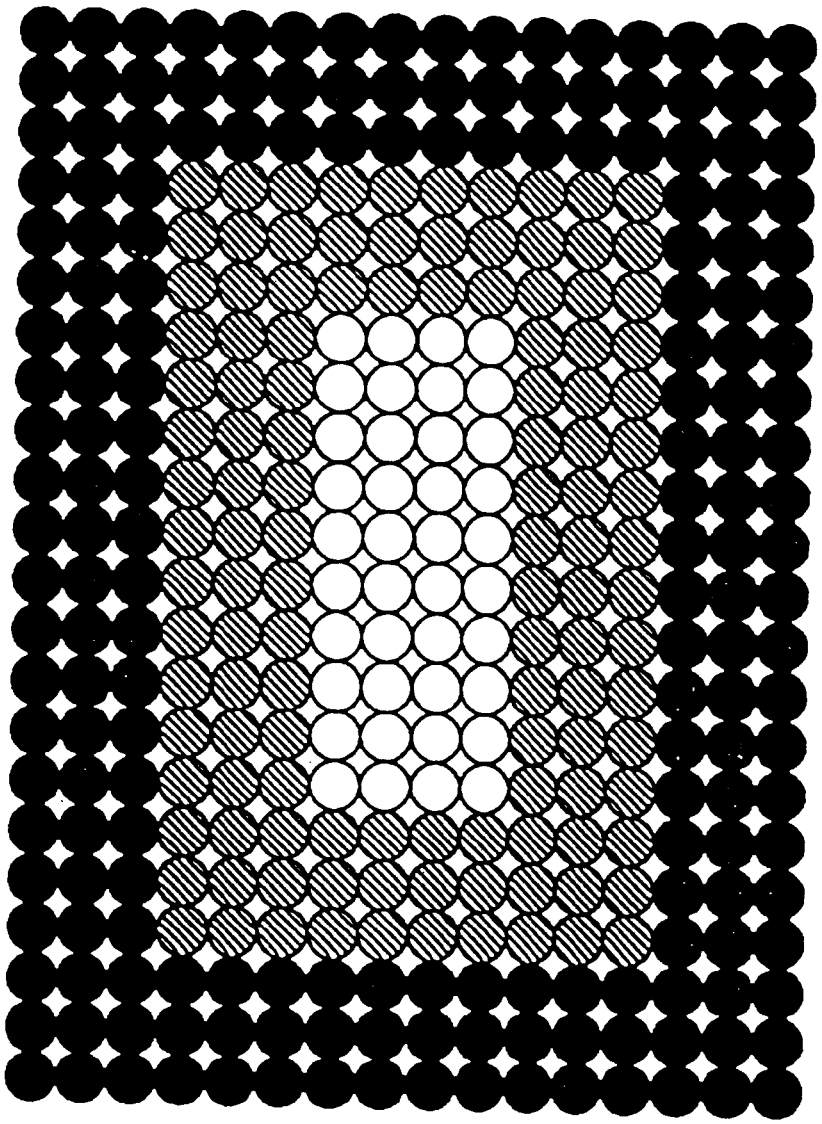
FIGS. 24 and 25 are views showing examples of printed images.
Figure 25:
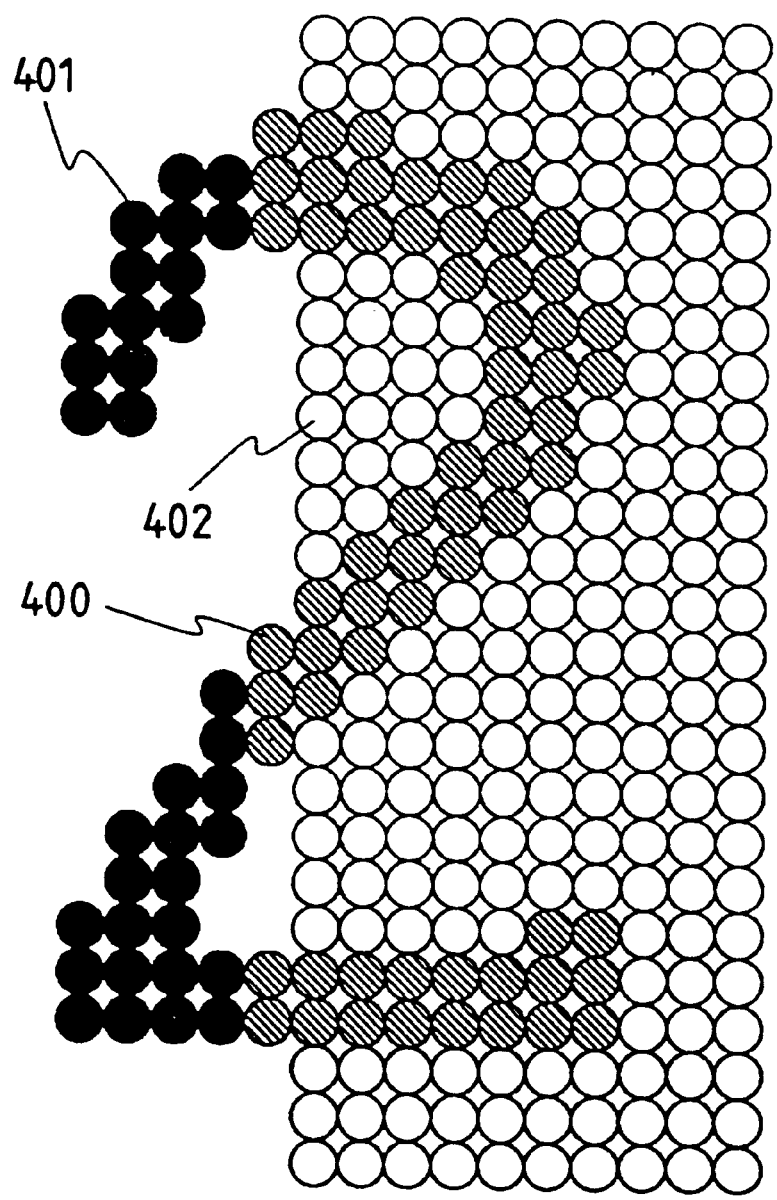

FIGS. 24 and 25 show printed images when a color image exists at a position adjacent to a black image.

The images shown in FIGS. 24 and 25 are obtained by printing print data sent as bit images. A black image adjacent to dots 402 of a color image is formed as follows. That is, after black dots 400 formed by mixing the plurality of color inks, as described above, are printed on a predetermined area, the black image is completed using the black ink (FIG. 24), or a black image portion present in a color image is formed by printing the black dots 400 obtained by mixing the colors.

Furthermore, a black image portion, which does not contact any color image, is formed by printing dots 401 of only the black ink.

In this case, the black image has a poor appearance due to different color tones since the black dots 400 formed by mixing the colors and the dots 401 of the black ink continuously appear.

Figure 26:
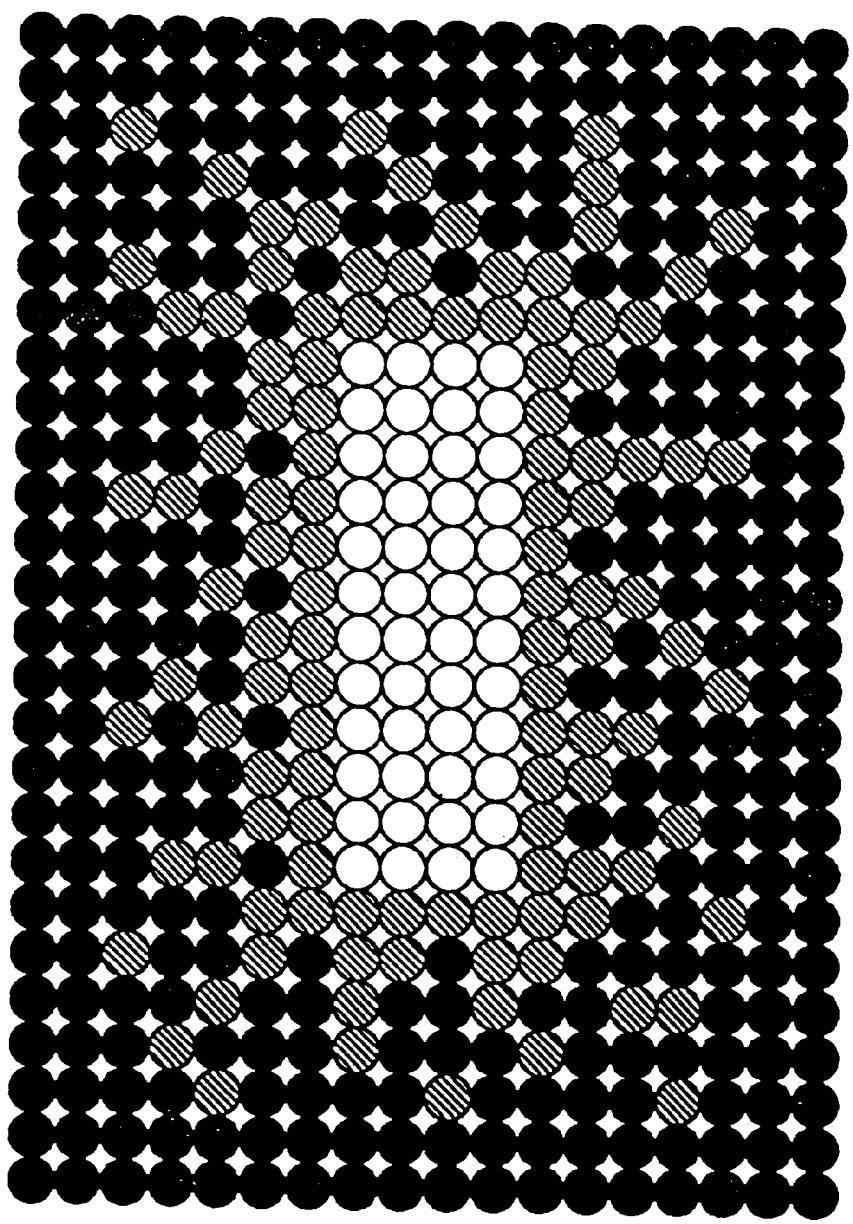
FIGS. 26 to 30 are views showing images printed according to the 13th to 17th embodiments of the present invention.

FIG. 26 shows an example of a printed image according to the 13th embodiment. The image shown in FIG. 26 includes a color image portion at the center thereof, and a black image around the color image. In the image shown in FIG. 26, a boundary caused by a color difference between a black image formed by the plurality of color inks and a black image formed by the black ink alone is controlled not to be conspicuous.

All black dots adjacent to color image dots 402 are formed by black dots 400 obtained by mixing the color inks under the above-mentioned control (step 8).

Black dots to be arranged around the black dots 400 are controlled to include both black dots 400 obtained by mixing the color inks and dots 401 of the black ink alone (step 47).

As for mixing of the two kinds of black dots, in the 13th embodiment, the mixing ratio of the black dots 400 obtained by mixing the color inks and the dots 401 of the black ink alone is set as follows.

Since the first outer peripheral dots are present adjacent to the color dots, the black dots adjacent to the color dots are formed by printing the black dots 400 obtained by mixing the color inks so as to prevent ink blurring. In the second outer peripheral dots, the dots 401 of the black ink alone are mixed at a ratio of one black ink dot to two black dots formed by mixing the color inks. In the third outer peripheral dots, the dots 401 of the black ink alone are mixed at a ratio of two black ink dots to one black dot formed by mixing the color inks. Thereafter, the ratio of the black ink dots to the black dots formed by mixing colors is sequentially increased like 3:1, 4:1 . . .

When the ratio exceeds 5:1, 100% of black ink dots are controlled to be printed for 0% of black dots formed by mixing the color inks. Therefore, since the color tone of a black image changes stepwise, a boundary between the two kinds of black images does not become conspicuous.

(14th Embodiment)

Figure 27:
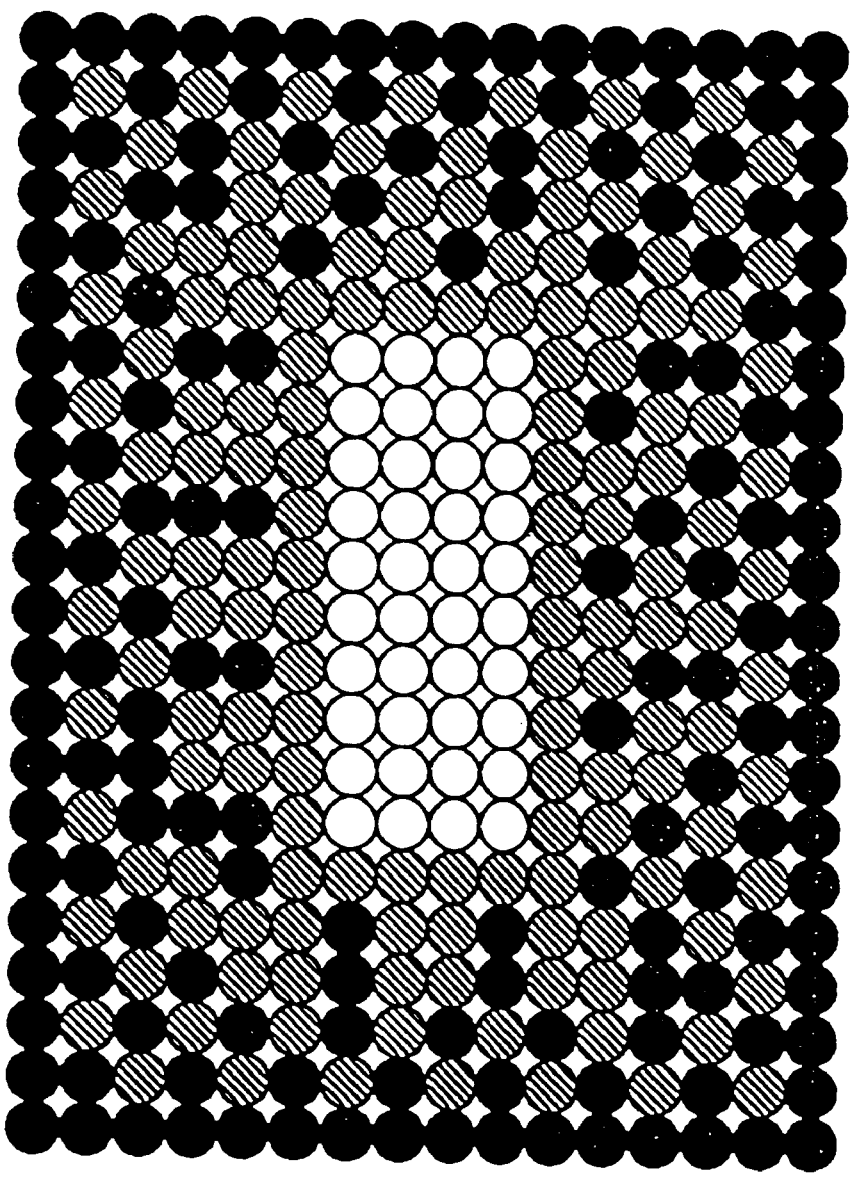

FIG. 27 shows an example of a printed image according to the 14th embodiment of the present invention.

The image shown in FIG. 27 includes a color image at the center thereof, and a black image around the color image. As in the 13th embodiment, a boundary caused by a color difference between a black image formed by the color inks and a black image formed by the black ink alone is controlled not to be conspicuous.

All black dots adjacent to the color image are formed by black dots 400 obtained by mixing the color inks under the above-mentioned control (step 8).

Black dots to be arranged around the black dots 400 are controlled to include both black dots 400 obtained by mixing the color inks and dots 401 of the black ink alone (step 47). As for mixing of the two kinds of black dots, in the 14th embodiment, the mixing ratio of the black dots obtained by mixing the color inks and the dots of the black ink alone is set as follows.

Since the first outer peripheral dots are present adjacent to the color dots, the black dots adjacent to the color dots are formed by printing black dots obtained by mixing the color inks so as to prevent ink blurring. In the second and third outer peripheral dots, the black ink dots are mixed at a ratio of one black ink dot to two black dots formed by the color inks. In the fourth and fifth outer peripheral dots, the black ink dots are mixed at a ratio of one black ink dot to one black dot formed by the color inks. 100% of the sixth outer peripheral dots are formed by black ink dots.

(15th Embodiment)

Figure 28:
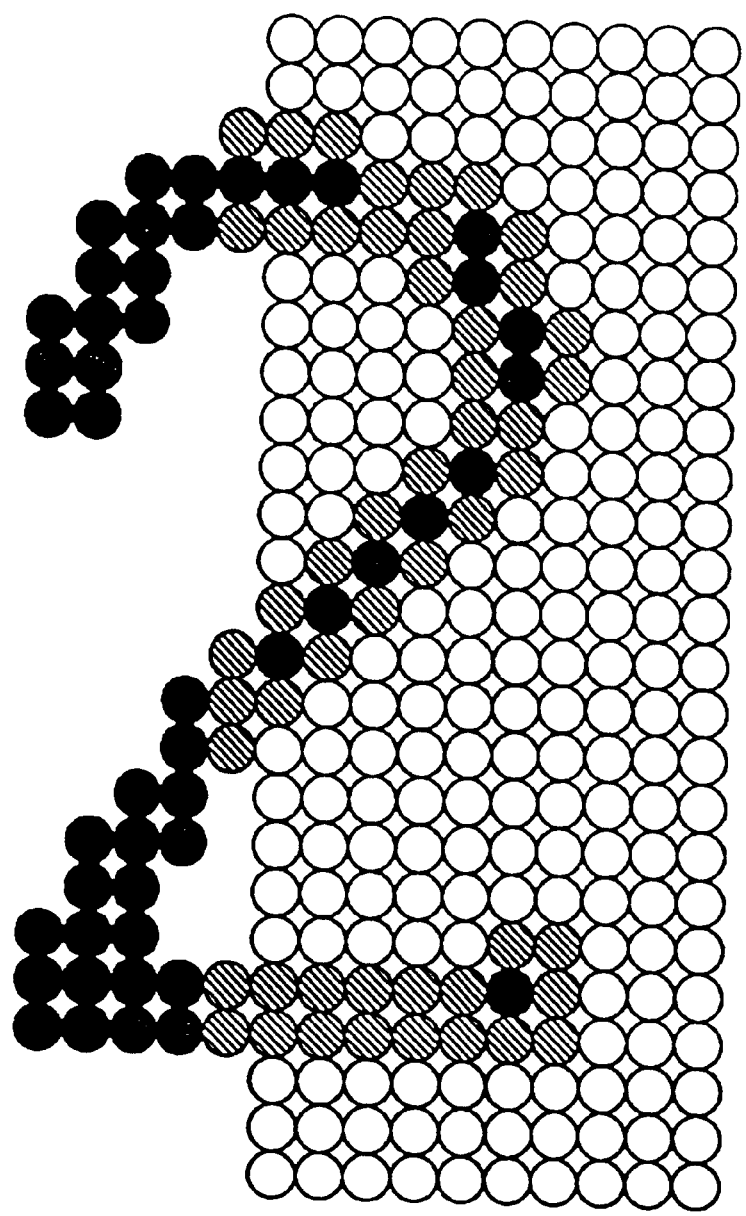

FIG. 28 shows an example of a printed image according to the 15th embodiment of the present invention. This example shows a case wherein a black image is present inside a color image, and has a width of 3 dots or more.

All inner black dots adjacent to the color image are formed by black dots 400 obtained by mixing the color inks under the above-mentioned control so as to prevent blurring (step 8).

The second inner peripheral black dots are formed by dots 401 of the black ink alone. Furthermore, a black image portion, which does not contact any color image, is formed by dots 401 of the black ink alone (step 47).

(16th Embodiment)

Figure 29:
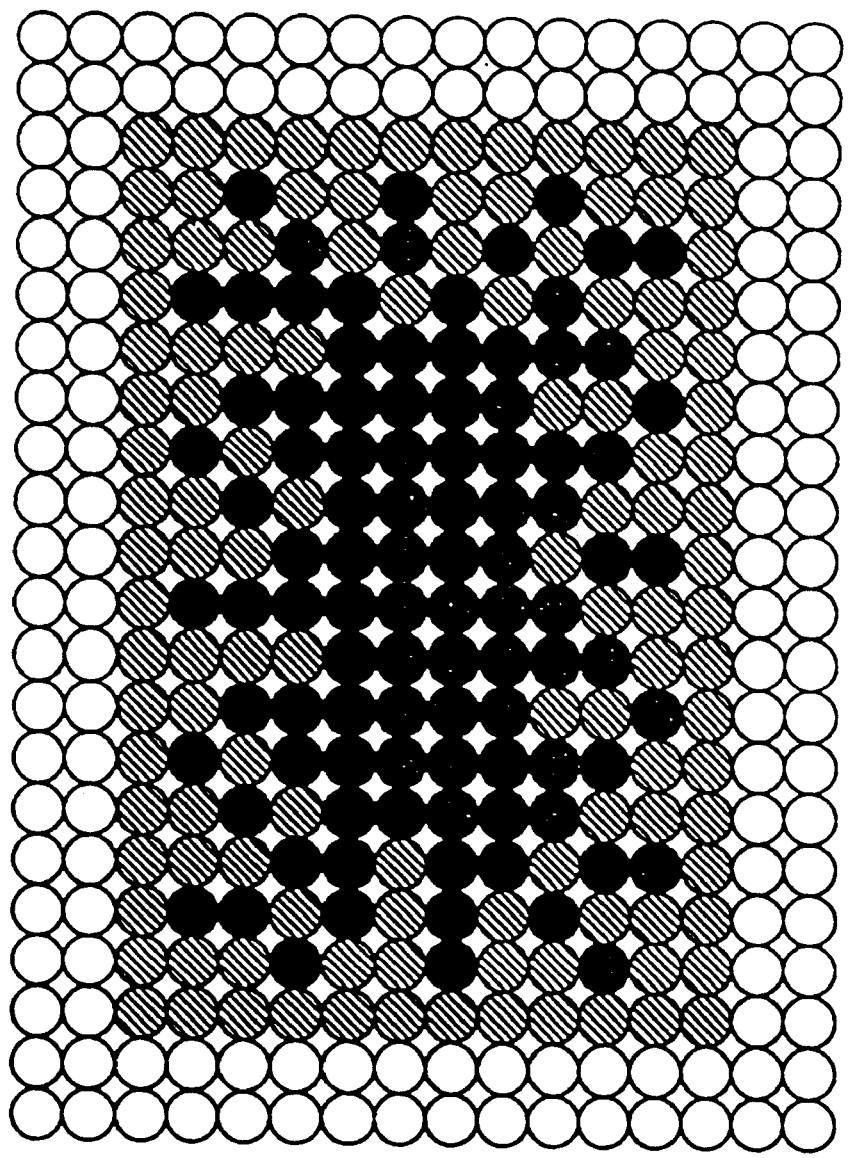

FIG. 29 shows an example of a printed image according to the 16th embodiment of the present invention. In this example, an image includes a color image portion at its outermost periphery, and a black image portion inside the color image portion.

All inner black dots adjacent to the color image are formed by black dots 400 obtained by mixing the color inks under the above-mentioned control so as to prevent blurring (step 8).

In the second inner peripheral black dots, black dots 400 obtained by mixing the color inks and dots 401 of the black ink alone are mixed. As for mixing of the two kinds of dots, the mixing ratio of the black dots formed by the color inks and dots of the black ink alone is set as follows (step 47).

Since the first inner peripheral dots are present adjacent to color dots, all black dots adjacent to the color dots are printed by black dots obtained by mixing the color inks. In the second and subsequent inner peripheral dots, the black dots formed by mixing the color inks and the dots of the black ink alone are mixed, and their mixing ratio is changed to 2:1, 1:1, and 1:2 toward-the center.

The fifth inner peripheral dots are controlled to have 100% of black ink dots.

(17th Embodiment)

Figure 30:
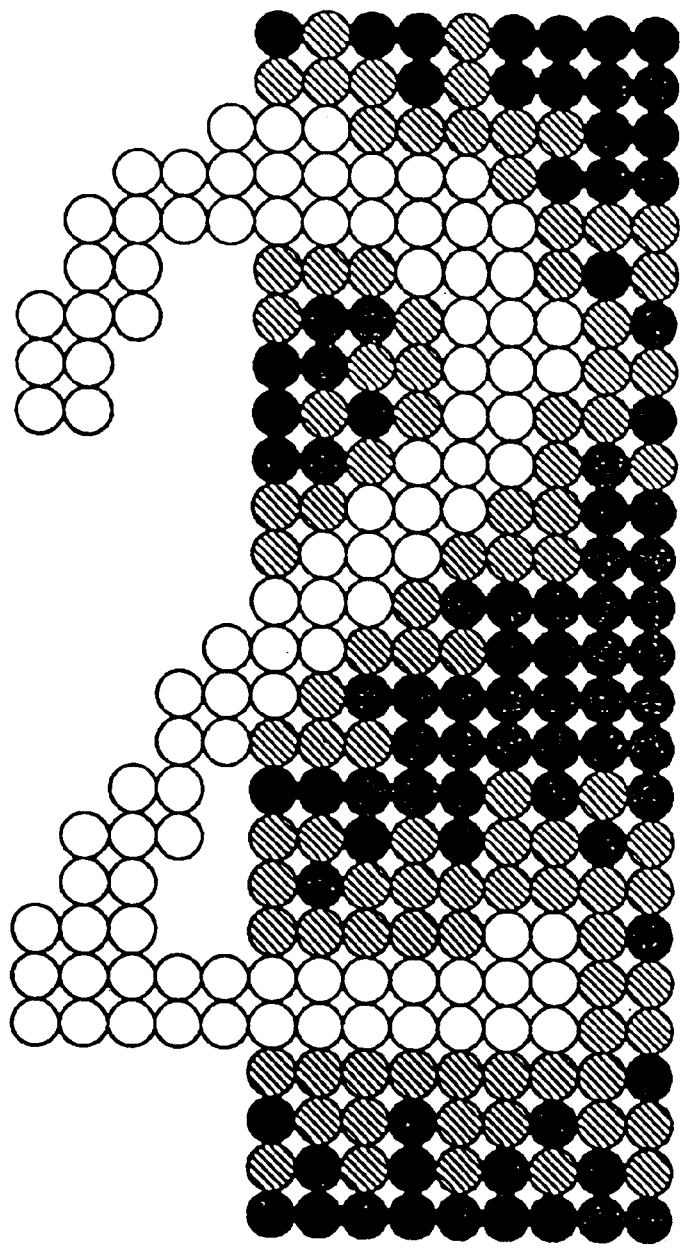

FIG. 30 exemplifies a case wherein a color image extends across a blank portion and a black image. As described above, when black dots are present adjacent to color dots 402, they are formed by black dots 400 obtained by mixing color inks (step 8). In black dots formed inside or around these black dots, black dots 400 formed by mixing the color inks and black dots 401 of the black ink alone are mixed (step 47). Thus, the above-mentioned processing is executed to form an image.

As described above, according to the 13th to 17th embodiments, when a black image is present adjacent to a color image, all black dots adjacent to color dots forming the color image are formed by mixing the color inks to accelerate penetration and fixing of the inks into paper, thereby preventing the black ink from flowing into the color image. In black dots formed around or inside these black dots, black dots formed by mixing the color inks and dots of the black ink alone are mixed according to a predetermined algorithm.

When the number of dots of the black ink alone is gradually increased in black image dots formed around or inside the above-mentioned black dots, the boundary between the black dots formed by mixing the color inks and the dots of the black ink alone does not become conspicuous, and finally, a black image is formed by 100% of the dots of the black ink alone.

Therefore, since the color gradually changes in the entire black image, a black image free from an abrupt change in tone color, and having good appearance can be formed.

(18th Embodiment)

Figure 31:
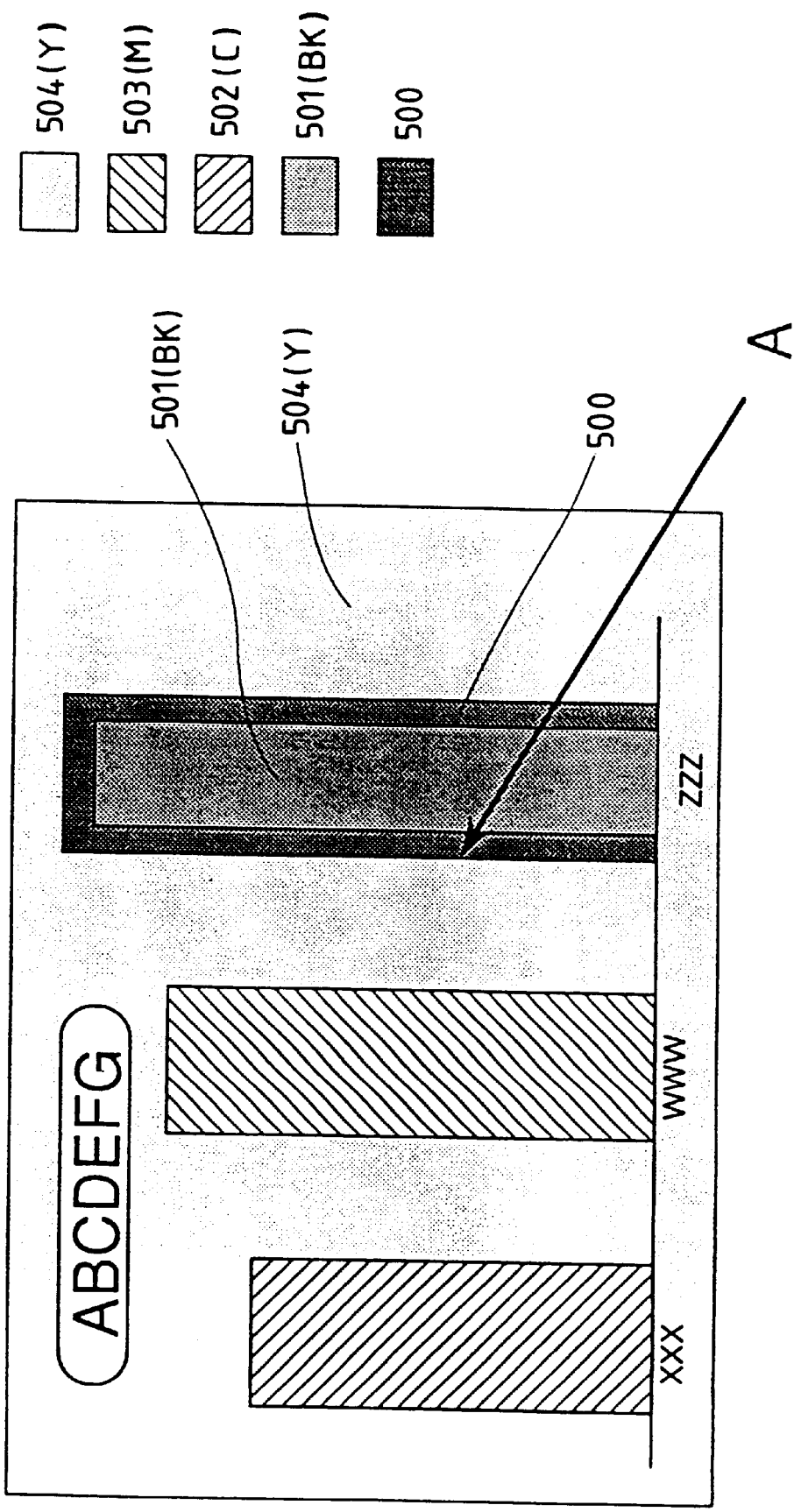
FIGS. 31 and 34 are views showing the entire images printed according to the 18th and 19th embodiments of the present invention.
Figure 32:
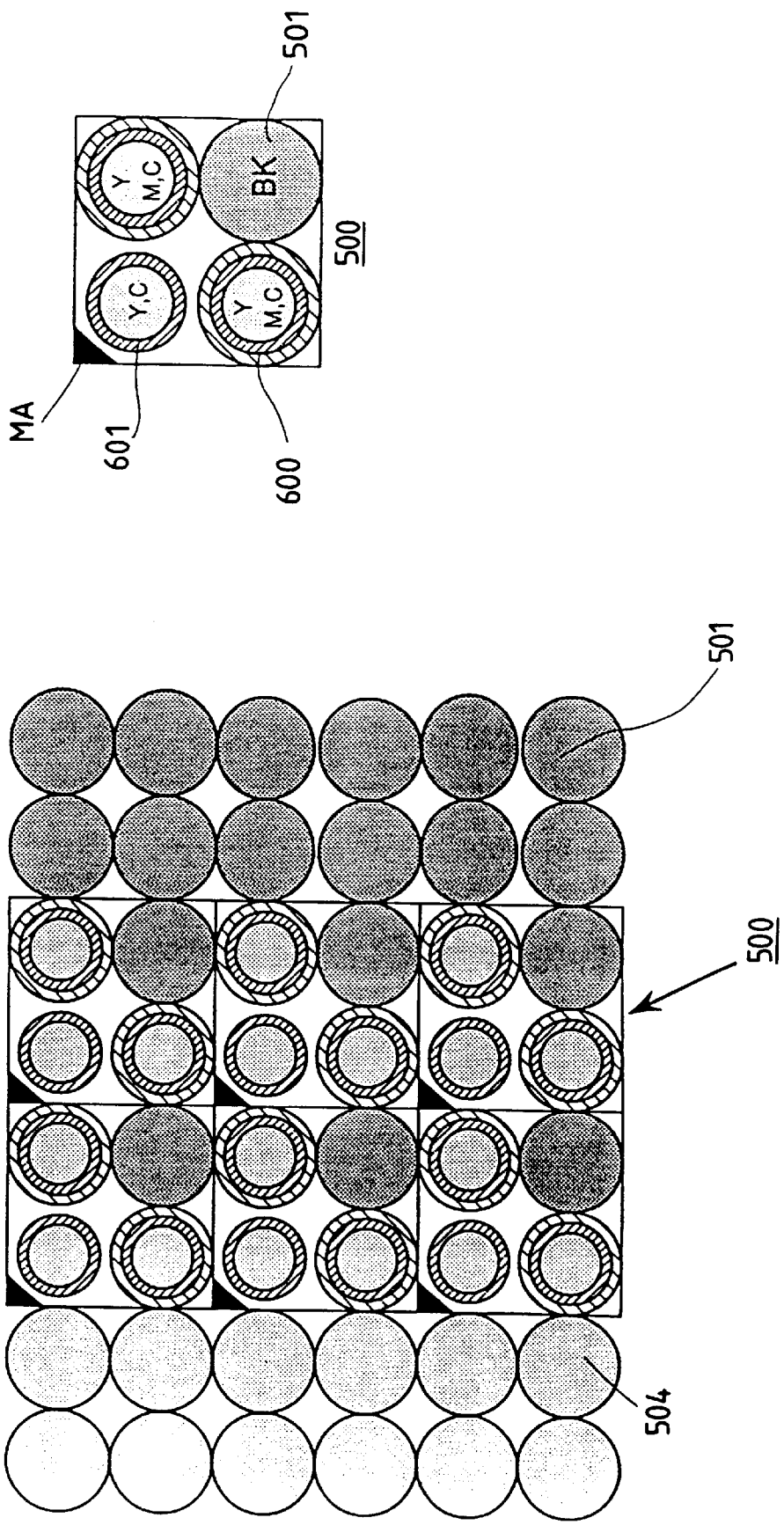
FIGS. 32A and 32B are enlarged views showing an image for explaining the details of a portion A in FIG. 31, and showing dots constituting an expanded pixel.

FIG. 31 is a view for explaining the 18th embodiment, and shows an example wherein a black image is present in a color ink (yellow) image 504 (Y) as a background, and color dots and black dots are formed adjacent to each other. In a black image 501 (Bk), dots adjacent to the color image are processed as expanded pixels 500 each including 2×2, i.e., four pixels (super pixels). FIGS. 32A and 32B are enlarged views of a portion A in FIG. 31 so as to explain, in detail, a black image processing state wherein the color image 504 is present adjacent to the black image.

FIG. 32A shows processed pixels of the black image adjacent to the color image 504. The black image adjacent to the color image is subjected to image processing using a predetermined mask (pattern) using expanded pixels 500 (see FIG. 32B) each including 2×2, i.e., four pixels. The expanded pixel 500 is formed by the color inks and the black ink at the following ratio:

Y=75% (three pixels)

M=50% (two pixels)

C=75% (three pixels)

Bk=25% (one pixel)

The expanded pixel 500 is formed by arranging pixels 600 formed by landing yellow, magenta, and cyan ink droplets as the color inks at the same position, a pixel 601 formed by landing yellow and cyan ink droplets at the same position, and a pixel 501 of only the black ink, as shown in FIG. 32B. For the sake of easy understanding of the positional relationship among the inks, a mark MA is added to the corner of each expanded pixel 500.

As described above in the above embodiment, since Bk (501) has a large ink ejection amount, and the color inks have a small ink ejection amount, the above-mentioned ratio of the inks can prevent boundary blurring between a black image and a color image at a position where the black image is present adjacent to the color image, and a color tone difference from the Bk ink is not conspicuous. However, the ratio of the color inks is not specified, and an optimal condition varies depending on the ink ejection amount, physical properties of inks themselves, and the like.

In this embodiment, the expansion pixels 500 are applied to two super pixels of the black image adjacent to the yellow color image (Y) 504. The ratio of the inks is preferably changed in correspondence with the characteristics on a print paper sheet and a plastic film such as an OHP sheet since the appearance of black color varies depending on the physical properties of inks, the ink ejection amounts, and the like, as described above.

Figure 33:
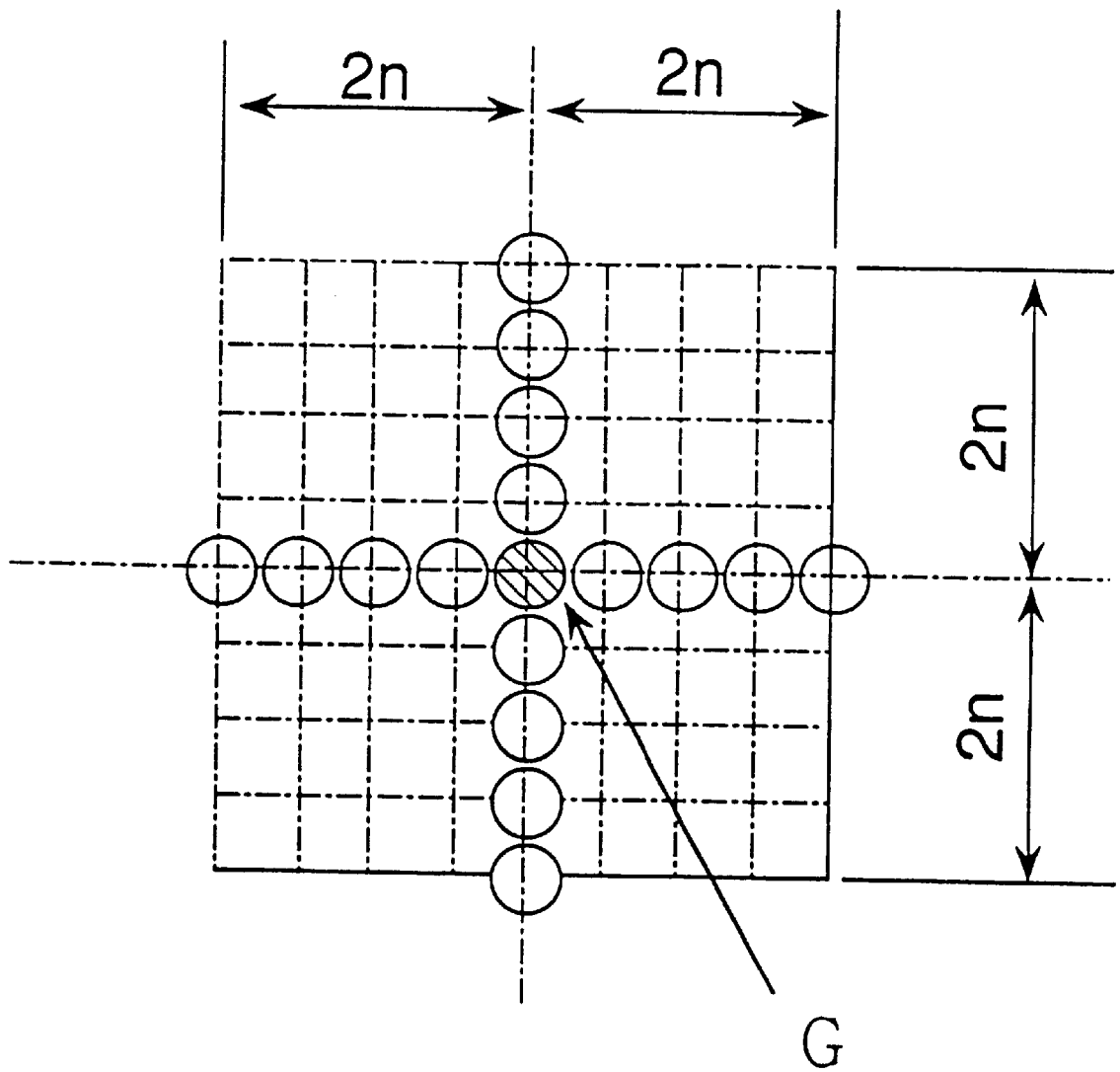
FIG. 33 is a view for explaining means for processing/forming an image printed to have a pattern shown in FIGS. 32A and 32B.

FIG. 33 is a view for explaining a procedure for defining the 2×2, i.e., four pixels as one expanded pixel. When a color image/pixel G of interest adjacent to a black image is detected, processing for replacing black image pixels present in a predetermined two-dimensional range having the color pixel G as the center by the expanded pixels is performed.

In this embodiment, processing is performed in units of four pixels in the vertical and horizontal directions to have the color pixel G as the center. However, the present invention is not limited to this. For example, processing may be executed in units of 2n×2n pixels, and in this embodiment, n=2 is selected. When the number of pixels is optimized in correspondence with the print mode, the number of print passes, and the like, a color image with higher quality can be obtained.

(19th Embodiment)

Figure 34:
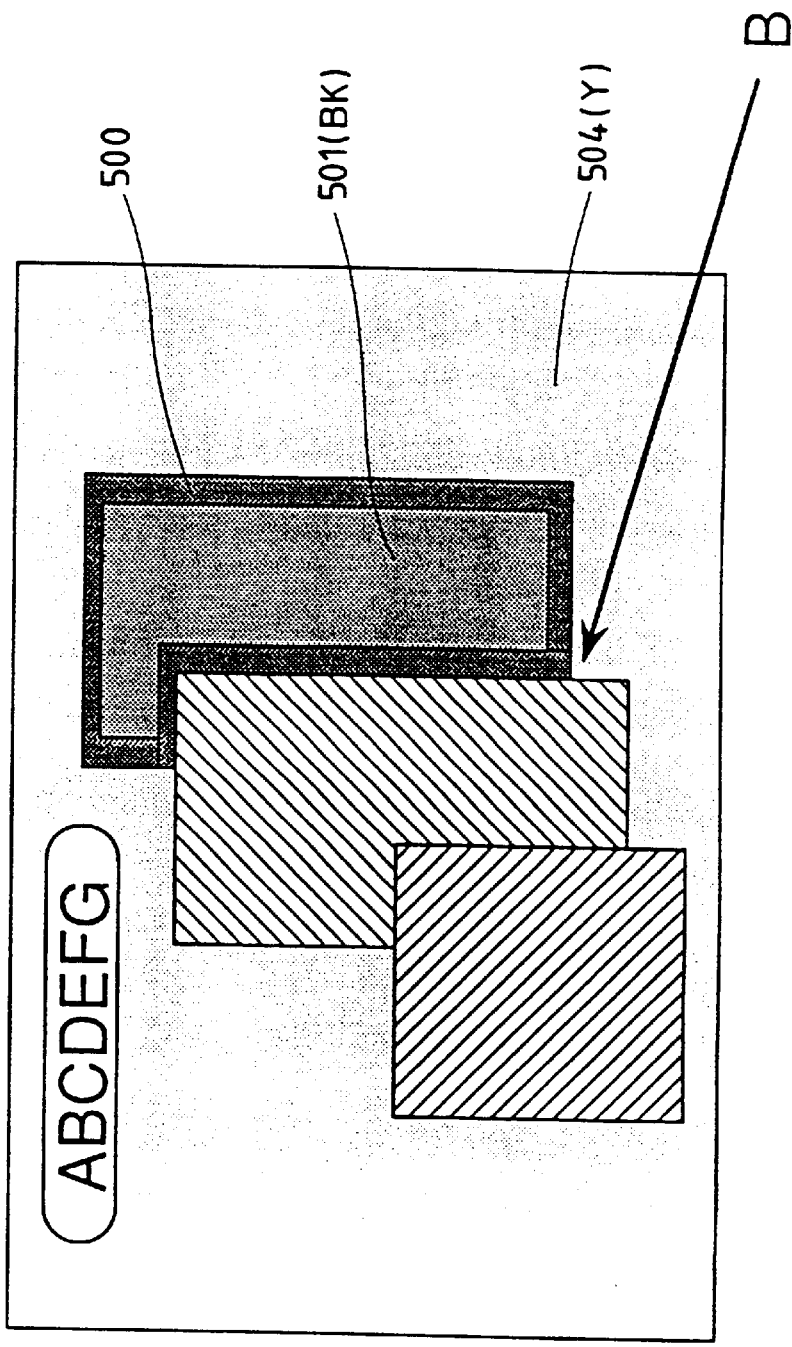

FIG. 34 is a view for explaining still another example of an image. FIG. 34 shows a black image (Bk) adjacent to a yellow background image 504 (Y). Black image processing in FIG. 34 will be described below with reference to an enlarged view of a portion B. The same reference numerals in FIG. 34 denote the same portions as in FIG. 31.

Figure 35B:
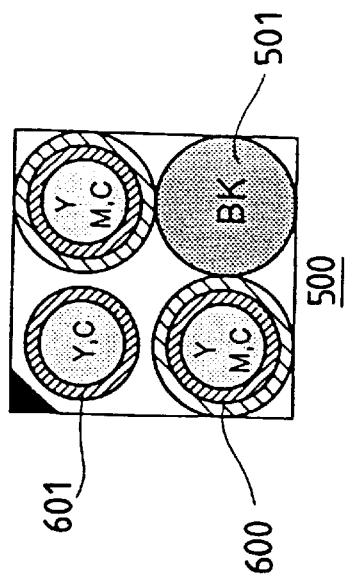
FIGS. 35A and 35B are enlarged views showing an image for explaining the details of a portion B in FIG. 34, and showing dots constituting an expanded pixel.
Figure 35A:
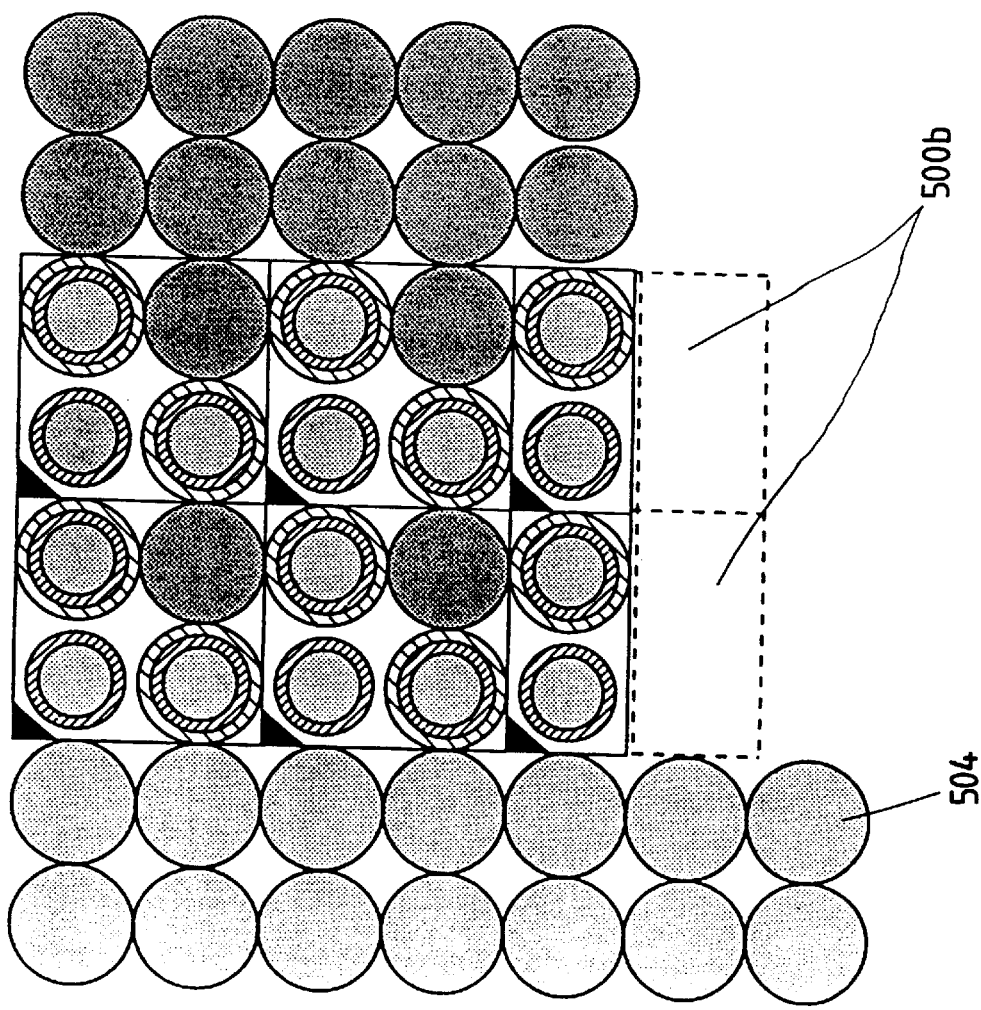

FIG. 35A shows a case wherein the color image 504 is formed adjacent to the black image, and mask (patter) processing is performed for 2×2, i.e., four pixels of the black image as one expanded pixel (see FIG. 35B), as has been described in the above embodiment. A case will be described in detail below wherein when the four pixels are defined as one expanded pixel, some pixels as a fraction cannot form an expanded pixel.

When black image pixels to be subjected to mask processing are not present, processing for defining the corresponding portion as a blank portion is executed. Since expanded pixels 500b have no print dot data in their lower half portions, the lower half portions are mask-processed as blank portions.

(20th Embodiment)

FIG. 36A shows still another example of a printed image. In place of continuously arranging one type of the expanded pixels 500 (see FIG. 36B), the processed 2×2, i.e., four pixels are randomly arranged to eliminate regularity of the expanded pixels. As described above, since a mark MA is attached to the corner of each model of the expanded pixels 500, the positional relationship among the expanded pixels can be understood from FIG. 36A.

Furthermore, in place of randomly arranging the pixels, the expanded pixels may be arranged while being regularly rotated in one direction, thus sufficiently eliminating regularity.

(21st Embodiment)

FIGS. 37A to 37D show still another example of a printed image. In black ink processing, the ratio of the blank ink increases as the positions of black pixels are separated away from color ink pixels 504.

The black ink included in the expanded pixel consisting of four pixels is mixed at the following ratio. Each of expanded pixels 500 (see FIG. 37B) in the first column is formed by the above-mentioned arrangement:

Y=75% (three pixels)

M=50% (two pixels)

C=75% (three pixels)

Bk=25% (one pixel)

Each of expanded pixels 510 (see FIG. 37C) in the second column is formed by:

Y=50% (two pixels)

M=50% (two pixels)

C=50% (two pixels)

Bk=50% (two pixels)

Each of expanded pixels 520 (see FIG. 37D) in the third column is formed by:

Y=25% (one pixel)

M=25% (one pixel)

C=25% (one pixel)

Bk=75% (three pixels)

The mixing ratio of the black ink is merely an example, and the present invention is not limited to this. For example, the mixing ratio may be changed in correspondence with the print paper sheet, the print mode, and the like. Furthermore, the mixing ratio of the black ink 401 may be arbitrarily changed within a range from 10% to 90%.

In the above embodiment, the pixels 500, 510, and 520 are regularly arranged column by column. However, the present invention is not limited to this. As described in the above embodiments, pixels may be randomly arranged in units of columns.

According to this embodiment, a color tone difference at a boundary portion of a black image can be further eliminated.

(22nd Embodiment)

An example of switching print modes will be described below.

For example, a recording apparatus of the present invention has four different print modes.

1) HQ (High Quality) Mode one-pass simultaneous print mode using all ink ejection nozzles 2) HS (High Speed) Mode
   50% thinning print mode using odd- or even-numbered ink ejection nozzles
3) SHQ (Super High Quality) Mode
   first means for executing print processing using two to three divided blocks of ink ejection nozzles to attain interpolation print operation by repeating two to three print passes
4) OHP (Over-Head Projector) Mode
   second means for executing print processing using two to three divided blocks of ink ejection nozzles to attain overlapping print operation by repeating two to three print passes With these modes, processing for optimizing a black image adjacent to a color ink image is executed.

The details of the above-mentioned modes will be described in turn below.

1) HQ Mode

The method of the 13th embodiment (FIG. 26) of the present invention is utilized, and processing for mixing black ink dots 400 in black dots 400 obtained by mixing the color inks at a ratio of 1:3 in black image pixels adjacent to color ink image pixels. Then, the ratio of the black ink dots 401 is sequentially increased. Alternatively, the method of the 20th embodiment (FIGS. 36A and 36B) is utilized.

2) HS Mode

One expanded pixel 500 represented by the 18th embodiment of the present invention is used. This is because since print dots are thinned out to 50%, boundary blurring between a color image and a black image can be minimized.

Alternatively, black ink dots may be mixed in color ink black dots at a ratio of 1:2, as shown in FIG. 26 of the 13th embodiment.

3) SHQ Mode

Processing in the 20th embodiment (FIGS. 37A and 37B) of the present invention is executed to gradually increase the number of black ink dots, thus obtaining a high-quality image.

4) OHP Mode

All black image pixels are replaced by expanded pixels 500 represented by the 18th embodiment of the present invention to remove black ink dots. This is because the fixing states of inks on an OHP sheet are different from those on a normal paper sheet, and since the color tone of a black image is enhanced upon actual transmission/reflection of light in image projection, identical black dots are required.

Furthermore, since fixing characteristics vary depending on the types of films, and it is not easy to manage boundary blurring between a color image and a black image, it is desirable to process all black images.

In this manner, a user may arbitrarily select a print mode which can execute print processing suitable for a recording paper sheet to be subjected to printing, or a recording apparatus may automatically switch the print modes.

The above-mentioned image processing may be executed in accordance with an environmental condition. That is, detection means for detecting the environmental temperature or humidity may be arranged in a recording apparatus, and upon detection of a color ink image and a black image, the above-mentioned image processing may be performed for a black image portion at a boundary as in the print mode in accordance with the detection results from the detection means. When boundary image processing of the present invention is executed, a high-quality full-color image can be obtained.

As described above, according to the 13th to 22nd embodiments, when a black image is formed to be continuous with black dots formed by mixing the color inks in a black image which is not adjacent to a color image, the color tone of the black image is changed stepwise by mixing the two types of black dots, thus preventing poor appearance caused by a color tone difference.

(23rd Embodiment)

A summary of the 23rd to 27th embodiments of the present invention will be described below.

In the 23rd embodiment, in a normal mode, all black images are formed using color inks. In a fine mode which requires high image quality, only character code data, which is not adjacent to a color image, is formed using a black ink, and other black images, i.e., character code data, which is adjacent to a color image, and bit image data are formed using the color inks. Therefore, in the case of the image shown in FIG. 9, in the normal mode, all black images are formed using the color inks. In the fine mode, black images in the image portions B and D are subjected to processing for determining if these black images are formed using the black ink or the color inks by checking whether or not these black images are adjacent to a color image.

In the 24th embodiment, in the fine mode in the 23rd embodiment, the above-mentioned processing is also performed for bit image data in addition to character code data. Therefore, in this case, the image portions A, C, and E are also subjected to the processing.

In the 25th embodiment, in the normal mode, only character code data of black images, which data is not adjacent to a color image, is formed using the black ink, and other black images are formed using the color inks. In the fine mode, the same processing as in the 24th embodiment is performed. Therefore, in the normal mode, the image portions B and D are subjected to image processing, and in the fine mode, all black images are subjected to the processing.

A fine mode for forming an image in a plurality of number of times of main scans will be described below.

The fine mode can adopt a conventional method.

Figure 41A:
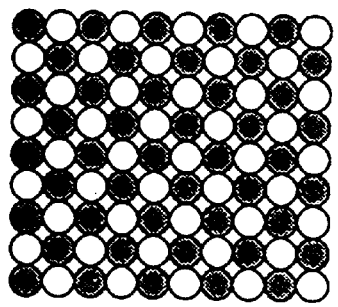
Figure 41B:
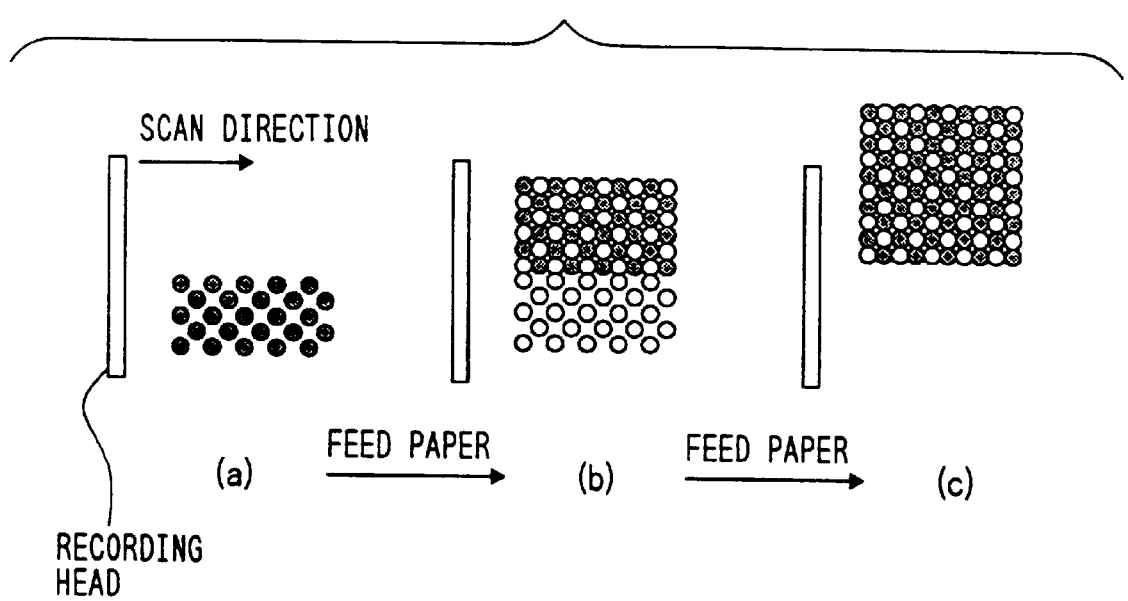

For example, as shown in FIG. 41A, hatched pixels are printed in the first scan, and non-hatched pixels are printed in the second scan. In this case, the first and second scans may be performed without changing the relative positional relationship between the recording head and the recording medium (recording paper sheet). Alternatively, as shown in FIG. 41B, the feed pitch of the recording paper sheet may be set to be half of the scan width of the recording head, and the pixels may be printed in a total of three scans. In the latter method, density nonuniformity caused by a variation in ejection amounts of nozzles of the recording head can be eliminated.

In the example shown in FIGS. 41A and 41B, a pattern printed in each scan is a checker pattern in units of pixels. However, the pattern in units of pixels need not always be used, and the checker pattern need not always be used. For example, an arbitrary pattern may be used. The number of times of scans (the number of divisional print operations) is not limited to two, but may be arbitrarily determined as long as an increase in print time is ignored. In FIG. 41B, the feed pitch of the recording paper sheet is set to be half of the scan width of the recording head. For example, when a recording head having 64 nozzles is used, the recording paper sheet may be fed by a pitch corresponding to 24 nozzles in the first scan, and may be fed by a pitch corresponding to the remaining 40 nozzles in the second scan.

In the fine mode, bit image data processing is executed in addition to character code data processing in the normal mode. Therefore, in the example shown in FIG. 9, whether or not a color image is present adjacent to a black image is also checked for the image portions A, C, and E, and inks used upon printing a black image are determined based on the checking result.

The basic principles of the 23rd to 27th embodiments have been described. These embodiments will be described in detail below with reference to the accompanying drawings.

The normal mode and the fine mode are switched by a mode setting switch (not shown) provided to a printer main body. Image data and its print control according to these modes are mainly processed by the system controller 301 and the print controller 310.

The fine mode of this embodiment will be described below with reference to (a) to (e) of FIG. 42. FIG. 42 pays attention to a nozzle group of a certain color, and shows a case wherein an image is formed using 24 nozzles used upon printing a color image.

As shown in (a) of FIG. 42, a predetermined pattern is printed using lower eight nozzles of the recording head. Pixels printed at this time are those corresponding to a hatched portion in a pattern shown in (e) of FIG. 42. Then, a recording paper sheet is fed by an 8-nozzle pitch, and as shown in (b) of FIG. 42, a predetermined pattern is printed using lower 16 nozzles of the recording head. Pixels printed at this time are those corresponding to a non-hatched portion in the pattern shown in (e) of FIG. 42.

Subsequently, the recording paper sheet is fed by a 16-nozzle pitch, and a predetermined pattern is printed using all the 24 nozzles, as shown in (c) in FIG. 42. Pixels printed at this time are the same as those in (a) of FIG. 42. Furthermore, the recording paper sheet is fed by another 8-nozzle pitch, and the print operation is repeated, as shown in (d) of FIG. 42.

The above-mentioned operations are performed for each of yellow, magenta, cyan, and black.

Figure 38:
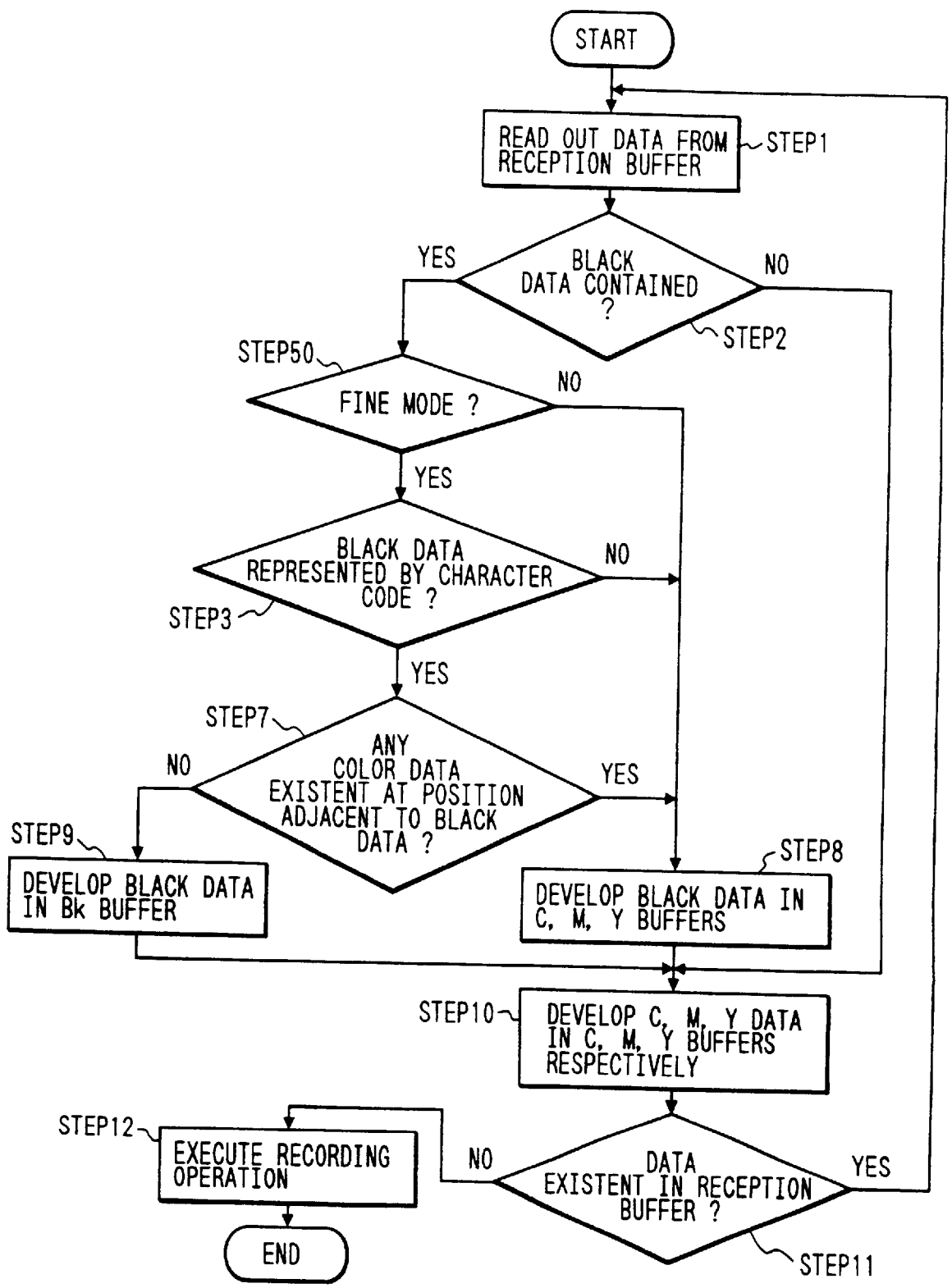
FIGS. 38 to 40 are flow charts showing operations according to the 23rd to 25th embodiments of the present invention.

FIG. 38 is a flow chart showing an operation of this embodiment. In this embodiment, step 50 is added to the above-mentioned flow chart shown in FIG. 5.

In step 50, it is checked if the recording mode is the fine mode or the normal mode. If the recording mode is the fine mode, the flow advances to step 3; otherwise, the flow advances to step 8.

The print results of the image shown in FIG. 9 in the two modes, i.e., the normal mode and the fine mode, on the basis of the above-mentioned operations will be described below.

In the normal mode, all black data are developed onto the buffers for the yellow, magenta, and cyan inks, and the print operations are performed using these inks. More specifically, in the normal mode, all black image portions are printed using the color inks, i.e., the yellow, magenta, and cyan inks.

On the other hand, in the fine mode, processing is performed for only a black image of character code data. More specifically, black image data of the image portion B is printed using the black ink since no color image data is present at a position adjacent to the black image.

In the image portion D, since a cyan image is present as a background portion of a black character, the black image in the image portion D is printed using the color inks, i.e., the yellow, magenta, and cyan inks.

Therefore, in the fine mode of this embodiment, only the image portion B is printed using the black ink.

(24th Embodiment)

Figure 39:
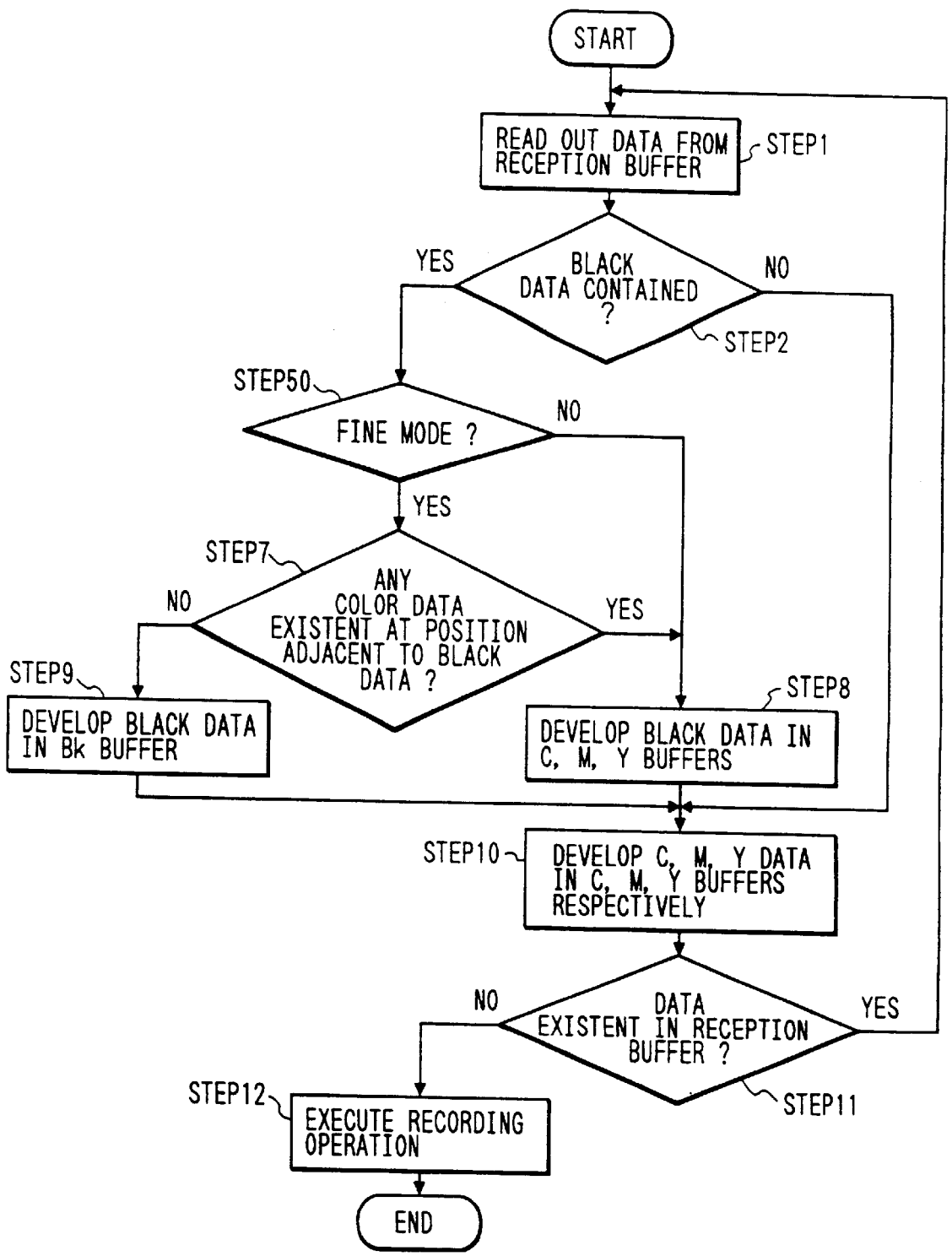

The 24th embodiment corresponds to a further improvement of the 23rd embodiment. In the 23rd embodiment, only character code data is processed in the fine mode. However, in this embodiment, a black image of bit image data is processed in addition to the character code data. FIG. 39 is a flow chart showing the operation of this embodiment. This operation is substantially the same as that in the 23rd embodiment described above with reference to FIG. 38, except for step 3 is omitted.

The print results of the image shown in FIG. 9 in the two modes, i.e., the normal mode and the fine mode, on the basis of the above-mentioned operations will be described below.

In the normal mode, all black images are printed using the color inks as in the 23rd embodiment. On the other hand, in the fine mode, black images in the image portions A, C, and E are also processed in addition to the image portions B and D of the 23rd embodiment. More specifically, black image data in the image portion A is printed using the black ink since no color image data is present at a position adjacent to the black image.

In the image portion C, since a yellow image is present as a background portion of a black bar graph, data of the black bar graph is developed onto the buffers for the yellow, magenta, and cyan inks, and is printed using the color inks, i.e., the yellow, magenta, and cyan inks.

In the image portion E, a magenta image is locally present in a background portion of black bit image data. In this case, numeral "1" of black bit image data is printed using the black ink since no color image is present at a position adjacent to this black bit image data. On the other hand, since numerals "2" and "3" are locally or entirely surrounded by the magenta image, their black image data are developed onto the buffers for the yellow, magenta, and cyan inks, and are printed using the color inks, i.e., the yellow, magenta, and cyan inks.

In this manner, in the fine mode, since a black image is printed using the black ink as long as it is not adjacent to a color image, image quality can be improved.

(25th Embodiment)

Figure 40:
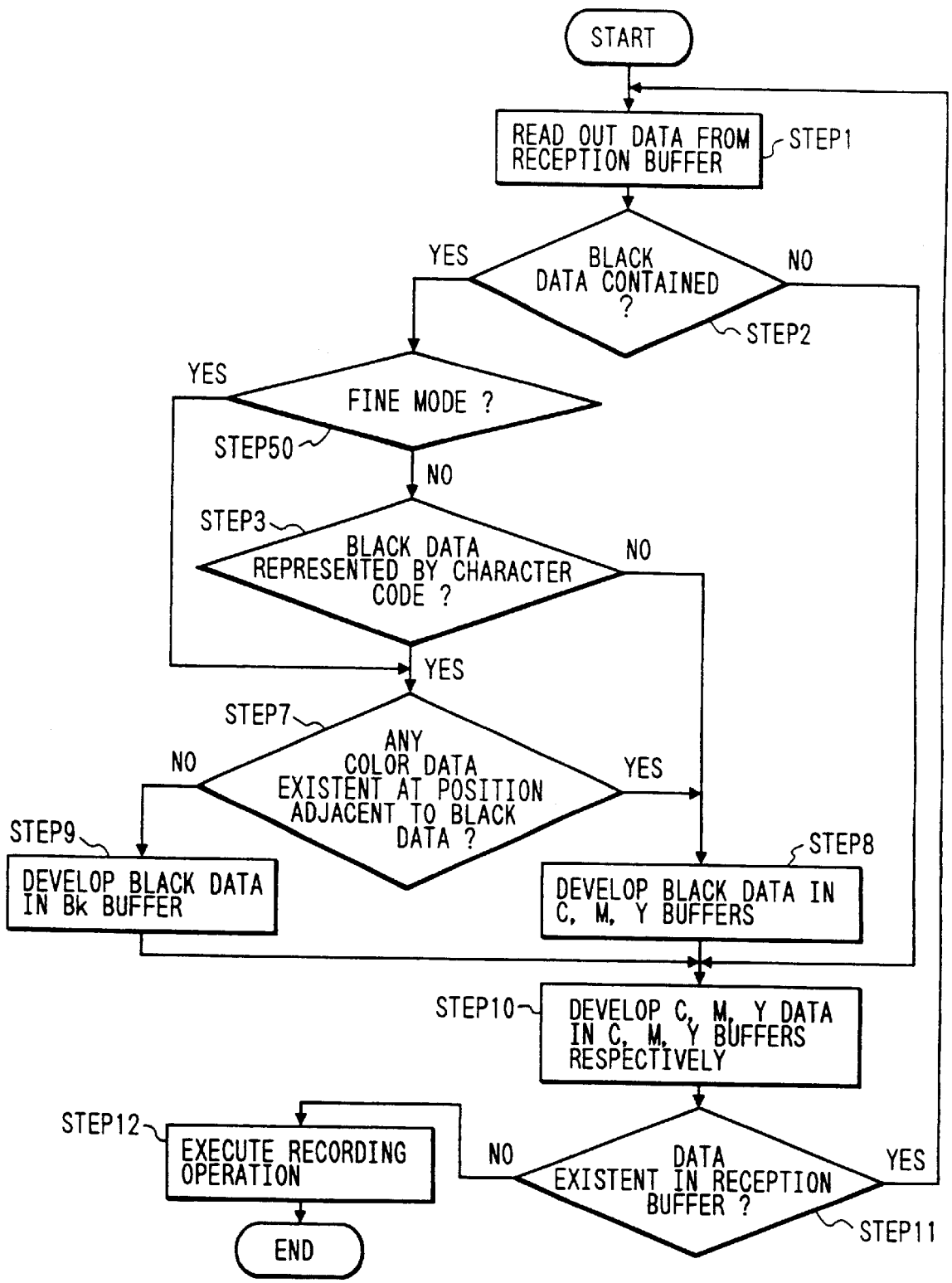

In the 25th embodiment, in the normal mode, only character code data is processed, and in the fine mode, bit image data is processed in addition to the character code data. FIG. 40 is a flow chart showing the operation of this embodiment. When the normal mode is selected, the flow advances from step 50 to step 3; when the fine mode is selected, the flow advances from step 50 to step 7.

According to this embodiment, in addition to the fine mode of the 24th embodiment, since character code data which is not adjacent to a color image is printed using the black ink even in the normal mode, print quality in the normal mode can be improved. In this case, the image portions B and D are processed in the normal mode, and of these portions, the image portion B is printed using the black ink.

(26th Embodiment)

In the 26th embodiment, the number of times of scans in the fine mode in the 25th embodiment is increased, and in the fine mode, only when a black image is entirely surrounded by a color image, the black image is printed using color ink recording heads.

Figure 43A:
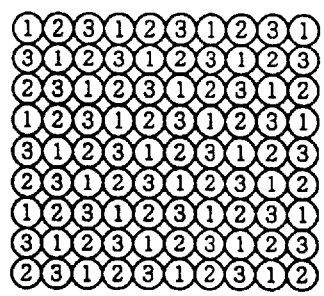
FIGS. 43A and 43B are views for explaining a printing operation in a fine mode.
Figure 43B:
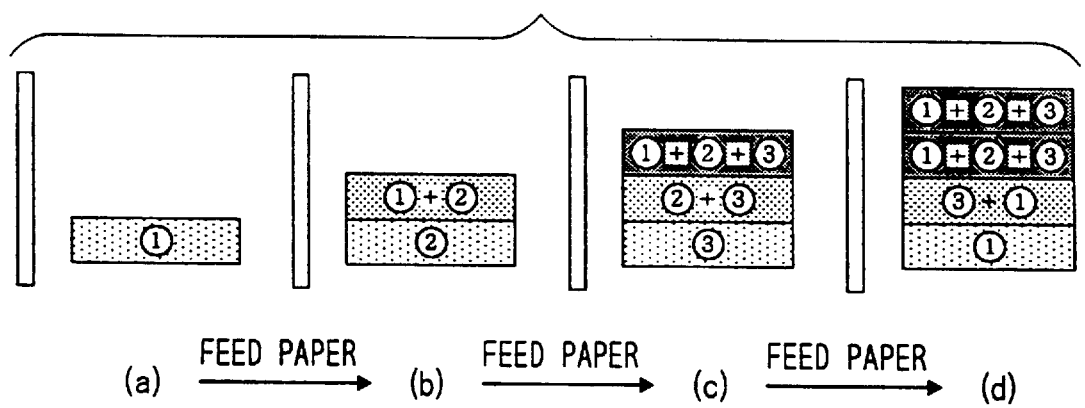
Figure 44A:
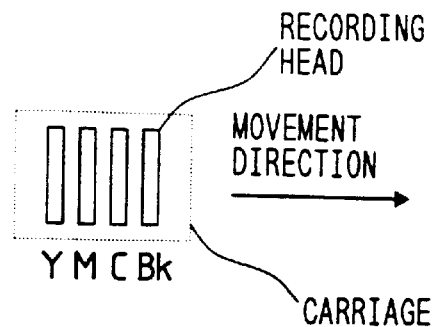
FIGS. 44A to 44D are views showing other examples of a recording head.
Figure 44B:
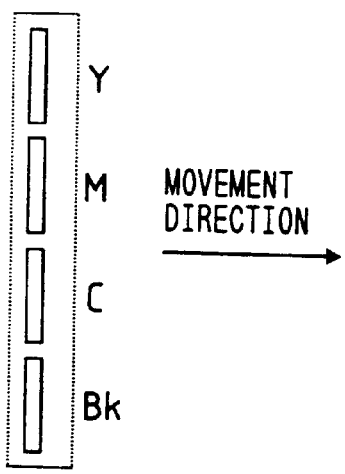
Figure 44C:
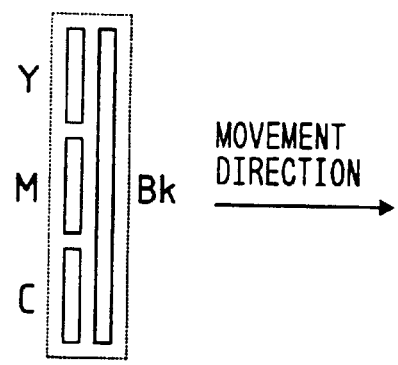
Figure 44D:
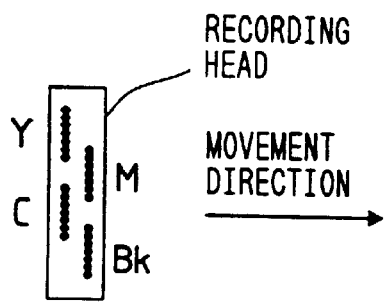

More specifically, as shown in FIG. 43A, a single image is divisionally printed in three scans. As shown in (a) of FIG. 43B, pixels corresponding to ① are printed using eight nozzles (lower ⅓) of the recording head. Subsequently, after a recording paper sheet is fed by an 8-nozzle pitch, as shown in (b) of FIG. 43B, pixels corresponding to ② are printed using 16 nozzles (lower ⅔) of the recording head. After the recording paper sheet is fed by another 8-nozzle pitch, as shown in (c) of FIG. 43B, pixels corresponding to ③ are printed using 24 nozzles corresponding to the total width of the recording head. Thereafter, the above-mentioned operations are repeated, as shown in (d) of FIG. 43B.

Since the fine mode of this embodiment has a large number of times of scans, the inks do not relatively easily cause blurring even when a black image is present adjacent to a color image. Therefore, when a portion of a black image is present adjacent to a color image, this portion is printed using the black ink.

According to this embodiment, print quality can be further improved.

The fine mode of the present invention includes all modes executed to improve print quality as compared to the normal mode which is normally executed. For example, the fine mode can be applied to a case wherein a plurality of ink dots are printed on a single pixel to realize a high density.

(27th Embodiment)

In the 23rd and 26th embodiments, the recording head in which nozzles for the black ink and the color inks are arranged linearly is used. However, the present invention is not particularly limited to the types of recording heads. For example, as shown in FIGS. 44A, 44B, 44C, and 44D, recording heads may be arranged in correspondence with colors, and may be arranged in a direction perpendicular to or parallel to the main scan direction. Alternatively, a plurality of arrays of nozzles may be arranged on a single recording head.

As has been described above, according to the 23rd to 26th embodiments of the present invention, color blurring of the black ink and other color inks (yellow, magenta, and cyan) can be reduced while maintaining high print quality of characters. In particular, print quality in the fine mode, which requires a long processing time, is improved.

In each of the above embodiments, image discrimination processing and image development processing are performed in the printer side on the basis of data received from the host computer. However, the present invention is not limited to this.

For example, the host computer may execute the image discrimination processing and image development processing on the basis of generated data, and may transmit these processed data to the printer. In this case, a processing load on the printer can be reduced.

Also, the image discrimination processing and image development processing may be respectively executed by the host computer and the printer.

The present invention is particularly suitably usable in an ink jet recording head and recording apparatus wherein thermal energy by an electrothermal transducer, laser beam or the like is used to cause a change of state of the ink to eject or discharge the ink. This is because the high density of the picture elements and the high resolution of the recording are possible.

The typical structure and the operational principle are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet. The driving signal is preferably in the form of a pulse, because the development and construction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 59-123670 wherein a common slit is used as the ejection outlet for plural electrothermal transducers, and to the structure disclosed in Japanese Laid-Open Patent Application No. 59-138461 wherein an opening for absorbing pressure wave of the thermal energy is formed corresponding to the ejection portion. This is because the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head and plural recording head combined to cover the maximum width.

In addition, the present invention is applicable to a serial type recording head wherein the recording head is fixed on the main assembly, to a replaceable chip type recording head which is connected electrically with the main apparatus and can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. As for such means, there are capping means for the recording head, cleaning means therefor, pressing or sucking means, preliminary heating means which may be the electrothermal transducer, an addition heating element or a combination thereof. Also, means for effecting preliminary ejection (not for the recording operation) can stabilize the recording operation.

As regards the variation of the recording head mountable, it may be a single corresponding to a single color ink, or may be plural corresponding to the plurality of ink materials having different recording color or density. The present invention is effectively applicable to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiment, the ink has been liquid. It may be, however, an ink material which is solidified below the room temperature but liquefied at the room temperature. Since the ink is controlled within the temperature not lower than 30° C. and not higher than 70° C. to stabilize the viscosity of the ink to provide the stabilized ejection in usual recording apparatus of this type, the ink may be such that it is liquid within the temperature range when the recording signal is supplied. The present invention is applicable to other types of ink. In one of them, the temperature rise due to the thermal energy is positively prevented by consuming it for the state change of the ink from the solid state to the liquid state. Another ink material which is solidified when it is left is used to prevent the evaporation of the ink. In either of the cases, by the application of the recording signal producing thermal energy, the ink is liquefied and the liquefied ink may be ejected. Another ink material may start to be solidified at the time when it reaches the recording material. The present invention is also applicable to such an ink material as is liquefied by the application of the thermal energy. Such an ink material may be retained as a liquid or solid material in through holes or recesses formed in a porous sheet as disclosed in Japanese Laid-Open Patent Application No. 54-56847 and Japanese Laid-Open Patent Application No. 60-71260. The sheet is faced to the electrothermal transducers. The most effective one for the ink materials described above is the film boiling system.

The ink jet recording apparatus may be used as an output terminal of an information processing apparatus such as computer or the like, as a copying apparatus combined with an image reader or the like, or as a facsimile machine having information sending and receiving functions.

While the invention has been described with reference to the structures disclosed herein, it is not confined to the details set forth and this application is intended to cover such modifications or changes as may come within the purposes of the improvements or the scope of the following claims.

What is claimed is:

1. A color ink jet recording method for recording a desired color image on a recording medium using a black ink and a plurality of color inks having different recording medium penetration characteristics from characteristics of the black ink, comprising the steps of:

storing data of plural colors in memories corresponding to the plural colors, respectively;

discriminating whether or not a recording frequency of black in a specified area at a recording position of the recording medium is larger than a specified value, wherein in said discriminating step, the discrimination is executed based on data of, or corresponding to, black of the data of plural colors as stored in said memories;

selecting, in accordance with the discrimination result, whether black is recorded using the plurality of color inks or the black ink; and changing, in accordance with a selection result in said selecting step, data stored in the memory corresponding to a specified area to be recorded using the plurality of color inks, wherein in said changing step, data of colors other than black corresponding to the specified area are changed into data to be used for recording.

2. A method according to claim 1, wherein when the discrimination result indicates that the frequency is larger than the specified value, black is recorded using the plurality of color inks, and when the discrimination result indicates that the frequency is equal to or smaller than the specified value, black is recorded using the black ink.

3. A method according to claim 1, wherein the discrimination of the generation frequency of black record pixels in the specified area is performed a plurality of number of times for a single recording position, and is performed based on an OR of the discrimination results.

4. A method according to claim 1, wherein a size of the specified area is 2P×2P or larger where P is the minimum recording pitch.

5. A method according to claim 1, wherein the specified value assumes a larger value as the generation frequency of record pixels other than black in the specified area is lower.

6. A method according to claim 1, wherein an ink ejection amount per pixel of each of the plurality of color inks is smaller than an ink ejection amount per pixel of the black ink.

7. A method according to claim 1, wherein the ink is ejected by causing a change in state in the ink using heat energy generated by an electro-thermal energy converting member.

8. A method according to claim 1, wherein the ink is ejected using mechanical energy generated by an electro-mechanical energy converting member.

9. A color ink jet recording method for recording a color image on a recording medium using a black ink and a plurality of color inks different from the black ink, comprising the steps of:

discriminating a ratio of black image in a specified area of an image to be recorded on the recording medium;

setting a frequency of recording of the black image in the specified area using the black ink, on the basis of the discriminated ratio; and controlling the recording of the black image in the specified area, in accordance with the set frequency, wherein said control step controls whether the black image is recorded using the black ink or using the plurality of color inks.

10. A method according to claim 9, wherein when the discriminated ratio indicates that the frequency is larger than a specified value, black is recorded using the plurality of color inks, and when the discriminated ratio indicates that the frequency is equal to or smaller than the specified value, black is recorded using the black ink.

11. A method according to claim 10, wherein the specified value assumes a larger value as the frequency of record pixels other than black in the specified area is lower.

12. A method according to claim 9, wherein the discrimination of the ratio of black record pixels in the specified area is performed a plurality of number of times for a single recording position, and is performed based on an OR of the discrimination results.

13. A method according to claim 9, wherein a size of the specified area is 2P×2P or larger where P is the minimum recording pitch.

14. A method according to claim 9, wherein an ink ejection amount per pixel of each of the plurality of color inks is smaller than an ink ejection amount per pixel of the black ink.

15. A method according to claim 9, wherein the ink is ejected by causing a change in state in the ink using heat energy generated by an electro-thermal energy converting member.

16. A method according to claim 9, wherein the ink is ejected using mechanical energy generated by an electro-mechanical energy converting member.

17. A method according to claim 9, wherein the plurality of color inks includes cyan, magenta and yellow inks.

18. A color ink jet recording apparatus for recording a color image on a recording medium by ejecting on the recording medium a black ink and a plurality of color inks different from the black ink using a recording head for ejecting inks, comprising:

discriminating means for discriminating a ratio of a black image in a specified area of an image to be recorded on the recording medium, on the basis of image data corresponding to an image to be recorded;

producing means for setting a frequency of recording of the black image in the specified area using the black ink, on the basis of a discrimination result of said discriminating means, and for producing from the image data record data corresponding to the black ink and the plurality of color inks, respectively, in accordance with the set frequency; and record control means for controlling said recording head to execute recording on the basis of the produced record data, wherein said producing means produces record data for recording the black image using the black ink and record data for recording the black image using the plurality of color inks, in accordance with the set frequency.

19. A method according to claim 18, wherein when the discrimination result indicates that the frequency is larger than a specified value, black is recorded using the plurality of color inks, and when the discrimination result indicates that the frequency is equal to or smaller than the specified value, black is recorded using the black ink.

20. A method according to claim 19, wherein the specified value assumes a larger value as the frequency of record pixels other than black in the specified area is lower.

21. A method according to claim 18, wherein the discrimination of the ratio of black record pixels in the specified area is performed a plurality of number of times for a single recording position, and is performed based on an OR of the discrimination results.

22. A method according to claim 18, wherein a size of the specified area is 2P×2P or larger where P is the minimum recording pitch.

23. A method according to claim 18, wherein an ink ejection amount per pixel of each of the plurality of color inks is smaller than an ink ejection amount per pixel of the black ink.

24. A method according to claim 18, wherein the ink is ejected by causing a change in state in the ink using heat energy generated by an electro-thermal energy converting member.

25. A method according to claim 18, wherein the ink is ejected using mechanical energy generated by an electro-mechanical energy converting member.

26. A method according to claim 18, wherein the plurality of color inks includes cyan, magenta and yellow inks.

* * * * *

UNITED STATES PATENT AND TRADEMARK OFFICE
CERTIFICATE OF CORRECTION

PATENT NO. : 6,312,102 B1
DATED : November 6, 2001
INVENTOR(S) : Jiro Moriyama et al.

It is certified that error appears in the above-identified patent and that said Letters Patent is hereby corrected as shown below:

<u>Column 6,</u>
Line 15, "acety.lenol" should read -- acetylenol. --.

<u>Column 18,</u>
Line 22, "toward-the" should read -- toward the --.

Signed and Sealed this

Thirty-first Day of December, 2002

JAMES E. ROGAN
*Director of the United States Patent and Trademark Office*